(12) United States Patent
Kang et al.

(10) Patent No.: US 10,760,005 B2
(45) Date of Patent: Sep. 1, 2020

(54) PARTICLE INCLUDING ATOMIC-SCALE CHANNEL, METHOD OF PREPARING THE SAME, AND CATALYST INCLUDING THE SAME

(71) Applicants: Korea Advanced Institute of Science and Technology, Daejeon (KR); Korea Research Institute of Chemical Technology, Daejeon (KR)

(72) Inventors: Jeung Ku Kang, Daejeon (KR); Hyung Mo Jeong, Daejeon (KR); Youngkook Kwon, Daejeon (KR); Beom-sik Kim, Daejeon (KR)

(73) Assignees: KOREA ADVANCED INSTITUTE OF SCIENCE AND TECHNOLOGY, Daejeon (KR); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 79 days.

(21) Appl. No.: 15/908,061

(22) Filed: Feb. 28, 2018

(65) Prior Publication Data
US 2019/0023992 A1    Jan. 24, 2019

(30) Foreign Application Priority Data

Jul. 19, 2017 (KR) .......... 10-2017-0091553
Feb. 1, 2018 (KR) .......... 10-2018-0012794

(51) Int. Cl.
*B01D 53/32* (2006.01)
*B01D 53/86* (2006.01)
(Continued)

(52) U.S. Cl.
CPC ............ *C10G 2/50* (2013.01); *B01D 53/326* (2013.01); *B01D 53/8671* (2013.01);
(Continued)

(58) Field of Classification Search
CPC .... C25B 3/04; B01J 21/00; B01J 23/00; B01J 19/088; C10G 2/50; B01D 53/326; B01D 53/8671
See application file for complete search history.

(56) References Cited

U.S. PATENT DOCUMENTS 5,141,806 A * 8/1992 Koontz ............... A61L 27/28
                                                        210/198.2
7,005,405 B2 * 2/2006 Suenaga ............... B01J 23/78
                                                         502/328
(Continued)

FOREIGN PATENT DOCUMENTS

KR    20070004842 A    1/2007
KR    20140012017 A    1/2014
(Continued)

OTHER PUBLICATIONS

Jiang et al., "Li Electrochemical Tuning of Metal Oxide for Highly Selective CO2 Reduction," ACS Nano (2017); 11:6451-6458.

*Primary Examiner* — Cam N. Nguyen
(74) *Attorney, Agent, or Firm* — Fox Rothschild LLP

(57) ABSTRACT

The present disclosure relates to a particle including at least one atomic-scale channel formed on a surface of the particle or on a surface and inside of the particle; a catalyst including the particle, particularly a catalyst for efficient and selective electrochemical conversion of carbon dioxide into high value-added $C_{2+}$ fuel; and a method of preparing the particle.

30 Claims, 47 Drawing Sheets

(51) Int. Cl.
  *B01J 19/08*   (2006.01)
  *C25B 3/04*    (2006.01)
  *B01J 21/00*   (2006.01)
  *B01J 23/00*   (2006.01)
  *C10G 2/00*    (2006.01)

(52) U.S. Cl.
  CPC ............ B01J 19/088 (2013.01); C25B 3/04 (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/2047* (2013.01); *B01D 2255/2061* (2013.01); *B01D 2255/2073* (2013.01); *B01D 2255/2092* (2013.01); *B01D 2255/2094* (2013.01); *B01D 2255/20707* (2013.01); *B01D 2255/20715* (2013.01); *B01D 2255/20723* (2013.01); *B01D 2255/20738* (2013.01); *B01D 2255/20746* (2013.01); *B01D 2255/20753* (2013.01); *B01D 2255/20761* (2013.01); *B01D 2255/20769* (2013.01); *B01D 2255/20776* (2013.01); *B01D 2255/20784* (2013.01); *B01D 2255/20792* (2013.01); *B01D 2255/806* (2013.01); *B01D 2257/302* (2013.01); *B01D 2257/404* (2013.01); *B01D 2257/504* (2013.01); *B01D 2258/0283* (2013.01); *B01J 2219/0805* (2013.01); *B01J 2219/0884* (2013.01); *B01J 2219/0892* (2013.01)

(56) References Cited

U.S. PATENT DOCUMENTS

| | | | | |
|---|---|---|---|---|
| 7,803,734 | B2* | 9/2010 | Majima | B01J 23/42 |
| | | | | 502/184 |
| 8,080,495 | B2* | 12/2011 | Oljaca | B01D 53/944 |
| | | | | 420/465 |
| 9,163,041 | B2* | 10/2015 | Wan | C07F 9/3813 |
| 9,425,462 | B2* | 8/2016 | Kongkanand | H01M 4/8814 |
| 9,440,224 | B2* | 9/2016 | Goia | B01J 23/892 |
| 2005/0075240 | A1* | 4/2005 | Yamamoto | H01M 4/921 |
| | | | | 502/101 |
| 2007/0244003 | A1* | 10/2007 | Majima | B01J 23/42 |
| | | | | 502/319 |
| 2009/0192030 | A1* | 7/2009 | Myers | B01J 23/89 |
| | | | | 502/184 |
| 2014/0256966 | A1* | 9/2014 | Dumesic | B01J 35/02 |
| | | | | 549/503 |

FOREIGN PATENT DOCUMENTS

| | | |
|---|---|---|
| KR | 20140059253 A | 5/2014 |
| KR | 10-1752605 B1 | 6/2017 |

* cited by examiner

Cu (111)

Cu (100)

PARTICLE INCLUDING ATOMIC-SCALE CHANNEL, METHOD OF PREPARING THE SAME, AND CATALYST INCLUDING THE SAME

CROSS-REFERENCE TO RELATED APPLICATION

This application claims the benefit under 35 USC 119(a) of Korean Patent Applications No. 10-2017-0091553 filed on Jul. 19, 2017, and No. 10-2018-0012794 filed on Feb. 1, 2018, in the Korean Intellectual Property Office, the entire disclosures of which are incorporated herein by reference for all purposes.

TECHNICAL FIELD

The present disclosure relates to a particle including at least one an atomic-scale channel formed on a surface of the particle or on a surface and inside of the particle; a catalyst including the particle, particularly a catalyst for efficient and selective electrochemical conversion of carbon dioxide into high value-added $C_{2+}$ fuel; and a method of preparing the particle.

BACKGROUND

A chemical reaction accelerated by a catalyst consists of (1) adsorption of a reactant to a catalytic reaction site, (2) occurrence of a reaction, and (3) desorption of a product from the surface of the catalyst. Therefore, if the adsorption specificity of the surface of the catalyst is changed, the activity and selectivity of the chemical reaction may also be greatly changed.

Accordingly, research has been mainly directed to controlling the adsorption specificity of a catalyst by increasing a catalytic reaction site in order to improve the catalytic performances such as activity and selectivity, but a technology for atomically controlling reaction sites on or inside a catalyst based on adsorption/desorption energy of a reactant or intermediate product has been rarely researched.

Meanwhile, one of major greenhouse gases that cause global warming is carbon dioxide. Carbon dioxide is mainly generated by combustion of fossil fuels, and every year, billions of tons of carbon dioxide is emitted. Accordingly, countries around the world are accelerating the development of a technology for converting carbon dioxide into high value-added fuels or industrial chemicals using electrochemical and/or photochemical methods in order to reduce the emission of carbon dioxide (Korean Patent Laid-open Publication No. 2014-0012017, etc.).

However, the carbon dioxide conversion technology has many limitations for commercial use, such as efficiency, selectivity, and conversion rate. The carbon dioxide conversion technology is basically a catalytic reaction, and most of the problems (high-priced precious metal catalyst, low catalytic performances, and rapid catalytic degradation, etc.) that hinder the commercial use are caused by the catalyst.

Accordingly, in order to commercialize the carbon dioxide conversion technology, the development of a catalyst that enables the production of a high value-added product with high efficiency and excellent selectivity for a long time by supplying a little energy is primarily demanded.

SUMMARY

In view of the foregoing, the present disclosure provides a particle including at least one an atomic-scale channel formed on a surface of the particle or on a surface and inside of the particle; a catalyst including the particle, particularly a catalyst for efficient and selective electrochemical conversion of carbon dioxide into high value-added $C_{2+}$ fuel; and a method of preparing the particle.

However, problems to be solved by the present disclosure are not limited to the above-described problems. Although not described herein, other problems to be solved by the present disclosure can be clearly understood by those skilled in the art from the following descriptions.

A first aspect of the present disclosure provides a particle including at least one atomic-scale channel, the at least one atomic-scale channel being formed on a surface of the particle, or on a surface and inside of the particle.

A second aspect of the present disclosure provides a catalyst including the particle including at least one atomic-scale channel according to the first aspect, wherein the at least one atomic-scale channel is formed on a surface of the particle, or on a surface and inside of the particle, and wherein an inner surface of the at least one atomic-scale channel comprised in the particle includes a reduced metal.

A third aspect of the present disclosure provides a method of preparing the particle including at least one atomic-scale channel according to the first aspect, the method including forming the at least one atomic-scale channel on a surface of the particle, or on a surface and inside of the particle by electrochemical lithiation of a metal compound-containing particle, followed by delithiation, wherein a dimension of a width of the at least one atomic-scale channel is controlled by adjusting a degree of the lithiation, and wherein at least a portion of a surface, or a surface and inside of the metal compound-containing particle is reduced during the lithiation to form the at least one atomic-scale channel, and an inner surface of the at least one atomic-scale channel comprised in the particle includes the metal reduced from the metal compound.

In exemplary embodiments of the present disclosure, the particle according to the present disclosure includes at least one atomic-scale channel on a surface of the particle, or on a surface and inside of the particle, and a width of the at least one atomic-scale channel can be controlled in angstrom (A) unit.

In exemplary embodiments of the present disclosure, the particle according to the present disclosure includes at least one atomic-scale channel whose width can be controlled in angstrom unit on a surface of the particle or on a surface and inside of the particle, and, thus, the at least one atomic-scale channel can form a strong and stable bond with a reactant(s) and/or intermediate product(s) of a catalytic reaction, which makes the particle useful as a catalyst.

In exemplary embodiments of the present disclosure, the catalyst includes at least one atomic-scale channel which can form a strong and stable bond with a reactant(s) and/or intermediate product(s) of a catalytic reaction, and, thus, a current density and a Faradaic efficiency are remarkably high and the activity and/or selectivity of the catalyst is also high.

In exemplary embodiments of the present disclosure, the catalyst can act as a catalyst for electrochemical reduction of an oxygen atom-containing material, particularly for reduction of carbon dioxide, sulfur oxides ($SO_x$), or nitrogen oxides ($NO_x$).

In exemplary embodiments of the present disclosure, the catalyst includes the at least one atomic-scale channel controlled in angstrom unit, and, thus, a selectivity for high value-added $C_{2+}$ hydrocarbons product prepared by the reduction or electrochemical reduction of the carbon dioxide can be remarkably increased, in comparison to that using a particle without the at least one atomic-scale channel.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 2A illustrates an electrochemical lithium charge/discharge process depending on a capacity profile, and FIG. 2B is a schematic diagram illustrating a $CuO_x$ particle from step I to step V. FIG. 2C shows TEM (transmission electron microscope) images of the $CuO_x$ particle at the same place during a gradual lithiation process from step I to step V and FIG. 2D shows the distribution of $d_s$ values in each step.

FIGS. 10A and 1013 shows the catalytic properties of cyclically and repeatedly lithiated samples according to an example of the present disclosure.

DETAILED DESCRIPTION

Figure 1A:
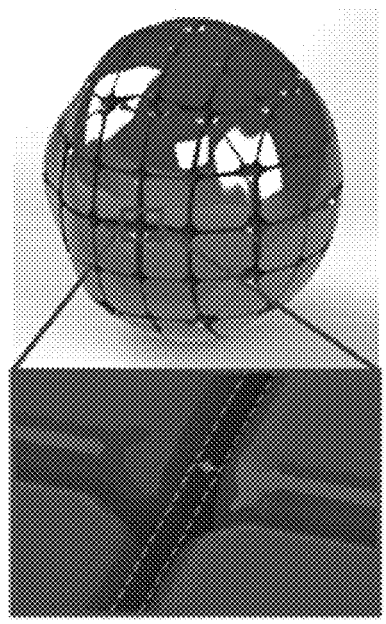
FIGS. 1A, 1B, 1C, 1D and 1E illustrate results and models calculated for quantum-chemical examination according to an example of the present disclosure.
Figure 1A:
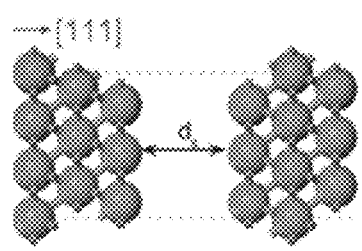
Figure 1A:
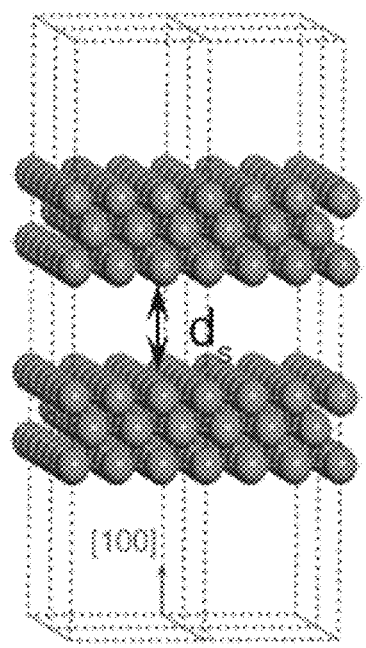

Hereinafter, examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise. Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through this whole specification, a phrase in the form "A and/or B" means "A or B, or A and B".

Through this whole specification, the term "RHE" refers to a reversible hydrogen electrode, and the term "CO2RR" refers to an electrochemical reduction of carbon dioxide.

Hereinafter, embodiments and examples of the present disclosure will be described in detail with reference to the accompanying drawings. However, the present disclosure may not be limited to the following embodiments, examples, and drawings.

A first aspect of the present disclosure provides a particle including at least one atomic-scale channel, the at least one atomic-scale channel being formed on a surface of the particle, or on a surface and inside of the particle.

In an exemplary embodiment of the present disclosure, a width of the at least one atomic-scale channel may be less than about 1 nm. For example, the width of the at least one atomic-scale channel may be less than about 1 nm, about 9 Å or less, about 8 Å or less, about 7 Å or less, about 6 Å or less, about 5 Å or less, about 4 Å or less, about 3 Å or less, or about 2 Å or less, but may not be limited thereto. Further, for example, the width of the at least one atomic-scale channel may be about 7 Å or less.

In an exemplary embodiment of the present disclosure, the width of the at least one atomic-scale channel may be from about 1 Å or more to less than about 1 nm, but may not be limited thereto. For example, the width of the at least one atomic-scale channel may be from about 1 Å or more to less than about 1 nm, from about 1 Å or more to about 9 Å or less, from about 1 Å or more to about 8 Å or less, from about 1 Å or more to about 7 Å or less, from about 1 Å or more to about 6 Å or less, from about 1 Å or more to about 5 Å or less, from about 1 Å or more to about 4 Å or less, from about 1 Å or more to about 3 Å or less, from about 1 Å or more to about 2 Å or less, from about 2 Å or more to less than about 1 nm, from about 2 Å or more to about 9 Å or less, from about 2 Å or more to about 8 Å or less, from about 2 Å or more to about 7 Å or less, from about 2 Å or more to about 6 Å or less, from about 2 Å or more to about 5 Å or less, from about 2 Å or more to about 4 Å or less, from about 2 Å or more to about 3 Å or less, from about 3 Å or more to less than about 1 nm, from about 3 Å or more to about 9 Å or less, from about 3 Å or more to about 8 Å or less, from about 3 Å or more to about 7 Å or less, from about 3 Å or more to about 6 Å or less, from about 3 Å or more to about 5 Å or less, from about 3 Å or more to about 4 Å or less, from about 4 Å or more to less than about 1 nm, from about 4 Å or more to about 9 Å or less, from about 4 Å or more to about 8 Å or less, from about 4 Å or more to about 7 Å or less, from about 4 Å or more to about 6 Å or less, from about 4 Å or more to about 5 Å or less, from about 5 Å or more to less than about 1 nm, from about 5 Å or more to about 9 Å or less, from about 5 Å or more to about 8 Å or less, from about 5 Å or more to about 7 Å or less, from about 5 Å or more to about 6 Å or less, from about 6 Å or more to less than about 1 nm, from about 6 Å or more to about 9 Å or less, from about 6 Å or more to about 8 Å or less, from about 6 Å or more to about 7 Å or less, from about 7 Å or more to less than about 1 nm, from about 7 Å or more to about 9 Å or less, from about 7 Å or more to about 8 Å or less, from about 8 Å or more to less than about 1 nm, from about 8 Å or more to about 9 Å or less, or from about 9 Å or more to less than about 1 nm, but may not be limited thereto. Further, for example, the width of the at least one atomic-scale channel may be from about 5 Å or more to about 6 Å or less.

In an exemplary embodiment of the present disclosure, an inner surface of the at least one atomic-scale channel included in the particle may include a reduced metal. In an exemplary embodiment of the present disclosure, a surface between the channels included in the particle may include the reduced metal. In an exemplary embodiment of the present disclosure, the inner surface of the at least one atomic-scale channel included in the particle and the other surface of the particle may include the reduced metal, but may not be limited thereto.

In an exemplary embodiment of the present disclosure, the atomic-scale channel on the surface of the particle among the at least one atomic-scale channel may be open in the surface of the particle and may have a three-dimensional shape when observed in an atomic-scale and may have a one-dimensional or two-dimensional shape when observed in a nano-scale, but may not be limited thereto.

In an exemplary embodiment of the present disclosure, the at least one atomic-scale channel or the inner space of the channel is a space formed in an atomic scale. The at least one atomic-scale channel or the inner space of the channel may be referred to as an atomic-scale interspacing, an atomic-scale interlayer, or an atomic-scale interplanar spacing, based on both inner sides of the atomic-scale channel, but may not be limited thereto.

In an exemplary embodiment of the present disclosure, the at least one atomic-scale channel may have a regular or irregular shape and may be separated from or connected to each other, but may not be limited thereto.

In an exemplary embodiment of the present disclosure, the at least one atomic-scale channel included in the particle may be formed by a process including electrochemical lithiation of a metal compound-containing particle, followed by delithiation, wherein the inner surface of the at least one atomic-scale channel may include the reduced metal formed by reduction of the metal compound during the lithiation.

In an exemplary embodiment of the present disclosure, a dimension of the width of the at least one atomic-scale channel may be controlled by a cut-off voltage of the electrochemical lithiation of the metal compound-containing particle, but may not be limited thereto.

In an exemplary embodiment of the present disclosure, the metal compound may be a compound including one or at least two metal elements selected from the group consisting of Mg, Al, Au, Ag, Cd, Co, Cr, Cu, In, Ir, Mo, Nb, Ni, Os, Pd, Pt, Rh, Ru, Sn, Ti, V, W, Zn, Sc, Y, Zr, Hf, Ta, Mn, Fe, Tc, and Re, but may not be limited thereto. In an exemplary embodiment of the present disclosure, the metal may be used without limitation as long as it has a standard reduction potential higher than that of lithium, but may not be limited thereto.

In an exemplary embodiment of the present disclosure, the metal compound may include an oxide of one or at least two metals selected from the group consisting of Mg, Al, Au, Ag, Cd, Co, Cr, Cu, In, Ir, Mo, Nb, Ni, Os, Pd, Pt, Rh, Ru, Sn, Ti, V, W, Zn, Sc, Y, Zr, Hf, Ta, Mn, Fe, Tc, and Re.

In an exemplary embodiment of the present disclosure, the reduced metal may include one or at least two metals selected from the group consisting of Mg, Al, Au, Ag, Cd, Co, Cr, Cu, In, Ir, Mo, Nb, Ni, Os, Pd, Pt, Rh, Ru, Sn, Ti, V, W, Zn, Sc, Y, Zr, Hf, Ta, Mn, Fe, Tc, and Re, but may not be limited thereto. In an exemplary embodiment of the present disclosure, the metal may be used without limitation as long as it has a standard reduction potential higher than that of lithium, but may not be limited thereto, but may not be limited thereto.

In an exemplary embodiment of the present disclosure, an average diameter of the particle is not particularly limited. For example, the particle may have an average diameter of from nanometer scale to micrometer scale, but may not be limited thereto. For example, the average diameter of the particle may be about 10 µm or less, about 1 µm or less, about 500 nm or less, about 300 nm or less, about 100 nm or less, from about 30 nm to about 500 nm, from about 30 nm to about 400 nm, from about 30 nm to about 300 nm, from about 30 nm to about 200 nm, from about 30 nm to about 100 nm, from about 30 nm to about 80 nm, from about 30 nm to about 60 nm, from about 30 nm to about 50 nm, from about 50 nm to about 500 nm, from about 50 nm to about 400 nm, from about 50 nm to about 300 nm, from about 50 nm to about 200 nm, from about 50 nm to about 100 nm, from about 50 nm to about 80 nm, from about 50 nm to about 60 nm, from about 60 nm to about 500 nm, from about 60 nm to about 400 nm, from about 60 nm to about 300 nm, from about 60 nm to about 200 nm, from about 60 nm to about 100 nm, from about 60 nm to about 80 nm, from about 80 nm to about 500 nm, from about 80 nm to about 400 nm, from about 80 nm to about 300 nm, from about 80 nm to about 200 nm, or from about 80 nm to about 100 nm, but may not be limited thereto.

In an exemplary embodiment of the present disclosure, a volume density of the at least one atomic-scale channel may be in a range of a ratio of from about 0.01 to about 0.2 per unit volume of the particle, but may not be limited thereto. For example, the volume density of the at least one atomic-scale channel may be in a range of a ratio of from about 0.01 to about 0.2, from about 0.01 to about 0.15, from about 0.01 to about 0.1, from about 0.01 to about 0.08, from about 0.01 to about 0.06, from about 0.01 to about 0.04, from about 0.01 to about 0.02, from about 0.02 to about 0.2, from about 0.02 to about 0.15, from about 0.02 to about 0.1, from about 0.02 to about 0.08, from about 0.02 to about 0.06, from about 0.02 to about 0.04, from about 0.04 to about 0.2, from about 0.04 to about 0.15, from about 0.04 to about 0.1, from about 0.04 to about 0.08, from about 0.04 to about 0.06, from about 0.06 to about 0.2, from about 0.06 to about 0.15, from about 0.06 to about 0.1, from about 0.06 to about 0.08, from about 0.08 to about 0.2, from about 0.08 to about 0.15, or from about 0.08 to about 0.1 per unit volume of the particle, but may not be limited thereto.

A second aspect of the present disclosure provides a catalyst including the particle including at least one atomic-scale channel according to the first aspect, wherein the at least one atomic-scale channel is formed on a surface of the particle, or on a surface and inside of the particle, and wherein an inner surface of the at least one atomic-scale channel comprised in the particle includes a reduced metal.

Detailed descriptions on the second aspect of the present disclosure, which overlap with those on the first aspect of the present disclosure, are omitted hereinafter, but the descriptions of the first aspect of the present disclosure may be identically applied to the second aspect of the present disclosure, even though they are omitted hereinafter.

In an exemplary embodiment of the present disclosure, a width of the at least one atomic-scale channel may be less than about 1 nm. For example, the width of the at least one atomic-scale channel may be less than about 1 nm, about 9 Å or less, about 8 Å or less, about 7 Å or less, about 6 Å or less, about 5 Å or less, about 4 Å or less, about 3 Å or less, or about 2 Å or less, but may not be limited thereto. Further, for example, the width of the at least one atomic-scale channel may be about 7 Å or less.

In an exemplary embodiment of the present disclosure, the width of the at least one atomic-scale channel may be from about 1 Å or more to less than about 1 nm, but may not be limited thereto. For example, the width of the at least one atomic-scale channel may be from about 1 Å or more to less than about 1 nm, from about 1 Å or more to about 9 Å or less, from about 1 Å or more to about 8 Å or less, from about 1 Å or more to about 7 Å or less, from about 1 Å or more to about 6 Å or less, from about 1 Å or more to about 5 Å or less, from about 1 Å or more to about 4 Å or less, from about 1 Å or more to about 3 Å or less, from about 1 Å or more to about 2 Å or less, from about 2 Å or more to less than about 1 nm, from about 2 Å or more to about 9 Å or less, from about 2 Å or more to about 8 Å or less, from about 2 Å or more to about 7 Å or less, from about 2 Å or more to about 6 Å or less, from about 2 Å or more to about 5 Å or less, from about 2 Å or more to about 4 Å or less, from about 2 Å or more to about 3 Å or less, from about 3 Å or more to less than about 1 nm, from about 3 Å or more to about 9 Å or less, from about 3 Å or more to about 8 Å or less, from about 3 Å or more to about 7 Å or less, from about 3 Å or more to about 6 Å or less, from about 3 Å or more to about 5 Å or less, from about 3 Å or more to about 4 Å or less, from about 4 Å or more to less than about 1 nm, from about 4 Å or more to about 9 Å or less, from about 4 Å or more to about 8 Å or less, from about 4 Å or more to about 7 Å or less, from about 4 Å or more to about 6 Å or less, from about 4 Å or more to about 5 Å or less, from about 5 Å or more to less than about 1 nm, from about 5 Å or more to about 9 Å or less, from about 5 Å or more to about 8 Å or less, from about 5 Å or more to about 7 Å or less, from about 5 Å or more to about 6 Å or less, from about 6 Å or more to less than about 1 nm, from about 6 Å or more to about 9 Å or less, from about 6 Å or more to about 8 Å or less, from about 6 Å or more to about 7 Å or less, from about 7 Å or more to less than about 1 nm, from about 7 Å or more to about 9 Å or less, from about 7 Å or more to about 8 Å or less, from about 8 Å or more to less than about 1 nm, from about 8 Å or more to about 9 Å or less, or from about 9 Å or more to less than about 1 nm, but may not be limited thereto. Further, for example, the width of the at least one atomic-scale channel may be from about 5 Å or more to about 6 Å or less.

In an exemplary embodiment of the present disclosure, an inner surface of the at least one atomic-scale channel included in the particle may include a reduced metal. In an exemplary embodiment of the present disclosure, a surface between the channels included in the particle may include the reduced metal. In an exemplary embodiment of the present disclosure, the inner surface of the at least one atomic-scale channel included in the particle and the other surface of the particle may include the reduced metal, but may not be limited thereto.

In an exemplary embodiment of the present disclosure, the atomic-scale channel on the surface of the particle among the at least one atomic-scale channel may be open in the surface of the particle and may have a three-dimensional shape when observed in an atomic-scale and may have a one-dimensional or two-dimensional shape when observed in a nano-scale, but may not be limited thereto.

In an exemplary embodiment of the present disclosure, the at least one atomic-scale channel or the inner space of the channel is a space formed in an atomic scale. The at least one atomic-scale channel or the inner space of the channel may be referred to as an atomic-scale interspacing, an atomic-scale interlayer, or an atomic-scale interplanar spacing, based on both inner sides of the atomic-scale channel, but may not be limited thereto.

In an exemplary embodiment of the present disclosure, the at least one atomic-scale channel may have a regular or irregular shape and may be separated from or connected to each other, but may not be limited thereto.

In an exemplary embodiment of the present disclosure, the at least one atomic-scale channel included in the particle may be formed by a process including electrochemical lithiation of a metal compound-containing particle, followed by delithiation, wherein the inner surface of the at least one atomic-scale channel may include the reduced metal formed by reduction of the metal compound.

In an exemplary embodiment of the present disclosure, a dimension of the width of the at least one atomic-scale channel may be controlled by a cut-off voltage of the electrochemical lithiation of the metal compound-containing particle, but may not be limited thereto.

In an exemplary embodiment of the present disclosure, in the catalyst, the particle may act as a catalyst for reduction of an oxygen atom-containing material, but may not be limited thereto. The catalyst may act as a catalyst for reduction of an oxygen atom-containing material in the phase of gas or liquid, but may not be limited thereto.

In an exemplary embodiment of the present disclosure, the oxygen atom-containing material may include carbon dioxide, sulfur oxides ($SO_x$), or nitrogen oxides ($NO_x$), but may not be limited thereto. Further, the oxygen atom-containing material may include carbon dioxide.

In an exemplary embodiment of the present disclosure, the reduction may be performed by electrochemical reduction, but may not be limited thereto.

In an exemplary embodiment of the present disclosure, an activity and/or a selectivity of the catalyst may be controlled by a dimension of the width of the at least one atomic-scale channel comprised in the particle.

In an exemplary embodiment of the present disclosure, the width of the at least one atomic-scale channel before and after the reduction with the catalyst may be maintained constant, but may not be limited thereto.

In an exemplary embodiment of the present disclosure, the metal compound may be a compound including one or at least two metal elements selected from the group consisting of Mg, Al, Au, Ag, Cd, Co, Cr, Cu, In, Ir, Mo, Nb, Ni, Os, Pd, Pt, Rh, Ru, Sn, Ti, V, W, Zn, Sc, Y, Zr, Hf, Ta, Mn, Fe, Tc, and Re, but may not be limited thereto. In an exemplary embodiment of the present disclosure, the metal may be used without limitation as long as it has a standard reduction potential higher than that of lithium, but may not be limited thereto, but may not be limited thereto.

In an exemplary embodiment of the present disclosure, the metal compound may include an oxide of one or at least two metals selected from the group consisting of Mg, Al, Au, Ag, Cd, Co, Cr, Cu, In, Ir, Mo, Nb, Ni, Os, Pd, Pt, Rh, Ru, Sn, Ti, V, W, Zn, Sc, Y, Zr, Hf, Ta, Mn, Fe, Tc, and Re.

In an exemplary embodiment of the present disclosure, the reduced metal may include one or at least two metals selected from the group consisting of Mg, Al, Au, Ag, Cd, Co, Cr, Cu, In, Ir, Mo, Nb, Ni, Os, Pd, Pt, Rh, Ru, Sn, Ti, V, W, Zn, Sc, Y, Zr, Hf, Ta, Mn, Fe, Tc, and Re, but may not be limited thereto. In an exemplary embodiment of the present disclosure, if the metal has a standard reduction potential higher than that of lithium, the metal may be used without limitation as long as it is known as having a targeted catalytic performance, but may not be limited thereto.

In an exemplary embodiment of the present disclosure, an average diameter of the particle is not particularly limited. For example, the particle may have an average diameter of from nanometer scale to micrometer scale, but may not be limited thereto. For example, the average diameter of the particle may be about 10 μm or less, about 1 μm or less, about 500 nm or less, about 300 nm or less, about 100 nm or less, from about 30 nm to about 500 nm, from about 30 nm to about 400 nm, from about 30 nm to about 300 nm, from about 30 nm to about 200 nm, from about 30 nm to about 100 nm, from about 30 nm to about 80 nm, from about 30 nm to about 60 nm, from about 30 nm to about 50 nm, from about 50 nm to about 500 nm, from about 50 nm to about 400 nm, from about 50 nm to about 300 nm, from about 50 nm to about 200 nm, from about 50 nm to about 100 nm, from about 50 nm to about 80 nm, from about 50 nm to about 60 nm, from about 60 nm to about 500 nm, from about 60 nm to about 400 nm, from about 60 nm to about 300 nm, from about 60 nm to about 200 nm, from about 60 nm to about 100 nm, from about 60 nm to about 80 nm, from about 80 nm to about 500 nm, from about 80 nm to about 400 nm, from about 80 nm to about 300 nm, from about 80 nm to about 200 nm, or from about 80 nm to about 100 nm, but may not be limited thereto.

In an exemplary embodiment of the present disclosure, a volume density of the at least one atomic-scale channel may be in a range of a ratio of 0.01 to 0.2 per unit volume of the particle, but may not be limited thereto. For example, the volume density of the at least one atomic-scale channel may be in a range of a ratio of from about 0.01 to about 0.2, from about 0.01 to about 0.15, from about 0.01 to about 0.1, from about 0.01 to about 0.08, from about 0.01 to about 0.06, from about 0.01 to about 0.04, from about 0.01 to about 0.02, from about 0.02 to about 0.2, from about 0.02 to about 0.15, from about 0.02 to about 0.1, from about 0.02 to about 0.08, from about 0.02 to about 0.06, from about 0.02 to about 0.04, from about 0.04 to about 0.2, from about 0.04 to about 0.15, from about 0.04 to about 0.1, from about 0.04 to about 0.08, from about 0.04 to about 0.06, from about 0.06 to about 0.2, from about 0.06 to about 0.15, from about 0.06 to about 0.1, from about 0.06 to about 0.08, from about 0.08 to about 0.2, from about 0.08 to about 0.15, or from about 0.08 to about 0.1 per unit volume of the particle, but may not be limited thereto.

In an exemplary embodiment of the present disclosure, the width of the at least one atomic-scale channel may be about 7 Å or less, and the selectivity for $C_{2+}$ hydrocarbons product prepared by the reduction, particularly electrochemical reduction, of the carbon dioxide using the particle as the catalyst may be increased, in comparison to that using a particle without the at least one atomic-scale channel. For example, the selectivity for the $C_{2+}$ hydrocarbons product may be about 40% or more, about 50% or more, about 60% or more, about 70% or more, about 80% or more, or about 90% or more. Further, when the catalyst is actually prepared, the selectivity for the $C_{2+}$ hydrocarbons product may vary depending on the number, shape, width, length, or depth of the at least one atomic-scale channel formed in the particle included in the catalyst. For example, the selectivity for the $C_{2+}$ hydrocarbons product may be affected by a carbon-carbon coupling efficiency which varies depending on the number, shape, width, length, or depth of the at least one atomic-scale channel formed in the particle, but may not be limited thereto.

In an exemplary embodiment of the present disclosure, the width of the atomic-scale channel of the particle may be from about 5 Å or more to about 6 Å or less, and the selectivity for the $C_{2+}$ hydrocarbons product formed by the reduction, particularly electrochemical reduction, of the carbon dioxide using the particle as the catalyst may be increased, in comparison to that using a particle without the at least one atomic-scale channel. For example, the selectivity for the $C_{2+}$ hydrocarbons product may be about 40% or more, about 50% or more, about 60% or more, about 70% or more, about 80% or more, or about 90% or more. Further, when the catalyst is actually prepared, the selectivity for the $C_{2+}$ hydrocarbons product may vary depending on the number, shape, width, length, or depth of the at least one atomic-scale channel formed in the particle included in the catalyst. For example, the selectivity for the $C_{2+}$ hydrocarbons product may be affected by the carbon-carbon coupling efficiency which varies depending on the number, shape, width, length, or depth of the at least one atomic-scale channel formed in the particle, but may not be limited thereto.

In an exemplary embodiment of the present disclosure, the particle according to the present disclosure includes at least one atomic-scale channel whose width can be controlled in angstrom (Å) unit on a surface of the particle or on a surface and inside of the particle, and, thus, the at least one atomic-scale channel can form a strong and stable bond with a reactant(s) and/or intermediate product(s) of a catalytic reaction, which makes the particle very useful as a catalyst.

In an exemplary embodiment of the present disclosure, the catalyst includes at least one atomic-scale channel or gap which can form a strong and stable bond with a reactant(s) and/or intermediate product(s) of a catalytic reaction, and, thus, a current density and a Faradaic efficiency are remarkably high and the activity and/or selectivity of the catalyst is also remarkably high, which make [ the catalyst advantageous.

In an exemplary embodiment of the present disclosure, the catalyst can act as a catalyst particularly for electrochemical reduction of an oxygen atom-containing material and thus can act as a catalyst for reduction of carbon dioxide, sulfur oxides ($SO_x$), or nitrogen oxides ($NO_x$).

In an exemplary embodiment of the present disclosure, a method of electrochemical conversion of carbon dioxide may use the catalyst of the second aspect of the present disclosure. The catalyst including the particle including at least one atomic-scale channel according to the first aspect, wherein the at least one atomic-scale channel is formed on a surface of the particle, or on a surface and inside of the particle, and wherein an inner surface of the at least one atomic-scale channel comprised in the particle includes a reduced metal. For example, the width of the atomic-scale channel of the particle is 7 Å or less, but may not be limited thereto.

In an exemplary embodiment of the present disclosure, the catalyst includes the at least one atomic-scale channel controlled in angstrom unit, and, thus, a selectivity for a $C_{2+}$ hydrocarbons product prepared by the reduction of the carbon dioxide can be remarkably increased, in comparison to that using a particle without the at least one atomic-scale channel.

In an exemplary embodiment of the present disclosure, an electrochemical reduction of carbon dioxide with the catalyst may be a method of producing a $C_{2+}$ organic compound by electrochemically reducing carbon dioxide using an electrode including the catalyst for reduction of carbon dioxide. Herein, the $C_{2+}$ organic compound may include an organic compound of from C2 to C4, and for example, the organic compound of from C2 to C4 may include ethylene, propylene, butylene, ethanol, propanol, butanol, or acetates, but may not be limited thereto. Specifically, the organic compound of C2 or more may include ethylene and/or ethanol.

In the electrochemical reduction according to an exemplary embodiment of the present disclosure, a loading amount of the catalyst on the electrode may be from about 1 µg/cm² to about 50 µg/cm², preferably from about 5 µg/cm² to about 20 µg/cm², and more preferably from about 11 µg/cm² to about 20 µg/cm². The catalyst may be loaded by drop-casting a solution containing the catalyst on an electrode or glassy carbon substrate, but may not be limited thereto.

In the electrochemical reduction according to an exemplary embodiment of the present disclosure, a voltage applied to the electrode during the electrochemical reduction may be from about −0.7 V to about −1.5 V and preferably from about −0.7 V to about −1 V based on a RHE (V vs RHE), but may not be limited thereto. For example, the voltage applied to the electrode may be from about −0.7 V to about −1.5 V, from about −0.7 V to about −1.2 V, from about −0.7 V to about −1 V, from about −0.7 V to about −0.9 V, from about −0.9 V to about −1.5 V, from about −0.9 V to about −1.2 V, from about −0.9 V to about −1 V, from about −1 V to about −1.5 V, or from about −1 V to about −1.2 V based on a reversible hydrogen electrode, but may not be limited thereto.

The electrochemical reduction of carbon dioxide according to an exemplary embodiment of the present disclosure may be performed using any cell structures, electrolytes, and counter electrodes known as being used for electrochemical reduction of carbon dioxide to produce a $C_{2+}$ product. For example, the electrochemical reduction of carbon dioxide may be performed using a reduction tub including a separator that separates a cathode region and an anode region; a cathode which is an electrode including the catalyst for reduction of carbon dioxide and arranged in the cathode region; a cathode electrolyte in contact with the cathode in the cathode region and saturated with carbon dioxide; an anode arranged in the anode region; and an anode electrolyte in contact with the anode. In this case, fresh electrolytes may be injected to the cathode region and the anode region through inlets, respectively, and the electrolytes and reaction products after the reaction may be discharged through outlets. The separator may be an ion-exchange membrane, and the ion-exchange membrane may be a cation-exchange membrane or an anion-exchange membrane. The anode, the cathode electrolyte, and the anode electrolyte may use, without limitation, any anode materials, cathode electrolyte materials, and anode electrolyte materials known as being used for electrochemical reduction of carbon dioxide. For example, the anode may include precious metals such as platinum, rhodium, gold, and the like and/or precious metal oxides, but may not be limited thereto. For example, the cathode electrolyte and the anode electrolyte may be identical to or different from each other, and the cathode electrolyte and the anode electrolyte may be liquid electrolytes. For example, the liquid electrolytes may be aqueous or non-aqueous liquid electrolytes. Examples of the liquid cathode electrolyte may include non-aqueous or aqueous liquid electrolytes including a bicarbonate, carbonate, sulfate, phosphate, borate, chloride, bromide, and other organic/inorganic salts of an alkali metal or ammonium hydroxide, but may not be limited thereto. Examples of the liquid anode electrolyte may include non-aqueous or aqueous liquid electrolytes including a hydroxide, inorganic acid, organic acid, or halide of an alkali metal or ammonium hydroxide, but may not be limited thereto. A solvent for the non-aqueous liquid electrolyte may be any organic solvent known as being used for electrochemical reduction of carbon dioxide, and representative examples thereof may include ionic liquids such as nitrile-based solvents, e.g., acetonitrile, alcohol-based solvents, e.g., methanol, ether-based solvents, e.g., dimethyl ether, and imidazolium-based solvents, but may not be limited thereto.

A third aspect of the present disclosure provides a method of preparing the particle including at least one atomic-scale channel according to the first aspect, including forming the at least one atomic-scale channel on a surface of the particle, or on a surface and inside of the particle by electrochemical lithiation of a metal compound-containing particle, followed by delithiation, wherein a dimension of a width of the at least one atomic-scale channel is controlled by adjusting a degree of the lithiation, and at least a portion of a surface, or a surface and inside of the metal compound-containing particle is reduced during the lithiation to form the at least one atomic-scale channel, and wherein an inner surface of the at least one atomic-scale channel comprised in the particle includes the metal reduced from the metal compound.

Detailed descriptions on the third aspect of the present disclosure, which overlap with those on the first aspect of the present disclosure, are omitted hereinafter, but the descriptions of the first aspect of the present disclosure may be identically applied to the third aspect of the present disclosure, even though they are omitted hereinafter.

In an exemplary embodiment of the present disclosure, an inner surface of the at least one atomic-scale channel included in the particle may include a reduced metal. In an exemplary embodiment of the present disclosure, a surface between the channels included in the particle may include the reduced metal. In an exemplary embodiment of the present disclosure, the inner surface of the at least one atomic-scale channel included in the particle and the other surface of the particle may include the reduced metal, but may not be limited thereto.

In an exemplary embodiment of the present disclosure, the atomic-scale channel on the surface of the particle among the at least one atomic-scale channel may be open in the surface of the particle and may have a three-dimensional shape when observed in an atomic-scale and may have a one-dimensional or two-dimensional shape when observed in a nano-scale, but may not be limited thereto.

In an exemplary embodiment of the present disclosure, the at least one atomic-scale channel or the channel is a space formed in an atomic scale. The at least one atomic-scale channel or the inner space of the channel may be referred to as an atomic-scale interspacing, an atomic-scale interlayer, or an atomic-scale interplanar spacing, based on both inner sides of the atomic-scale channel, but may not be limited thereto.

In an exemplary embodiment of the present disclosure, the at least one atomic-scale channel may have a regular or irregular shape and may be separated from or connected to each other, but may not be limited thereto.

In an exemplary embodiment of the present disclosure, the at least one atomic-scale channel included in the particle may be formed by a process including electrochemical lithiation of a metal compound-containing particle, followed by delithiation, wherein the inner surface of the at least one atomic-scale channel may include the reduced metal formed by reduction of the metal compound during the lithiation.

In an exemplary embodiment of the present disclosure, the lithiation may include applying a constant current and a cut-off voltage of from more than 0 V to about 3 V or less using an electrochemical cell, and the cut-off voltage may be based on $Li/Li^+$, but may not be limited thereto. For example, the cut-off voltage may be from more than 0 V or to about 3 V or less, from more than 0 V to less than about 3 V, from more than 0 V to about 2.5 V or less, from more than 0 V to about 2 V or less, from more than 0 V to about 1.5 V or less, from more than 0 V to about 1.4 V or less, from more than 0 V to about 1.2 V or less, from more than 0 V to about 1 V or less, from more than 0 V or to about 0.8 V or less, from more than 0 V to about 0.6 V or less, from more than 0 V to about 0.4 V or less, from more than 0 V to about 0.2 V or less, from about 0.2 V or more to about 3 V or less, from about 0.2 V or more to less than about 3 V, from about 0.2 V or more to about 2.5 V or less, from about 0.2 V or more to about 2 V or less, from about 0.2 V or more to about 1.5 V or less, from about 0.2 V or more to about 1.4 V or less, from about 0.2 V or more to about 1.2 V or less, from about 0.2 V or more to about 1 V or less, from about 0.2 V or more to about 0.8 V or less, from about 0.2 V or more to about 0.6 V or less, from about 0.2 V or more to about 0.4 V or less, from about 0.4 V or more to about 3 V or less, from about 0.4 V or more to less than about 3 V, from about 0.4 V or more to about 2.5 V or less, from about 0.4 V or more to about 2 V or less, from about 0.4 V or more to about 1.5 V or less, from about 0.4 V or more to about 1.4 V or less, from about 0.4 V or more to about 1.2 V or less, from about 0.4 V or more to about 1 V or less, from about 0.4 V or more to about 0.8 V or less, from about 0.4 V or more to about 0.6 V or less, from about 0.6 V or more to about 3 V or less, from about 0.6 V or more to less than about 3 V, from about 0.6 V or more to about 2.5 V or less, from about 0.6 V or more to about 2 V or less, from about 0.6 V or more to about 1.5 V or less, from about 0.6 V or more to about 1.4 V or less, from about 0.6 V or more to about 1.2 V or less, from about 0.6 V or more to about 1 V or less, from about 0.6 V or more to about 0.8 V or less, from about 0.8 V or more to about 3 V or less, from about 0.8 V or more to less than about 3 V, from about 0.8 V or more to about 2.5 V or less, from about 0.8 V or more to about 2 V or less, from about 0.8 V or more to about 1.5 V or less, from about 0.8 V or more to about 1.4 V or less, from about 0.8 V or more to about 1.2 V or less, from about 0.8 V or more to about 1V or less, from about 1 V or more to about 3 V or less, from about 1V or more to less than about 3 V, from about 1V or more to about 2.5 V or less, from about 1V or more to about 2 V or less, from about 1V or more to about 1.5 V or less, from about 1V or more to about 1.4 V or less, from about 1V or more to about 1.2 V or less, from about 1.2 V or more to about 3 V or less, from about 1.2 V or more to less than about 3 V, from about 1.2 V or more to about 2.5 V or less, from about 1.2 V or more to about 2 V or less, from about 1.2 V or more to about 1.5 V or less, from about 1.2 V or more to about 1.4 V or less, from about 1.4 V or more to about 3 V or less, from about 1.4 V or more to less than about 3 V, from about 1.4 V or more to about 2.5 V or less, from about 1.4 V or more to about 2 V or less, or from about 1.4 V or more to about 1.5 V or less, but may not be limited thereto. For example, the cut-off voltage may be from more than 0 V to about 1.5 V or less, from more than 0 V to about 1 V or less, from more than 0 V to about 0.5 V or less, from about 0.5 V or more to about 1.5 V or less, from about 0.5 V or more to about 1V or less, from about 1 V or more to about 1.5 V or less, or from about 1V or more to about 1.4 V or less. Further, for example, the cut-off voltage may be from about 1V or more to about 1.4 V or less.

In an exemplary embodiment of the present disclosure, the width of the at least one atomic-scale channel may be controlled by a cut-off voltage of the electrochemical lithiation of the metal compound-containing particle. This means that an average width of the at least one atomic-scale channel may be controlled specifically by a cut-off voltage upon a constant current discharge (lithiation), i.e., a voltage at which lithiation is cut off.

In an exemplary embodiment of the present disclosure, the electrochemical lithiation of the metal compound-containing particle may include: a) preparing an electrochemical cell including a first electrode in which a layer including the metal compound is formed on a current collector, a second electrode formed of metallic lithium, a separator positioned between the first electrode and the second electrode, and an electrolyte; and b) performing lithiation by applying a constant current and a cut-off voltage of from more than 0 V to about 3 V or less or from more than 0 V to less than about 3 V using the prepared electrochemical cell.

In an exemplary embodiment of the present disclosure, the electrochemical cell in the step a) may correspond to a conventional lithium half-cell including a metal compound-containing particle as an active material, and the lithiation in the step b) may correspond to a constant current discharge in the conventional lithium half-cell. Therefore, the cut-off voltage may be based on a potential referenced to $Li/Li^+$. Accordingly, since the electrochemical cell in the step a) corresponds to a lithium half-cell, the first electrode may be prepared by a method of preparing an electrode for a conventional lithium secondary cell by using the metal compound-containing particle on the current collector as an active material.

In an exemplary embodiment of the present disclosure, the first electrode may be prepared by coating and drying a slurry including the metal compound-containing particle and an organic binder on the current collector. The organic binder may use any material as long as it has been typically used in an electrode for a lithium secondary cell and may be a polymer which does not chemically react with a liquid electrolyte. For example, the organic binder may be selected from the group consisting of polyvinylidene fluoride, a polyvinylidene fluoride-hexafluoropropylene copolymer, a polyvinylidene fluoride-trichloroethylene copolymer, polymethylmethacrylate, polyacrylonitrile, polyvinylpyrrolidone, polyvinylacetate, a polyethylene-vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, a styrene-butadiene copolymer, an acrylonitrile-styrene-butadiene copolymer, polyimide, polytetrafluoroethylene, and combinations thereof, but may not be limited thereto. Further, the current collector may be formed of a conductive material such as graphite, graphene, titanium, copper, platinum, aluminum, nickel, silver, gold, and the like, but may not be limited thereto.

In an exemplary embodiment of the present disclosure, the second electrode may be a film or foil of metallic lithium, but may not be limited thereto. Further, the separator may use any microporous membrane used for the conventional lithium secondary cell.

In an exemplary embodiment of the present disclosure, the electrolyte may use, without limitation, any conventional non-aqueous electrolyte that readily conducts lithium ions in a conventional lithium secondary cell. For example, the non-aqueous electrolyte may contain a non-aqueous solvent and a lithium salt, and the lithium salt contained in the electrolyte may include a salt that supplies a lithium cation and one or more anions selected from $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5$ $PF^-$, $(CF_3)_6P^-$, $CF_3CO_2^-$, $CH_3CO_2^-$, $SCN^-$, $(CF_3CF_2SO_2)_2 N^-$, and the like, but may not be limited thereto.

In an exemplary embodiment of the present disclosure, the solvent in the electrolyte may use any solvent without limitation as long as it has been typically used as a non-aqueous liquid electrolyte in a lithium secondary cell. For example, the solvent may be selected from the group consisting of carbonate-based solvents such as ethylene carbonate, propylene carbonate, 1,2-butylene carbonate, 2,3-butylene carbonate, 1,2-pentylene carbonate, 2,3-pentylene carbonate, vinylene carbonate, dimethyl carbonate, and diethyl carbonate, formate-based solvents such as methyl formate, ethyl formate, propyl formate, and butyl formate, ether-based solvents such as dimethyl ether, diethyl ether, dipropyl ether, and methyl ethyl ether, acetate-based solvents such as methyl acetate, ethyl acetate, and propyl acetate, γ-butyrolactone, 2-methyl-γ-butyrolactone, 3-methyl-γ-butyrolactone, and combinations thereof, but may not be limited thereto.

In an exemplary embodiment of the present disclosure, the step b) may be lithiation of the metal compound-containing particle using the prepared electrochemical cell. Specifically, the lithiation in the step b) may be the lithiation under conditions of a constant current and a cut-off voltage of from more than 0 V to about 3 V or less or from more than 0 V to less than about 3 V using the prepared electrochemical cell.

In an exemplary embodiment of the present disclosure, in the lithiation under the constant current condition, it is advantageous to perform low-current lithiation in order to perform uniform lithiation to the entire surface of the metal compound-containing particle and suppress desorption and removal of a reduced metal from the nanoparticle surface by rapid and partial lithiation and in order to ensure atomic-scale gaps to have a narrow size distribution. Specifically, for example, a current during the low-current lithiation may be desirably from about 1 mA/g to about 20 mA/g (amount of current per 1 g of metal oxide nanoparticles).

In an exemplary embodiment of the present disclosure, after the lithiation in the step b) is performed, recovering the lithiated nanoparticles from the first electrode may be further performed. The recovery may be performed using a solvent that dissolves the organic binder of the first electrode and a solid-liquid separation, but may not be limited thereto.

In an exemplary embodiment of the present disclosure, the delithiation may be performed through acid-washing, and an acid for the acid-washing may use, without limitation, any typical acid used for selectively removing lithium oxide and/or lithium, but may not be limited thereto. For example, the acid may be formic acid or acetic acid, but the kind of the acid used for the acid-washing may not be limited thereto.

In an exemplary embodiment of the present disclosure, the width of the at least one atomic-scale channel may be controlled to less than about 1 nm. For example, the width of the at least one atomic-scale channel may be controlled to less than about 1 nm, about 9 Å or less, about 8 Å or less, about 7 Å or less, about 6 Å or less, about 5 Å or less, about 4 Å or less, about 3 Å or less, or about 2 Å or less, but may not be limited thereto. Further, the width of the at least one atomic-scale channel may be controlled to about 7 Å or less.

In an exemplary embodiment of the present disclosure, the width of the at least one atomic-scale channel may be from about 1 Å or more to less than about 1 nm, but may not be limited thereto. For example, the width of the at least one atomic-scale channel may be from about 1 Å or more to less than about 1 nm, from about 1 Å or more to about 9 Å or less, from about 1 Å or more to about 8 Å or less, from about 1 Å or more to about 7 Å or less, from about 1 Å or more to about 6 Å or less, from about 1 Å or more to about 5 Å or less, from about 1 Å or more to about 4 Å or less, from about 1 Å or more to about 3 Å or less, from about 1 Å or more to about 2 Å or less, from about 2 Å or more to less than about 1 nm, from about 2 Å or more to about 9 Å or less, from about 2 Å or more to about 8 Å or less, from about 2 Å or more to about 7 Å or less, from about 2 Å or more to about 6 Å or less, from about 2 Å or more to about 5 Å or less, from about 2 Å or more to about 4 Å or less, from about 2 Å or more to about 3 Å or less, from about 3 Å or more to less than about 1 nm, from about 3 Å or more to about 9 Å or less, from about 3 Å or more to about 8 Å or less, from about 3 Å or more to about 7 Å or less, from about 3 Å or more to about 6 Å or less, from about 3 Å or more to about 5 Å or less, from about 3 Å or more to about 4 Å or less, from about 4 Å or more to less than about 1 nm, from about 4 Å or more to about 9 Å or less, from about 4 Å or more to about 8 Å or less, from about 4 Å or more to about 7 Å or less, from about 4 Å or more to about 6 Å or less, from about 4 Å or more to about 5 Å or less, from about 5 Å or more to less than about 1 nm, from about 5 Å or more to about 9 Å or less, from about 5 Å or more to about 8 Å or less, from about 5 Å or more to about 7 Å or less, from about 5 Å or more to about 6 Å or less, from about 6 Å or more to less than about 1 nm, from about 6 Å or more to about 9 Å or less, from about 6 Å or more to about 8 Å or less, from about 6 Å or more to about 7 Å or less, from about 7 Å or more to less than about 1 nm, from about 7 Å or more to about 9 Å or less, from about 7 Å or more to about 8 Å or less, from about 8 Å or more to less than about 1 nm, from about 8 Å or more to about 9 Å or less, or from about 9 Å or more to less than about 1 nm, but may not be limited thereto. Further, for example, the width of the at least one atomic-scale channel may be from about 5 Å or more to about 6 Å or less.

In an exemplary embodiment of the present disclosure, the metal compound may be a compound including one or at least two metal elements selected from the group consisting of Mg, Al, Au, Ag, Cd, Co, Cr, Cu, In, Ir, Mo, Nb, Ni, Os, Pd, Pt, Rh, Ru, Sn, Ti, V, W, Zn, Sc, Y, Zr, Hf, Ta, Mn, Fe, Tc, and Re, but may not be limited thereto. In an exemplary embodiment of the present disclosure, the metal may be used without limitation as long as it has a standard reduction potential higher than that of lithium, but may not be limited thereto.

In an exemplary embodiment of the present disclosure, the metal compound may include an oxide of one or at least two metals selected from the group consisting of Mg, Al, Au, Ag, Cd, Co, Cr, Cu, In, Ir, Mo, Nb, Ni, Os, Pd, Pt, Rh, Ru, Sn, Ti, V, W, Zn, Sc, Y, Zr, Hf, Ta, Mn, Fe, Tc, and Re.

In an exemplary embodiment of the present disclosure, the reduced metal may include one or at least two metals selected from the group consisting of Mg, Al, Au, Ag, Cd, Co, Cr, Cu, In, Ir, Mo, Nb, Ni, Os, Pd, Pt, Rh, Ru, Sn, Ti, V, W, Zn, Sc, Y, Zr, Hf, Ta, Mn, Fe, Tc, and Re, but may not be limited thereto. In an exemplary embodiment of the present disclosure, the metal may be used without limitation as long as it has a standard reduction potential higher than that of lithium, but may not be limited thereto.

In an exemplary embodiment of the present disclosure, an average diameter of the particle is not particularly limited. For example, the particle may have an average diameter of from nanometer scale to micrometer scale, but may not be limited thereto. For example, the average diameter of the particle may be about 10 µm or less, about 1 µm or less, about 500 nm or less, about 300 nm or less, about 100 nm or less, from about 30 nm to about 500 nm, from about 30 nm to about 400 nm, from about 30 nm to about 300 nm, from about 30 nm to about 200 nm, from about 30 nm to about 100 nm, from about 30 nm to about 80 nm, from about 30 nm to about 60 nm, from about 30 nm to about 50 nm, from about 50 nm to about 500 nm, from about 50 nm to about 400 nm, from about 50 nm to about 300 nm, from about 50 nm to about 200 nm, from about 50 nm to about 100 nm, from about 50 nm to about 80 nm, from about 50 nm to about 60 nm, from about 60 nm to about 500 nm, from about 60 nm to about 400 nm, from about 60 nm to about 300 nm, from about 60 nm to about 200 nm, from about 60 nm to about 100 nm, from about 60 nm to about 80 nm, from about 80 nm to about 500 nm, from about 80 nm to about 400 nm, from about 80 nm to about 300 nm, from about 80 nm to about 200 nm, or from about 80 nm to about 100 nm, but may not be limited thereto.

In an exemplary embodiment of the present disclosure, a volume density of the at least one atomic-scale channel may be in a range of a ratio of from about 0.01 to about 0.2 per unit volume of the particle, but may not be limited thereto. the volume density of the at least one atomic-scale channel may be in a range of a ratio of from about 0.01 to about 0.2, from about 0.01 to about 0.15, from about 0.01 to about 0.1, from about 0.01 to about 0.08, from about 0.01 to about 0.06, from about 0.01 to about 0.04, from about 0.01 to about 0.02, from about 0.02 to about 0.2, from about 0.02 to about 0.15, from about 0.02 to about 0.1, from about 0.02 to about 0.08, from about 0.02 to about 0.06, from about 0.02 to about 0.04, from about 0.04 to about 0.2, from about 0.04 to about 0.15, from about 0.04 to about 0.1, from about 0.04 to about 0.08, from about 0.04 to about 0.06, from about 0.06 to about 0.2, from about 0.06 to about 0.15, from about 0.06 to about 0.1, from about 0.06 to about 0.08, from about 0.08 to about 0.2, from about 0.08 to about 0.15, or from about 0.08 to about 0.1 per unit volume of the particle, but may not be limited thereto.

Hereinafter, example embodiments are described in more detail by using Examples, but the present disclosure may not limited to the Examples.

EXAMPLES

1. Methods (1) Density Functional Theory (DFT) Calculations

All the DFT calculations using the slab models were performed using the dispersion-corrected PBE-D2 functional and the projector augmented wave pseudopotentials with a 400 eV cut-off basis set, as implemented in the Vienna Ab-initio Simulation Package (VASP). To accelerate the convergence for energies using self-consistent field (SCF) iterations, the Gaussian-smearing technique (smearing temperatures $k_BT=0.1$ eV for slabs and 0.01 eV for molecules) was employed, after which all calculated energy values were extrapolated to $k_BT=0$. The reciprocal space for the slab was sampled by a Monkhorst-Pack k-point net of 3×3×1, whereas only the gamma point was sampled for the molecular calculations. The models were prepared from a face-centred cubic copper bulk structure with a lattice parameter of 3.615 Å. To prevent interactions between the periodic replicas along the z-direction, a vacuum separation of at least 15 Å between adjacent images was used for the slab calculations and a 20 Å×20 Å×20 Å box was used for the molecular calculations. Spin-polarized wave functions were also used for all the surface calculations, whereas spin-restricted wave functions were used for $H_2$, $H_2O$, and $CO_2$.

During the geometry optimization, the copper atoms in the top layer of the upper surface and those in the bottom layer of the lower surface were fixed. Although in the initial structure the distance of d between the two surfaces is set to be a target value, it would be slightly different from the value by less than 0.2 Å after optimization, depending on the identity of the adsorbate. The energetics reported here are based on electronic energies. For example, the binding energy of *COOH is given by BE (*COOH)=E (*COOH)−E (*)−E ($CO_2$)−0.5×E ($H_2$). Therefore, a more negative value of BE denotes the stronger adsorption.

(2) Preparation of Copper Oxide Particle with the Controlled Width of Atomic-Scale Channels $CuO_x$ (EPRUI Nanoparticles & Microspheres Co. Ltd.) was cleaned by annealing under argon at 150° C. for 3 h before the experiments. The lithiated $CuO_x$ nanoparticles were prepared using the following procedures described in our previous work. At first, $CuO_x$ nanoparticles were mixed with 5 wt % polyvinylidene fluoride (PVDF) dispersed in N-methyl-2-pyrrolidinone (NMP). Next, the black slurry was uniformly coated onto a Cu foil and dried overnight in a vacuum oven at 80° C. A coin-type cell with the Li foil as the counter electrode and 1 M $LiPF_6$ dissolved in a mixture of ethyl carbonate (EC) and diethyl carbonate (DEC) as the electrolyte (1/1=v/v) were used for the electrochemical lithiation. The test cells with nanomaterials were assembled with a separator (Celgard) and an electrolyte solution in an Ar-filled glove box. The lithiation process was monitored using a VSP potentiostat (Bio-logic) to maintain the static current of 10 mA $g^{-1}$. After the lithiation process is carried out, the resulting samples produced at each process step were washed with acetone, water, and 1 mM acetic acid solution to remove residual electrolytes, $Li_2O$, and solid electrolyte interlayers.

(3) Operando Analysis

The electrochemical cell was prepared with the three electrodes, electrolyte, $CO_2$ gas bubbling, and polyimide window. The samples were casted on the PTFE coated carbon papers with a 5 wt % of Nafion binder and applied −0.9 V vs. RHE under $CO_2$ bubbling after 2 times linear sweep voltammetry. During CO2RR, operando X-ray absorption spectroscopy (XAS) analyses including the XANES and the EXAFS measurements were performed at 10C beam line, where a Si(111) double crystal monochromator was used for the synchrotron radiation and Cu K-edge spectra obtained in the transmission mode were analyzed using the Athena software with the IFEFFIT library.

(4) Measurements of the Electrochemical Reduction of $CO_2$

Lithiated $Cu_2O$ nanoparticles were spin coated onto a glassy carbon substrate, which was then used as the cathode for electroreduction of $CO_2$ in a 0.1 M $CsHCO_3$ solution. The reason for using $Cs^+$ cations is described elsewhere. The electrolyte was first sparged with $CO_2$ to attain a pH of 6.8. Electrochemical measurements were conducted using a Bio-logic SP-300 potentiostat. Ambient-pressure $CO_2$ electrolysis was carried out in a custom-made, gas-tight electrochemical cell made of polycarbonate and fitted with Viton O-rings. The configuration of the electrochemical cell is such that the working electrode is parallel to the counter electrode (platinum foil) to ensure a uniform potential distribution across the surface. The geometric surface area for both of the electrodes was 1 $cm^2$. The average mass loading of samples on working electrode is 80 μL (equal to ~10 μg $cm^{-2}$), which was measured using a XP2U ultra-microbalance (d=0.1 μg, Mettler Toledo). In order to optimize the catalytic activity, mass loading of catalyst solutions was controlled from 50 to 150 μL. A Selemion AMV anion-exchange membrane (110 μm thick) was used to separate the anodic and cathodic compartments. Each of the compartments in this cell contained a small volume of electrolyte (1.3 mL each) to concentrate the liquid products and, therefore, increase the detection limits. The headspace of the cathodic compartment was approximately 3 mL. Before conducting electrolysis of $CO_2$, the electrolyte in the cathodic compartments was purged with $CO_2$ for at least 15 min. During electrolysis, $CO_2$ was bubbled through the electrolyte at a flow rate of 5 sccm to prevent $CO_2$ depletion. The flow rate of $CO_2$ was controlled with a mass flow controller (Alicat Scientific), and the gas was first humidified with water by passing it through a water-filled bubbler to minimize evaporation of the electrolyte. For all experiments, a platinum foil was used as the counter electrode and an Ag/AgCl electrode (leak free series) from Innovative Instruments, Inc. was used as the reference electrode. Data were converted to the RHE reference scale using the following equation of E vs. RHE=E vs. Ag/AgCl+0.197 V+0.0591×pH To ensure the accuracy of the reference electrodes, calibration was performed with a homemade, reversible hydrogen electrode. Prior to any electrolysis, the solution resistance was first determined using electrochemical impedance spectroscopy by scanning from 1 MHz to 10 Hz. For all reported CVs and electrolysis, measurements were made with the potentiostat set to compensate for 85% of the measured IR drop.

2. Results

The inventors demonstrate here based on density functional theory (DFT) calculations and experimental measurements that atomic-level control of particle interspacing can be used to influence the activity and selectivity of Cu nanoparticles for the electrochemical CO2RR. DFT calculations of the binding energy of intermediates involved in CO2RR on Cu(100) and Cu(111) surfaces are found to depend on the atomic-scale spacing, $d_s$, between such surfaces. When $d_s$=5-6 Å, the binding energies for adsorbed intermediates, such as *COOH, *CO, *CHO, and *CHOH, reach a maximum and the formation of C—C bonds via the reactions *CHO+*CO→*CHOCO and *CHO+*CHO→*CHOCHO is highly favored. Since *CHOCO and *CHOCHO are precursors to ethylene and ethanol, these calculations suggest that the rates of formation of these products will be maximized for $d_s$=5-6 Å. Motivated by these findings, atomic-scale spaces between Cu particles were created by subjecting $CuO_x$ nanoparticles to electrochemical lithiation followed by removal of the lithium oxide deposited and electrochemical reduction of $CuO_x$ to Cu. Analysis of TEM images confirmed that lithiation produced the desired interparticle spacings, and operando X-ray absorption near edge structure (XANES) and extended X-ray absorption fine structure (EXAFS) spectra demonstrated that all the oxidized Cu states are reduced to the metallic phase during CO2RR. Particles having inter-particle spacing of 5-6 Å exhibit a significantly higher current density and an FE of nearly 80% to $C_{2+}$ products, higher than that reported for unmodified $CuO_x$-derived Cu. our theoretical and experimental investigations strongly support the conclusion that atomic-level control of inter-particle spacing favorably influences the activity and selectivity of Cu nanoparticles for the electrochemical CO2RR.

(1) Density Functional Theory Calculations

DFT calculations of the binding energies for various species hypothesized to be involved in both the CO2RR and the hydrogen evolution reaction (HER) were carried out with the aim of identifying the effects of atomic-scale spacing between Cu surfaces on the electrochemical reduction of $CO_2$. Copper nanoparticles with different atomic-scale spaces between them were simulated using a model consisting of two three-layer Cu (100) and Cu (111) (3×3) slabs, where the surfaces are separated by the distance $d_s$ (FIG. 1a, example of Cu nanoparticle having atomic-scale spaces and model of atomic-scale space Cu surface for DFT calculations). These calculations were carried out assuming a vacuum above the Cu surfaces and the effect of the electrode potential was taken into account using the hydrogen potential electrode method.

Figure 1B:
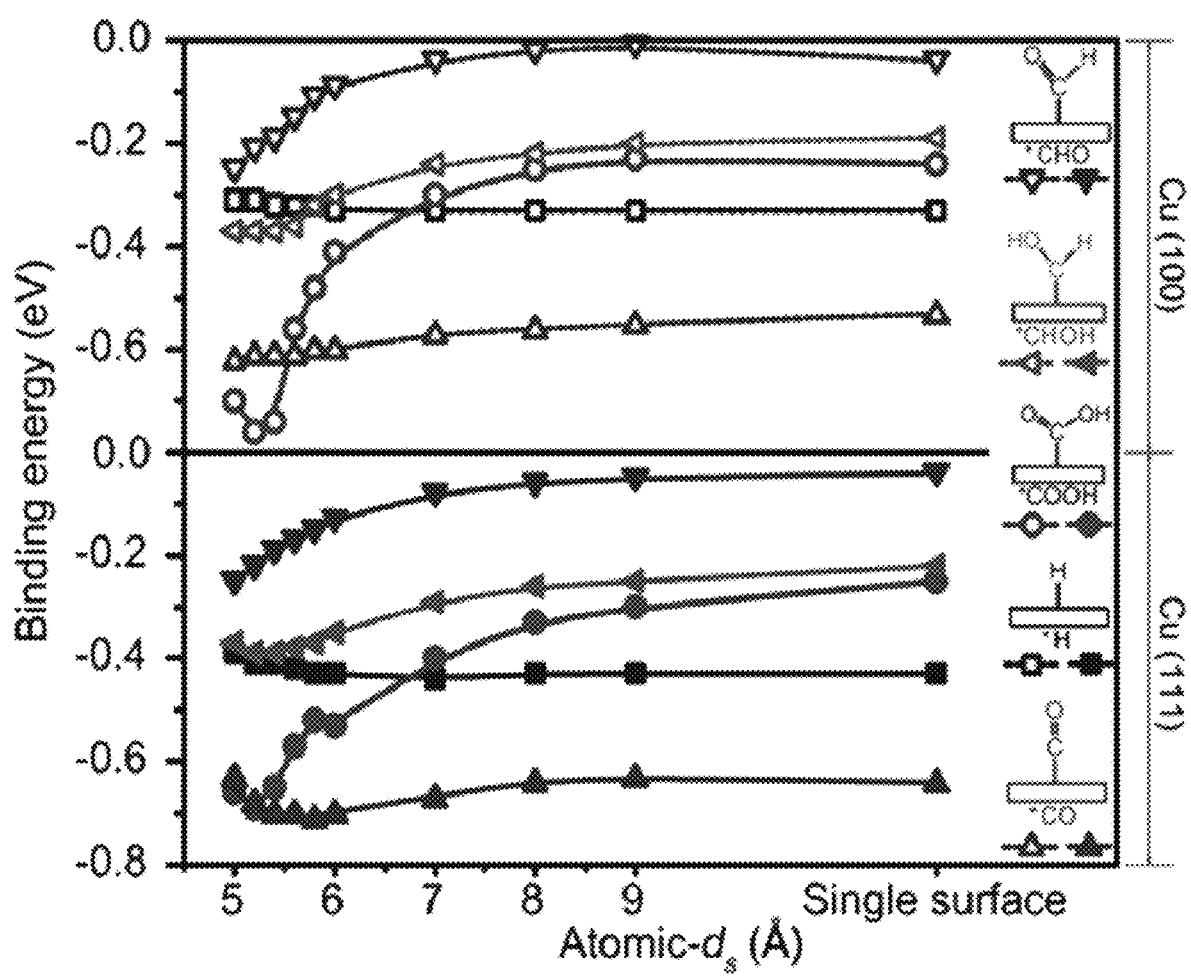
Figure 1C:
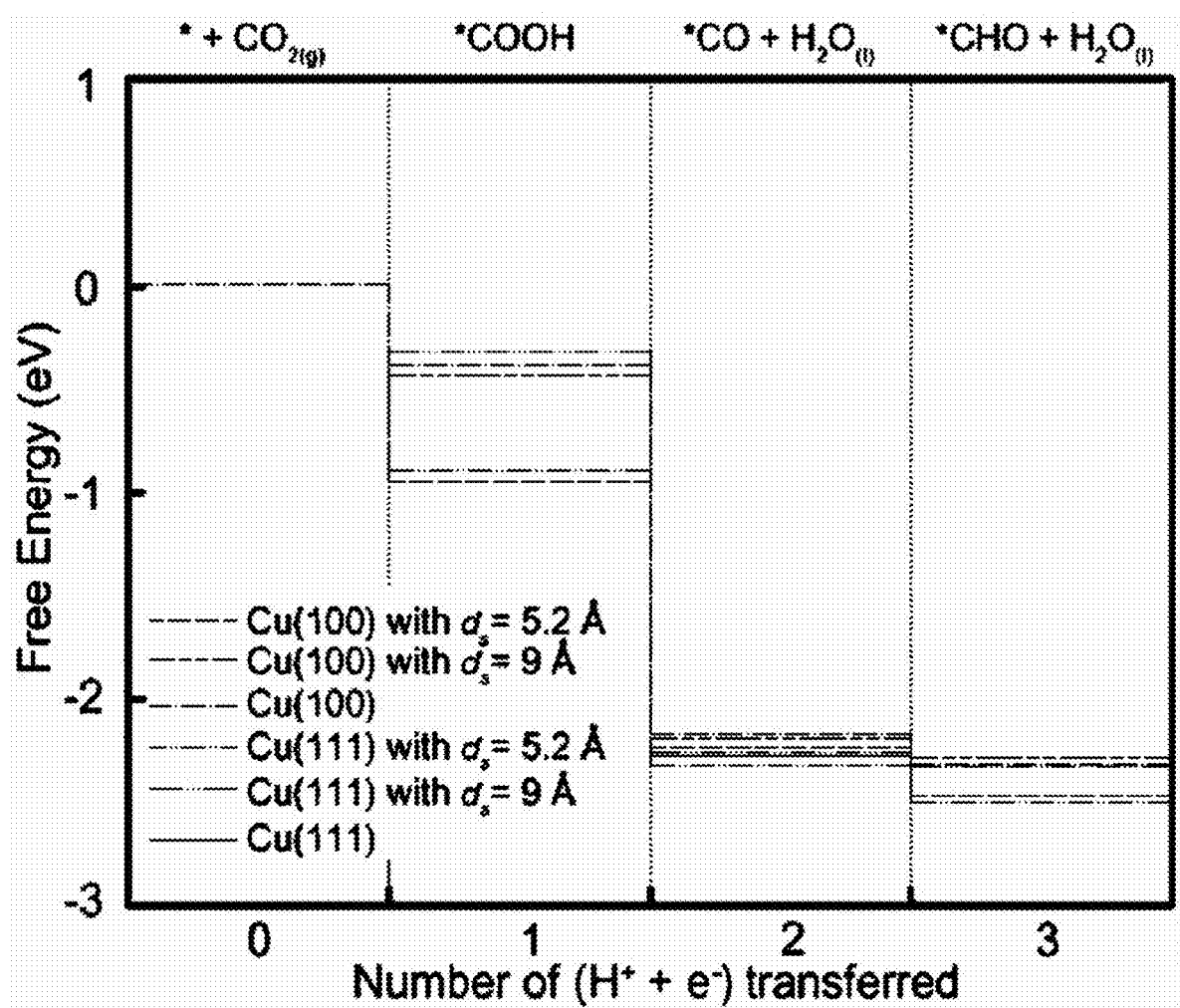

The binding energies (BEs) for *COOH, *CO, *CHO, *CHOH, and *H, which are adsorbed species thought to be involved in the CO2RR and the HER, were determined as a function of $d_s$. As illustrated in FIG. 1b, the BEs of *COOH, *CO, *CHO, and *CHOH strongly depend on $d_s$, whereas the opposite is true for *H. FIG. 1b indicates the trend of binding energies for the intermediates involved in the CO2RR and the HER as a function of the inter-surface distance ($d_s$), the corresponding optimum spacing, and the range for the optimum spacing (grey shaded area, d-range), in which the intermediates bind more strongly than on open Cu (100) and Cu (111) surfaces. The bond strengths for the same intermediates on Cu (100) and Cu (111) surfaces are listed for comparison. For example, the variation of the BE for *COOH is 0.52 and 0.44 eV for Cu(100) and Cu(111), respectively, whereas it is only 0.01 eV for *H. Importantly, the strongest BEs for *COOH, *CO, *CHO, and *CHOH occur for values of $d_s$ between 5.2 Å and 5.8 Å. The changes in BE relative to that for Cu (100) and Cu(111) are −0.52 and −0.44 eV for *COOH, −0.09 and −0.07 eV for *CO, −0.24 and −0.21 eV for *CHO, and −0.18 and −0.17 eV for *CHOH, whereas it is nearly zero for *H. These results suggest that *COOH, *CHO, and *CHOH, in particular, will migrate from open Cu(100) and Cu(111) surfaces towards the spaces between nanoparticles with the optimal value of $d_s$, resulting in increase of the local concentration of those $C_1$ intermediates. Calculation of the free energy surface for an applied bias of U=−0.9 V versus RHE reveals that the reaction sequence *+$CO_2$(g)+3 (H$^+$+e$^-$)→*COOH+2 (H$^+$+e$^-$)→*CO+$H_2O$(l)+(H$^+$+e$^-$)→*CHO is energetically more favorable when the spacing between Cu surfaces is $d_s$=5.2 Å, rather than 9 Å (FIG. 1c, Free energy diagram for the initial three steps of the CO2RR).

Figure 1D:
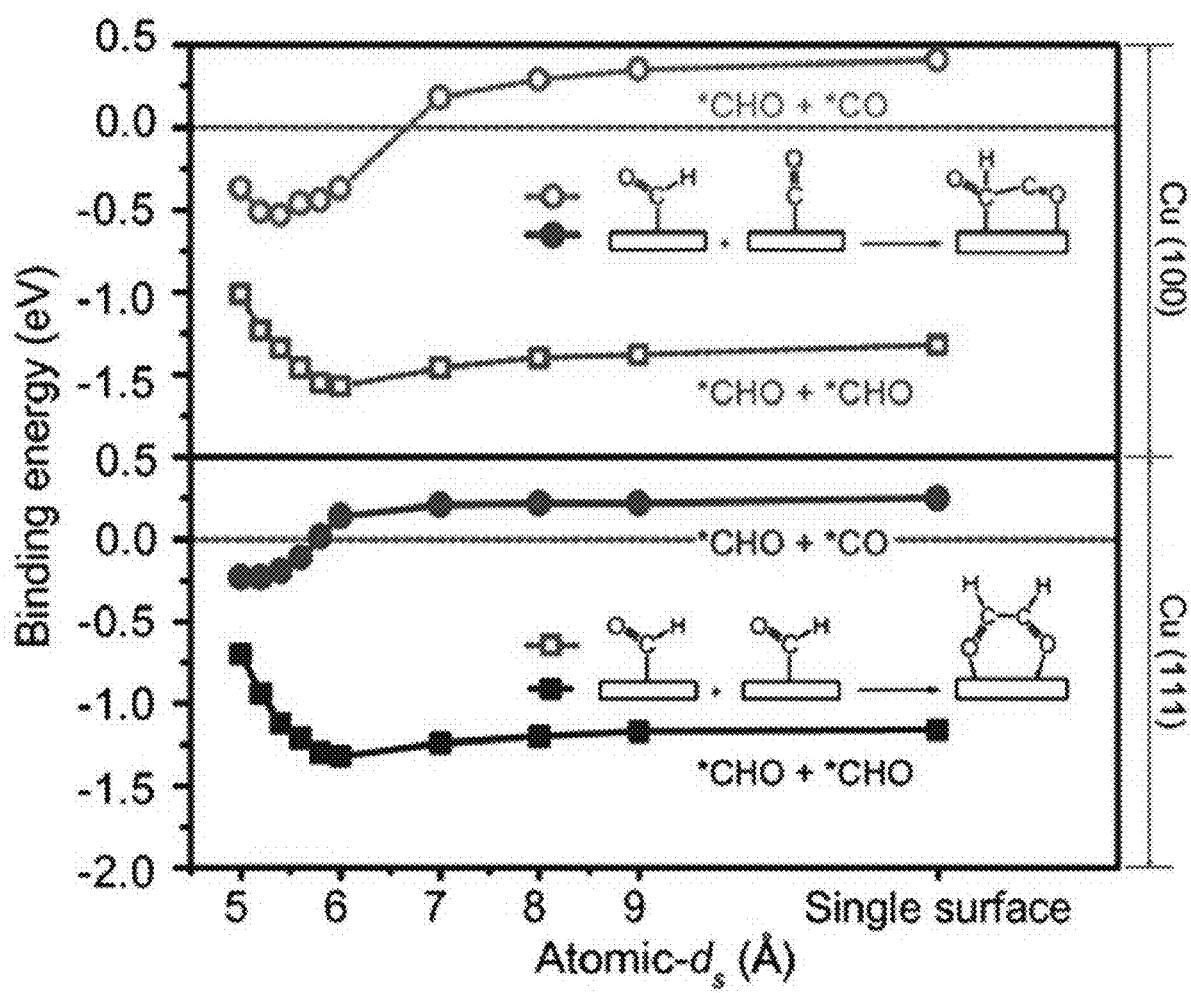
Figure 1E:
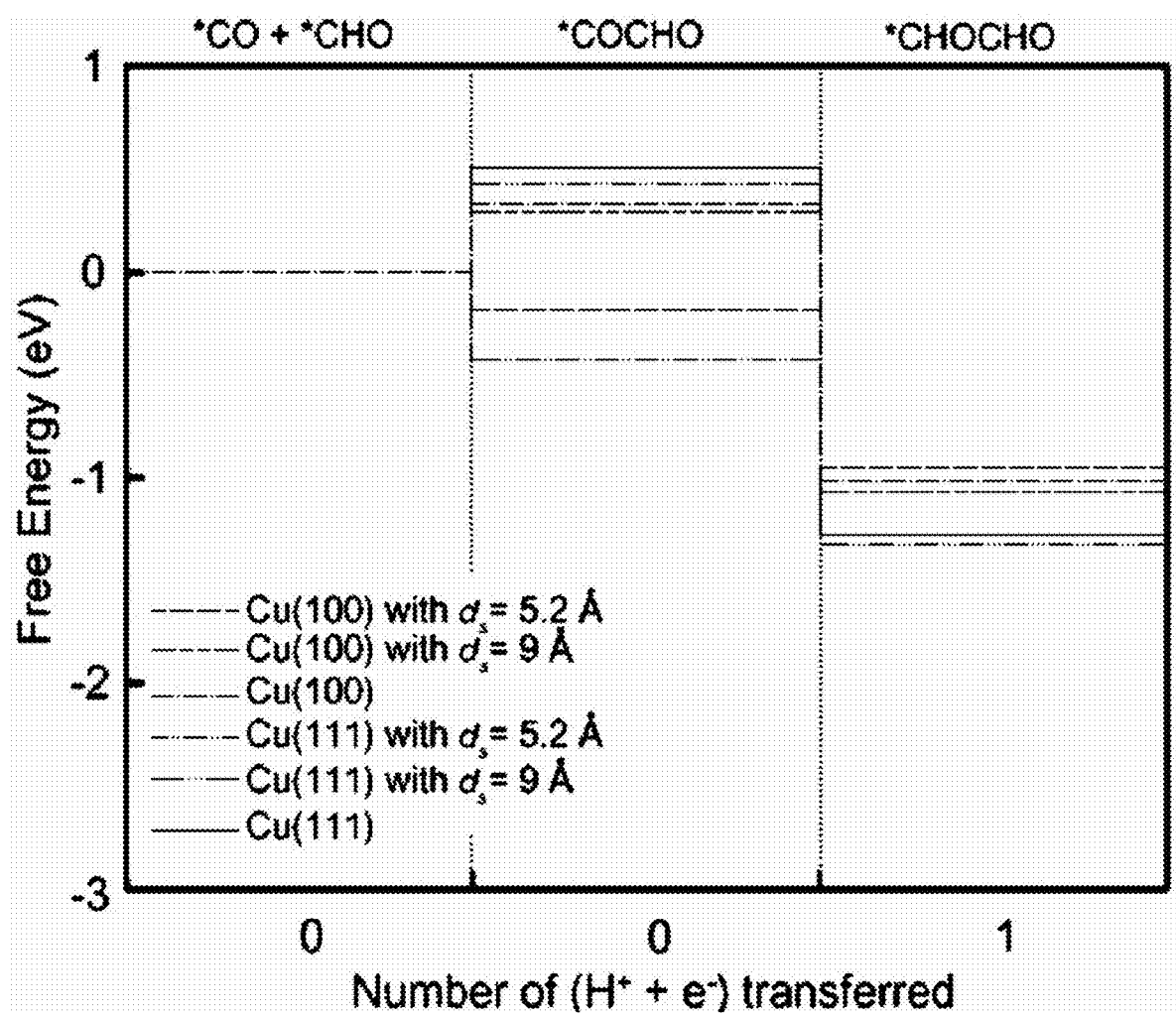

Further, the inventors examined next whether the value of $d_s$ affects the energetics of C—C bond formation. Since *CO and *CHO are the early stage intermediates for CO2RR and therefore their concentrations are expected to be higher than the others, we evaluated the changes of the reaction energies for C—C coupling, *CHO+*CO→*CHOCO. The inventors found that the two reaction energies depend strongly on $d_s$ and that minimum values relative to open Cu(100) and Cu(111) surfaces occur at $d_s$=5.0 and 6.0 Å, respectively (FIG. 1d). It is notable that the minimum reaction energies are more favorable than those for Cu(100) by −0.95 eV and Cu(111) by −0.48 eV, which suggests that Cu nanoparticles with an optimal value of $d_s$ will promote the C—C coupling reaction of *CHO+*CO→*CHOCO. The inventors then calculated the free energy surface for the reaction sequence *CHO+*CO+(H$^+$+e$^-$)→*CHOCO+(H$^+$+e$^-$)→*CHOCHO under an applied bias of −0.9 V versus RHE. The inventors' calculations showed that the first step (C—C coupling) is downhill by −0.43 eV for Cu (100) and −0.19 eV for Cu(111) when $d_s$=5.2 Å, whereas it is uphill by +0.42 eV for Cu (100) and uphill by +0.30 eV for Cu (111) when $d_s$=9 Å [or +0.50 eV for Cu (100) and +0.33 eV for Cu (111)] (FIG. 1e). Since this step does not involve an electron transfer, its energetics are not affected by the applied bias. This finding suggests that the Cu facets with an optimal value of $d_s$=5-6 Å should facilitate C—C bond formation, which is energetically unfavorable on open Cu(100) and Cu(111) surfaces.

To understand why atomic-scale spacing between the Cu(100) and Cu(111) surfaces helps to stabilize adsorbed species, we carried out a Bader analysis of the charge transfer from the two surfaces. The inventors found that the enhancement in adsorption strength for adsorbed species is due to charge transfer from the second layer to the adsorbate. For example, for *CO, the second layer donates 0.15 electron to the adsorbate compared to 0.38 electron from the first layer, and for *CHOCO, the second layer donates 0.65 electron to the adsorbate, which is similar to the amount donated by the first layer (0.60 electron), and as indicated by FIG. 1, optimal stabilization occurs when $d_s$=5 to 6 Å.

Figure 2A:
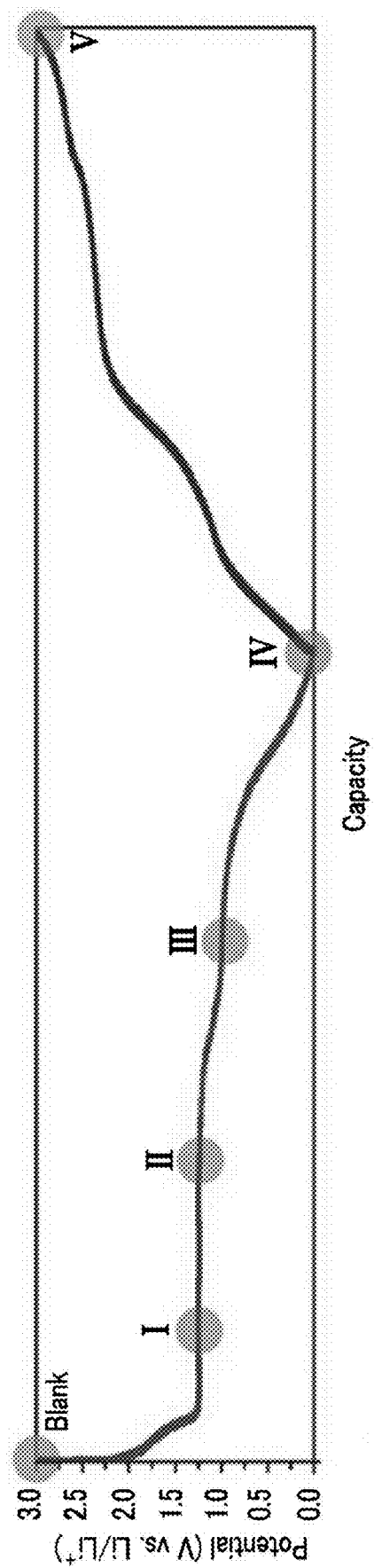
FIGS. 2A, 2B, 2C and 2D are schematic diagrams regarding control of $CuO_x$ nanoparticle structure by electrochemical lithiation according to an example of the present disclosure. Specifically.

(2) Preparation of Copper Oxide Particle with the Controlled Width of Atomic-Scale Channels The theoretical findings shown in FIG. 1 motivated the inventors to investigate the role of atomic-scale inter-particle spacing. The approach that the inventors chose to create such spacings was electrochemical lithiation of $CuO_x$ nanoparticles. This process involves electrochemical reaction of Li$^+$ cations with $CuO_x$, which creates atomic-scale fractures in the particles. $CuO_x$ nanoparticles having an average size of 50 nm were selected for lithiation. As shown in FIG. 2a, the extent of lithiation was controlled by the cell potential used for each step. Discharge was carried out at 1.4, 1.2, 1, and 0 V, and recharge was conducted at 3 V vs. Li/Li$^+$ using a static current of 10 mA g$^{-1}$. The spacing between $CuO_x$ nanoparticles was controlled by halting the lithiation process at designated points in the charge/discharge profile (FIG. 2a). The lithiated particles were then washed with water before being characterized.

Figure 2B:
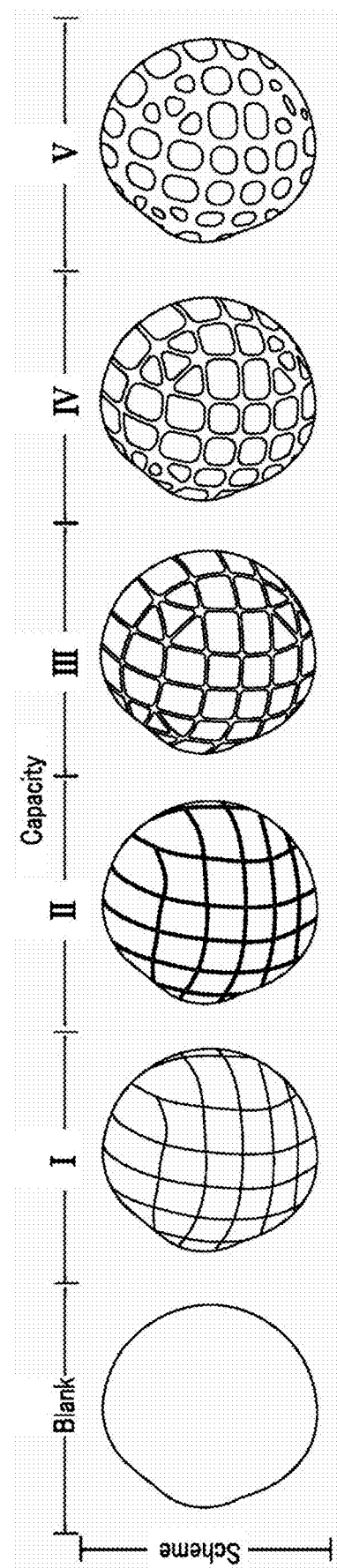
Figure 2C:
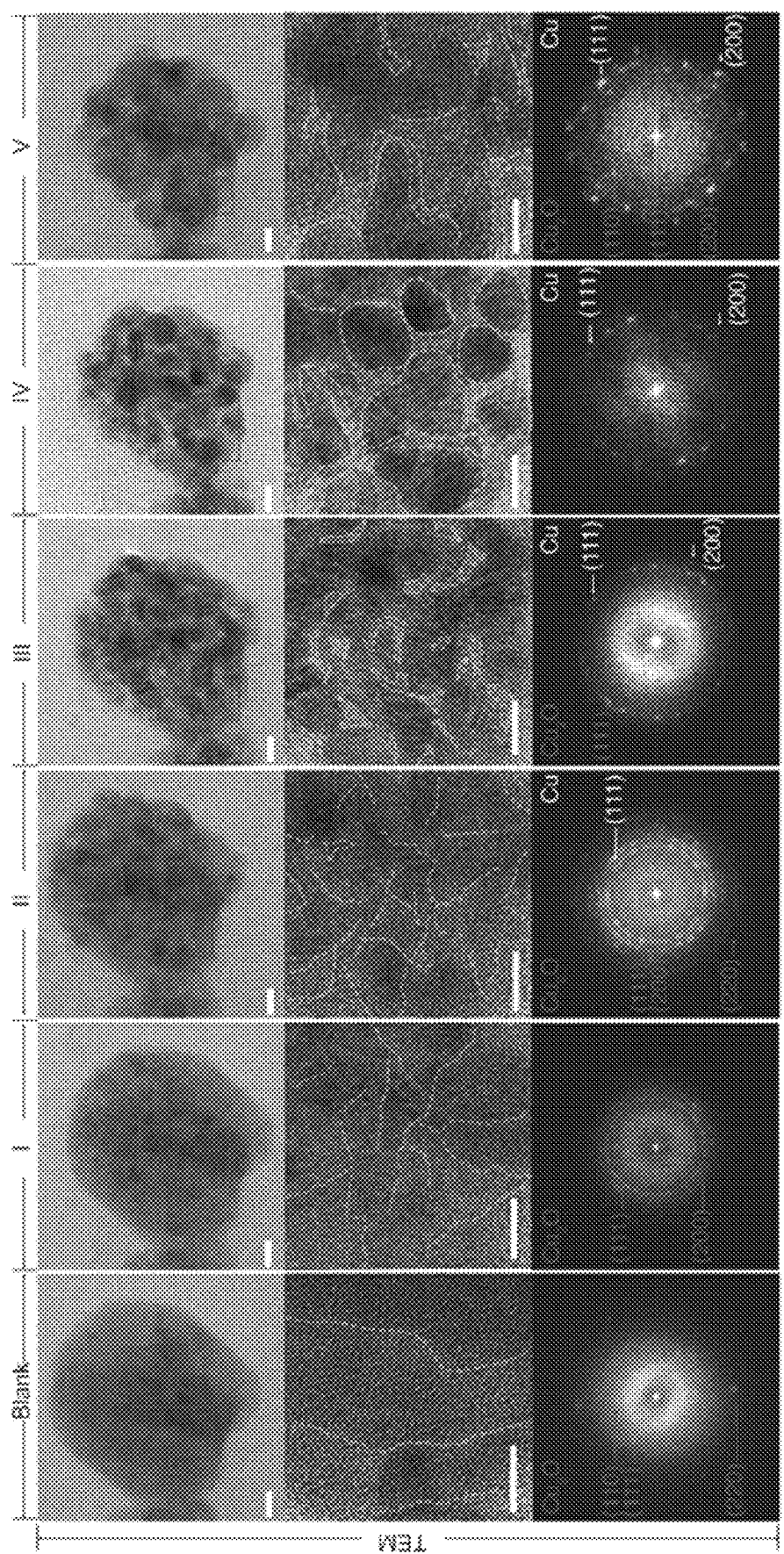
Figure 3:
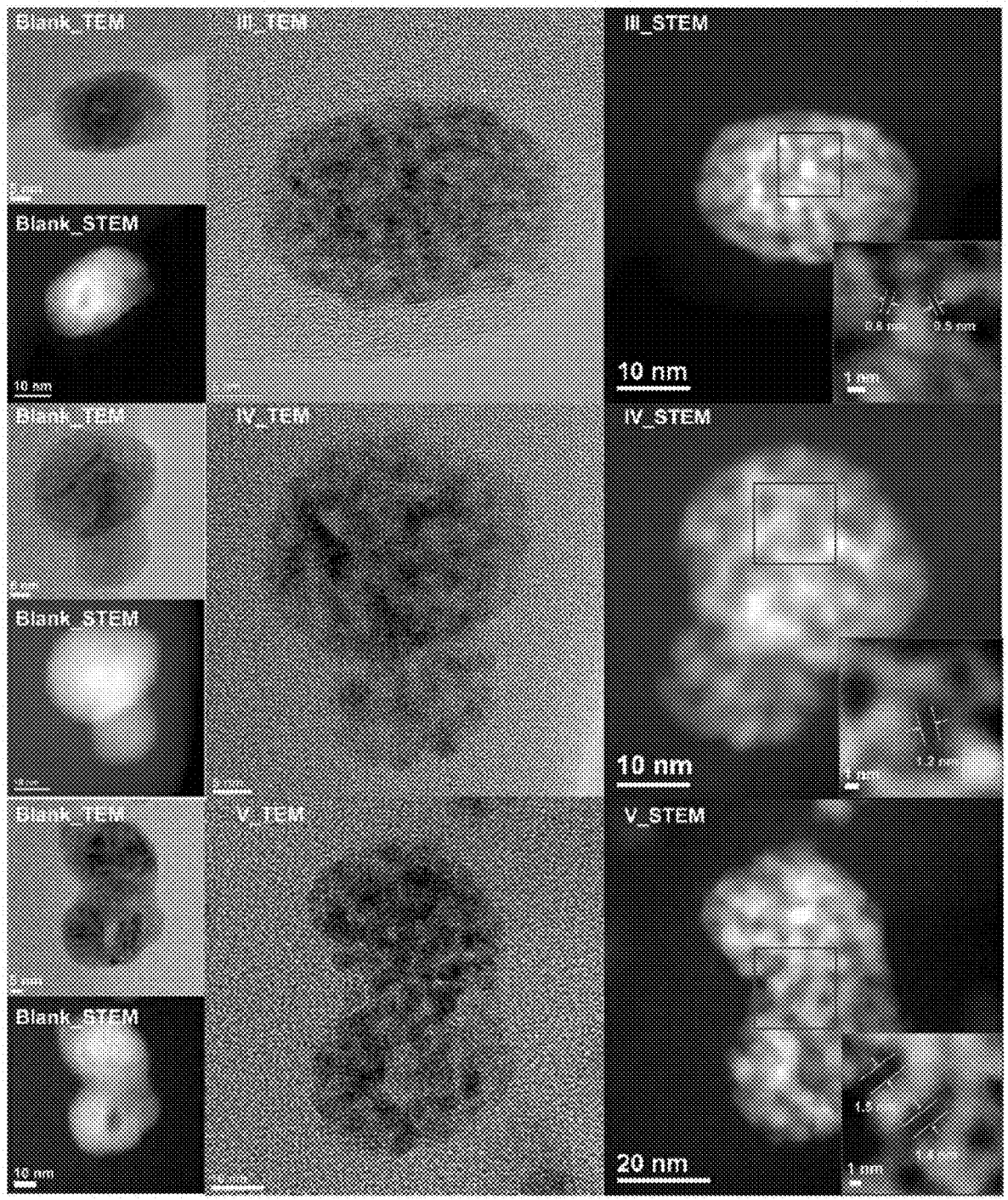
FIG. 3 provides TEM and STEM (scanning transmission electron microscope) images of a $CuO_x$ cluster in steps III, IV, and V according to an example of the present disclosure.
Figure 4:
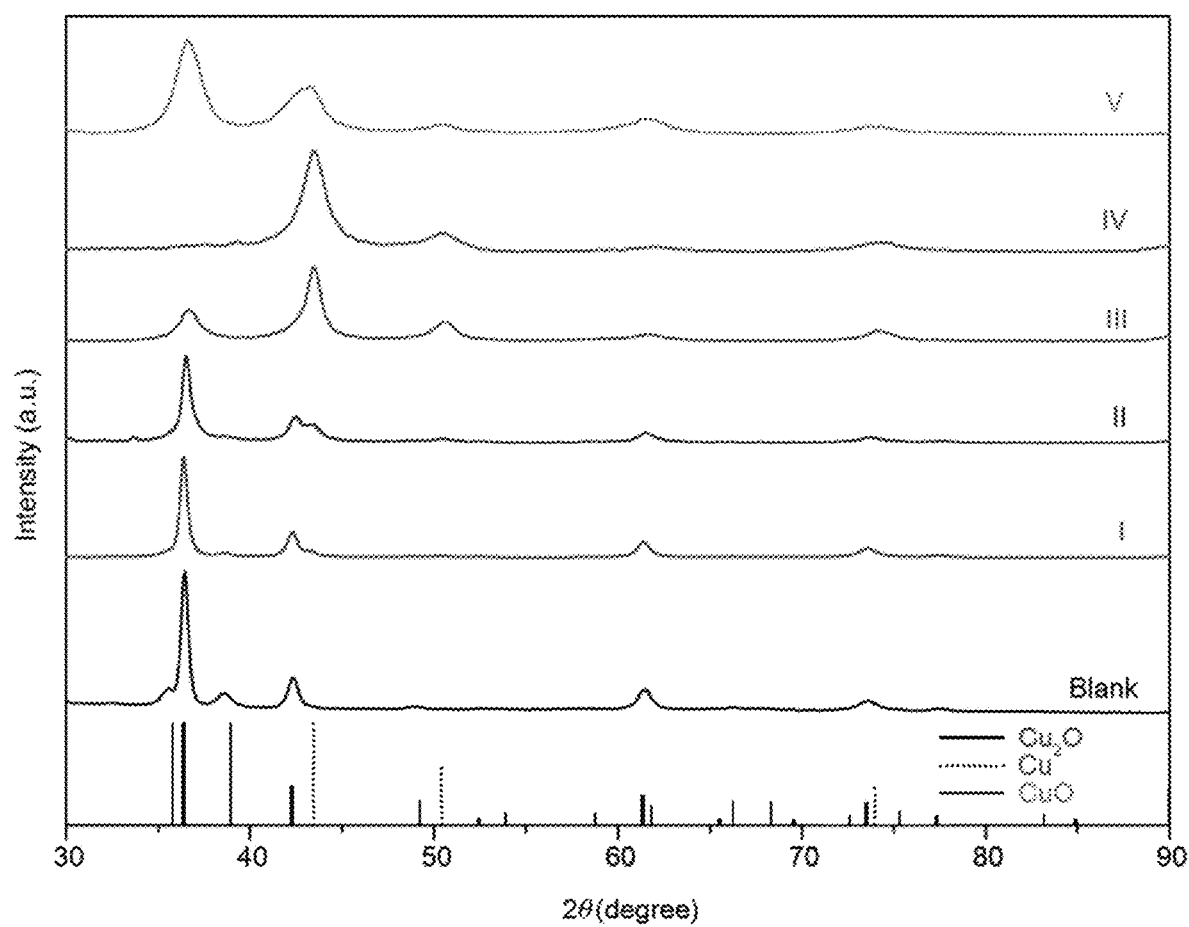
FIG. 4 is spectra illustrating a PXRD (powder X-ray diffraction) pattern obtained after each lithiation step according to an example of the present disclosure.
Figure 5A:
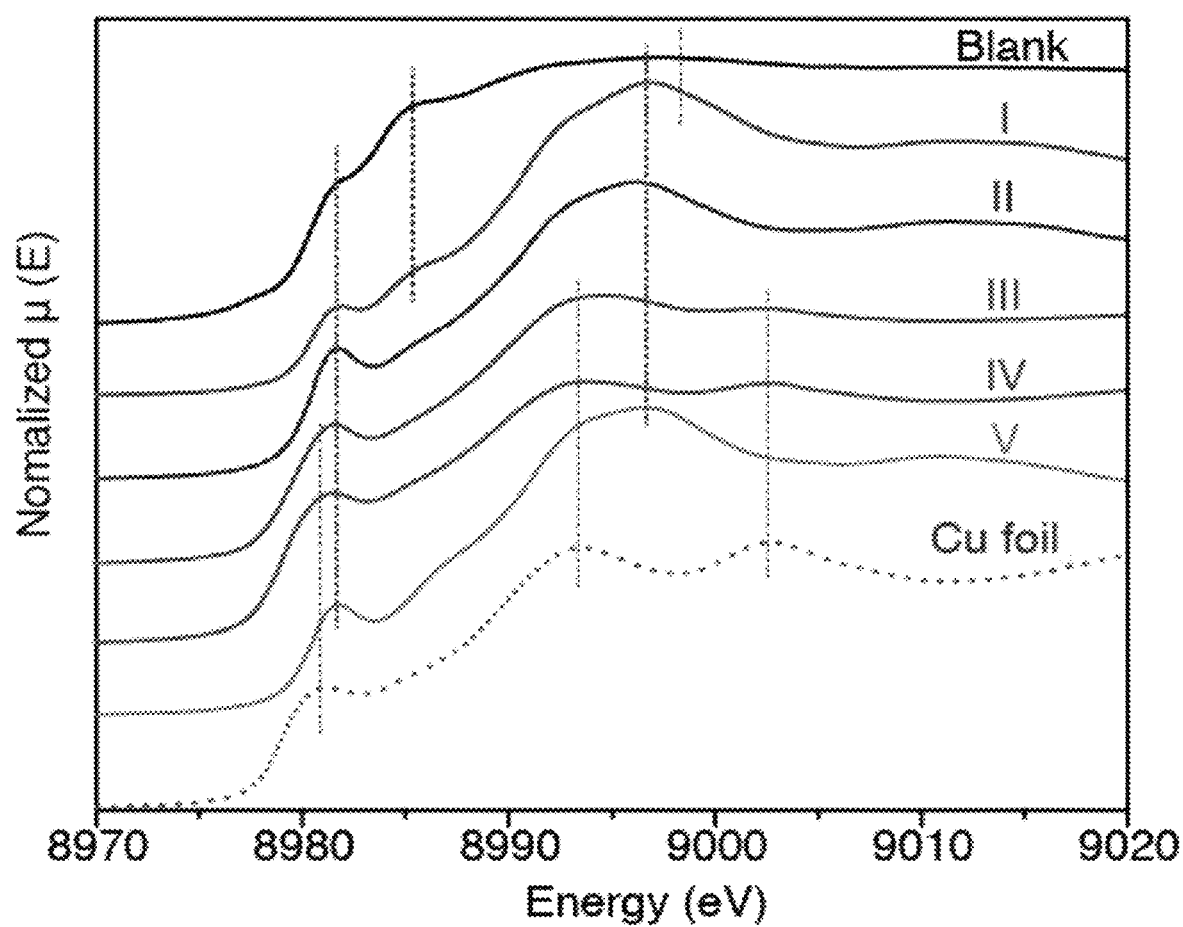
FIGS. 5A and 5B show X-ray absorption spectra of a non-modified (hereinafter, also referred to as "blank") $CuO_x$ particle and the samples processed during the respective steps I to V according to an example of the present disclosure.
Figure 5B:
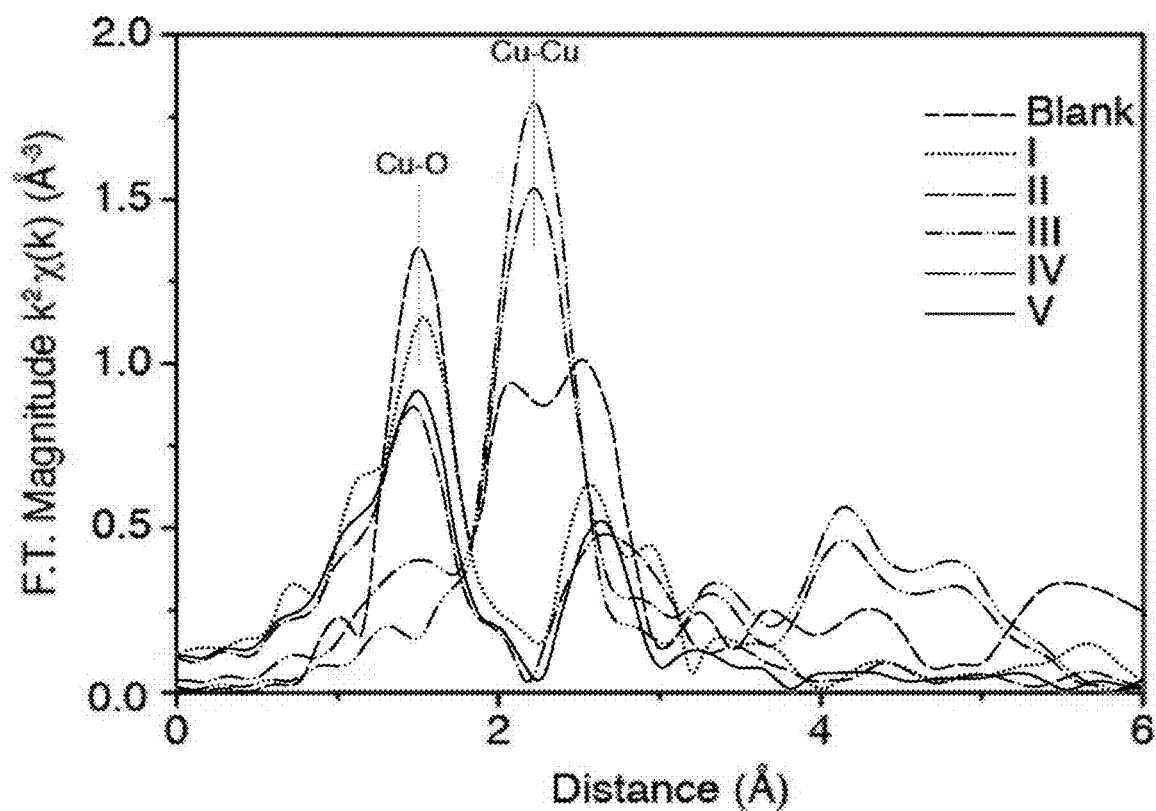
Figure 6A:
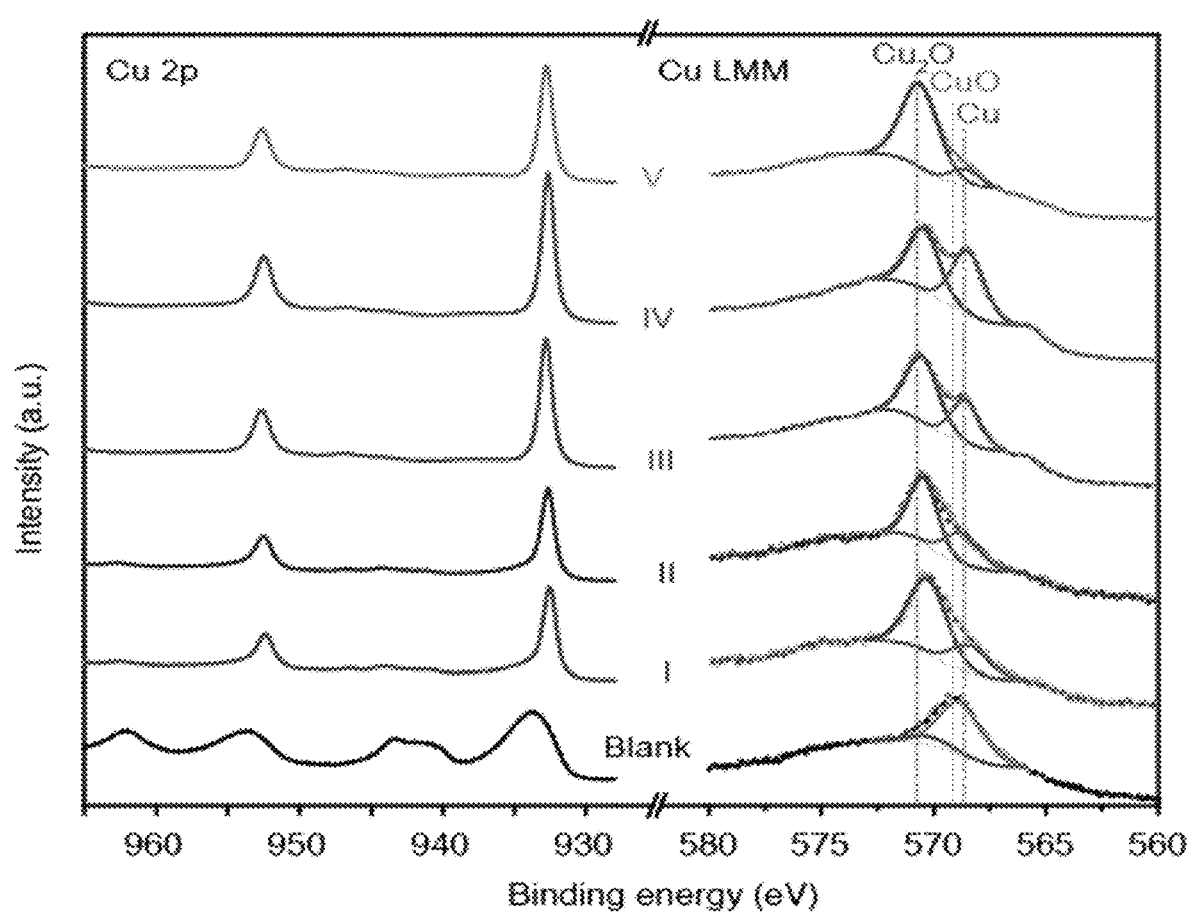
FIGS. 6A and 6B show X-ray photoelectron spectroscopy spectra of the blank $CuO_x$ particle and the samples processed during the respective steps I to V according to an example of the present disclosure.
Figure 6B:
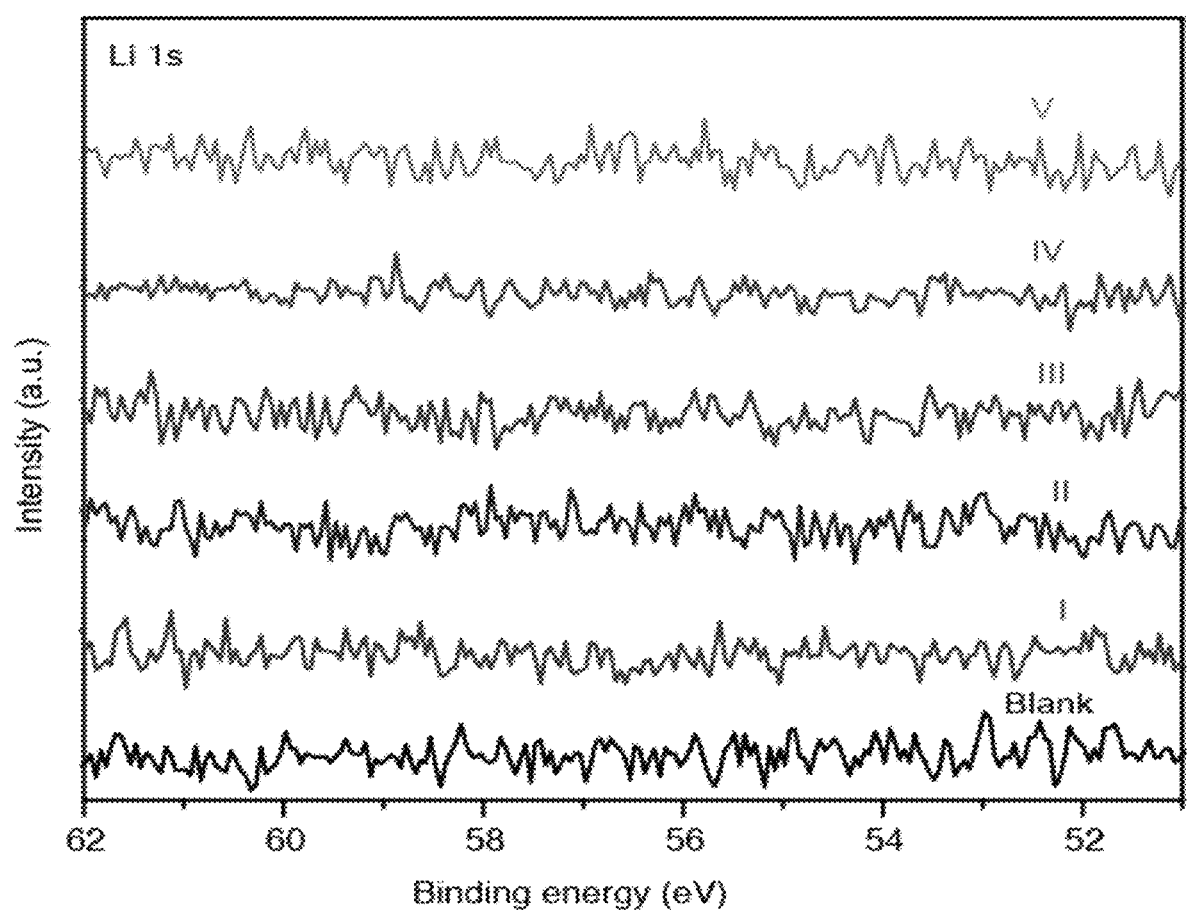

The evolution of the $CuO_x$ surface morphology during lithiation is illustrated in FIG. 2b and FIG. 2c, and was confirmed by ex-situ transmission electron microscopy (TEM). The lithiated nanoparticles exhibit a rugged morphology, as can be seen in scanning electron microscopy (SEM) images. An identical morphological evolution was observed for $CuO_x$ particle clusters during the lithiation. The size of the atomic-scale cracks in the $CuO_x$ particles was determined by analysis of TEM and STEM images (FIG. 3). An unmodified $CuO_x$ particle, with an open smooth surface, is composed mainly of $Cu_2O$, as detected by selected area electron diffraction (SAED). Atomic-scale surface defects, such as grain boundaries, were clearly generated at step I (lithiation at 1.4 V), and the defect areas defined by the yellow dashed line indicated in FIG. 2c expanded at step II (lithiation at 1.2 V). After steps I and II, the oxide phase was partially transformed into a reduced metallic phase, and the surface was broken into polycrystalline fragments (observable by SAED) with the presence of abundant grain boundaries in the interspaces. At step III in the lithiation process (lithiation at 1.0 V), the combination of the atomic defects and their expansion resulted in angstrom-sized spaces between particles or ultra-micropores. As indicated by the dashed yellow line, 5-6 Å spaces between crystalline grains were detected in the reduced Cu phase (at step III). After lithiation (step IV, lithiation at 0 V), partly reduced Cu fragments are separated so that the inter-particle distance was now >1 nm. Mostly agglomerated particles were recovered in the oxide phase following delithiation at step V (a recharge voltage of 3 V). The phase change of the CuO particles occurring during lithiation was monitored by powder X-ray diffraction (PXRD), X-ray absorption spectroscopy (XAS), and X-ray photoelectron spectroscopy (XPS) as shown in FIGS. 4, 5, and 6. In FIG. 4, the unmodified ("blank") CuO nanoparticles contain mainly $Cu_2O$ and a minor amount of CuO due to the air expose. As lithiation proceeds from step I to III, the main peak of $Cu_2O$ decreases, whereas the peak for metallic Cu peaks gradually increases. At step IV, the end of the lithiation, only the metallic Cu peak is detected, indicating that CuO is totally reduced after the lithiation is completed. FIGS. 5a and 5b indicate X-ray absorption near edge structure (XANES) spectra and extended X-ray absorption fine structure (EXAFS) spectra of copper oxide nanoparticles acquired after each step of the lithiation process, respectively. The XANES spectra indicate that Cu cations in the blank CuO exist in the monovalent oxidation state with a minor presence of divalent ions. Reduction of copper was complete at step IV, and the features of the XANES spectra match well those of Cu foil. After the step V and delithiation, the oxidation state of CuO was recovered. The EXAFS spectra demonstrate that the peak for Cu—O backscattering gradually converted to Cu—Cu backscattering until step IV and Cu—O backscattering is recovered after step V. FIGS. 6a and 6b indicate Cu 2p and Cu LMM spectra of each samples, and Li 1s spectrum of each sample, respectively. Upon gradual lithiation, the oxidation state of copper gradually reduced. After washing of the lithiated samples, no residual lithium was observed. These techniques show that the oxidation state of Cu is reduced during lithiation and increased after delithiation, consistent with information obtained from the SAED patterns of TEM presented in FIG. 2c. The $Li_2O$ and residual lithium in the lithiated samples were completely removed by washing after each lithiation step, as confirmed by Li 1s XPS (FIG. 6b).

Figure 2D:
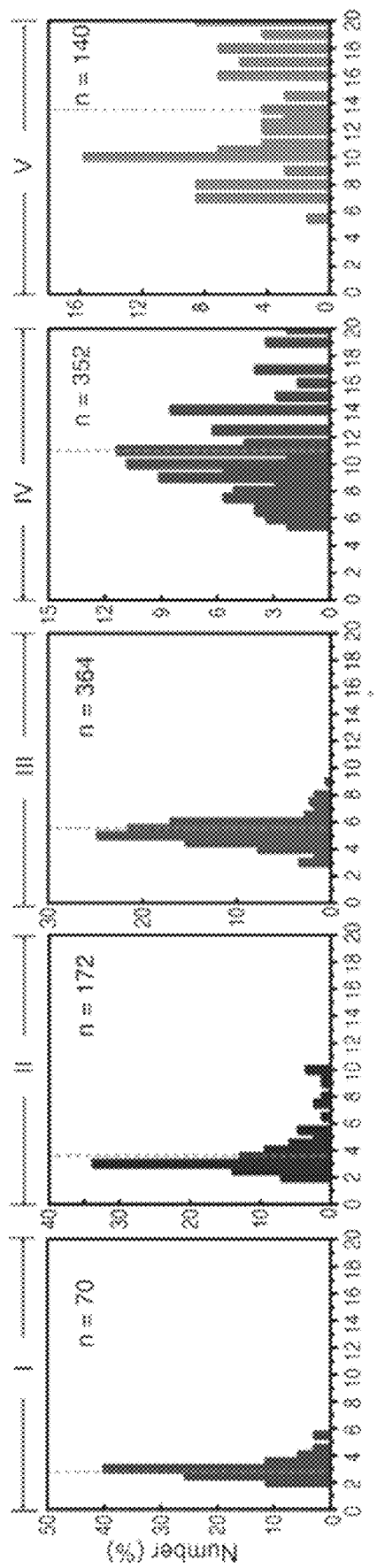
Figure 7:
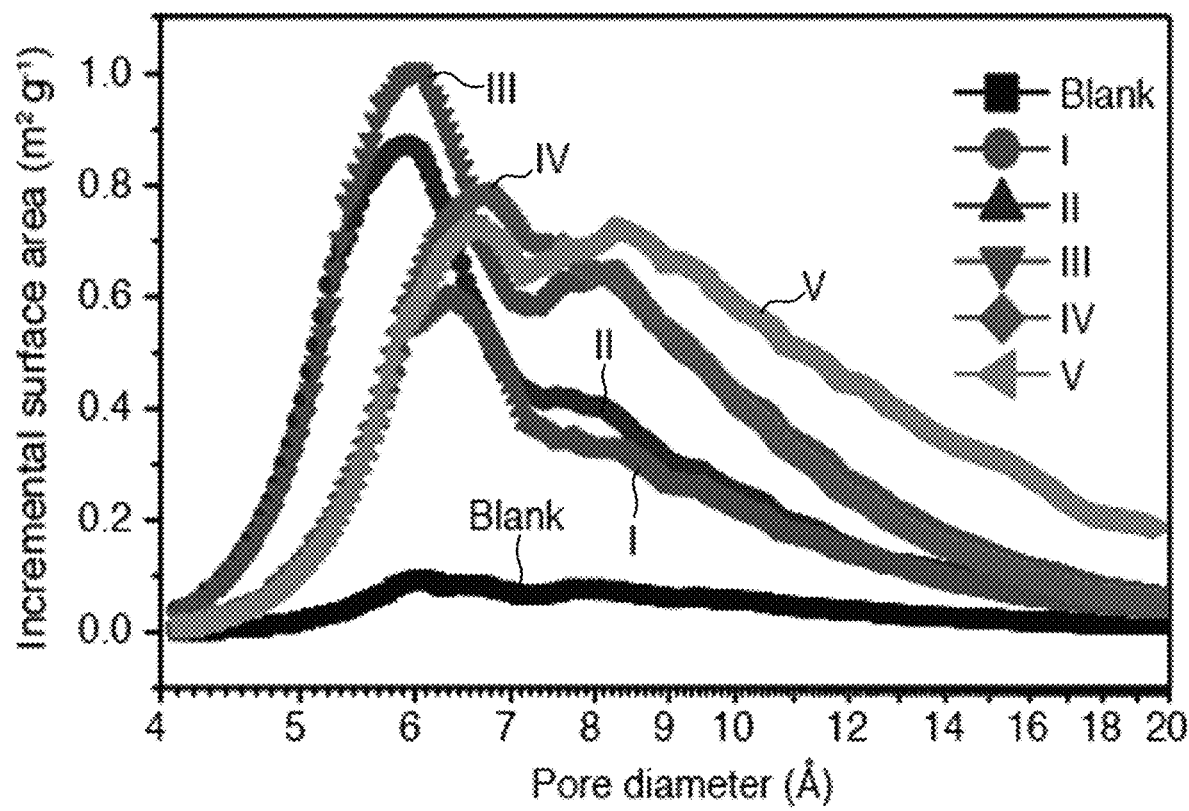
FIG. 7 shows a pore diameter distribution simulated by the HK (Horvath-Kawazoe) method according to $N_2$ adsorption/desorption measurement of the blank $CuO_x$ particle and the samples lithiated during the respective steps I to V according to an example of the present disclosure.

The morphological evolution determined by analysis of TEM images is given in FIG. 2c and the distribution of the values of $d_s$ was determined by analyzing the scale of inter-particle spacing observed in TEM images, which is presented in FIG. 2d. After steps I and II in the lithiation process, the values of $d_s$ corresponded primarily to the lattice spacing for Cu and $Cu_2O$ planes ($d_s$=2.08 and 3.01 Å, respectively). Therefore, the measurements can be attributed to defects and/or grain boundaries rather than to atomic-scale interplanar spaces. After step III, the interplanar spacing is ~5-6 Å, which corresponds to the value required to promote C—C coupling, based on DFT calculations discussed above. After full lithiation to step IV, the reduced Cu particle grew and the interplanar spacings increased to the value between 7 Å and 20 Å; while this spacing remained almost unchanged even after lithiation to step V. The relatively large interplanar spacing after lithiation at steps IV and V very likely corresponds to the formation of micropores (<20 Å) in the metal oxide. Consistent with this interpretation, we find that the pore size distribution determined from analysis of Brunauer-Emmett-Teller (BET) isotherms matches well with the average size of the inter-particle spacing determined after each lithiation step by TEM analysis (FIG. 7). These results clearly demonstrate that lithiation of $CuO_x$ nanoparticles results in inter-particle spacings ranging from 3.0 to 20 Å and that the desired spacing of 5~6 Å (projected from DFT calculations) is obtained at step III.

(3) Catalytic Activity and Selectivity for CO2RR

Figure 8A:
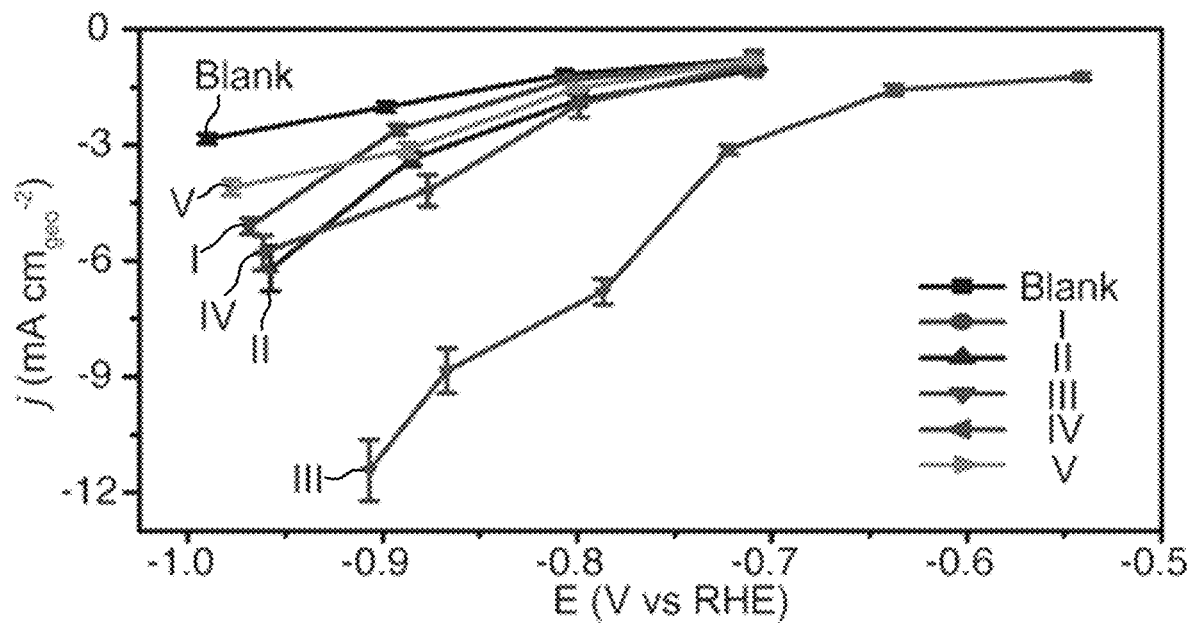
FIGS. 8A, 8B, 8C, 8D and 8E show the electrochemical carbon dioxide reduction properties of lithiated copper oxide nanoparticles according to an example of the present disclosure.

The catalytic activity and selectivity for CO2RR was evaluated by conducting ambient-pressure $CO_2$ electrolysis under a constant potential for several hours. FIG. 8a shows the geometric current densities of the unmodified and the lithiated samples as a function of applied potential. At about −0.9 V vs. RHE, the sample that had undergone lithiation up to step III exhibited an approximately 6-fold increase in current density compared to that for the unmodified $CuO_x$. It should be noted that the lithiated catalyst with an interplanar spacing of about 5-6 Å also has a large electrochemical surface area (ESA), which was determined by electrical double-layer capacitance (EDLC). The trend in the ESA is different from that for the BET surface area. This implies that the electrochemical catalytic activity is boosted when the interplanar spacing is ~5-6 Å, thereby producing the anomalous increase in capacitance at pore sizes less than 10 Å.

Figure 8B:
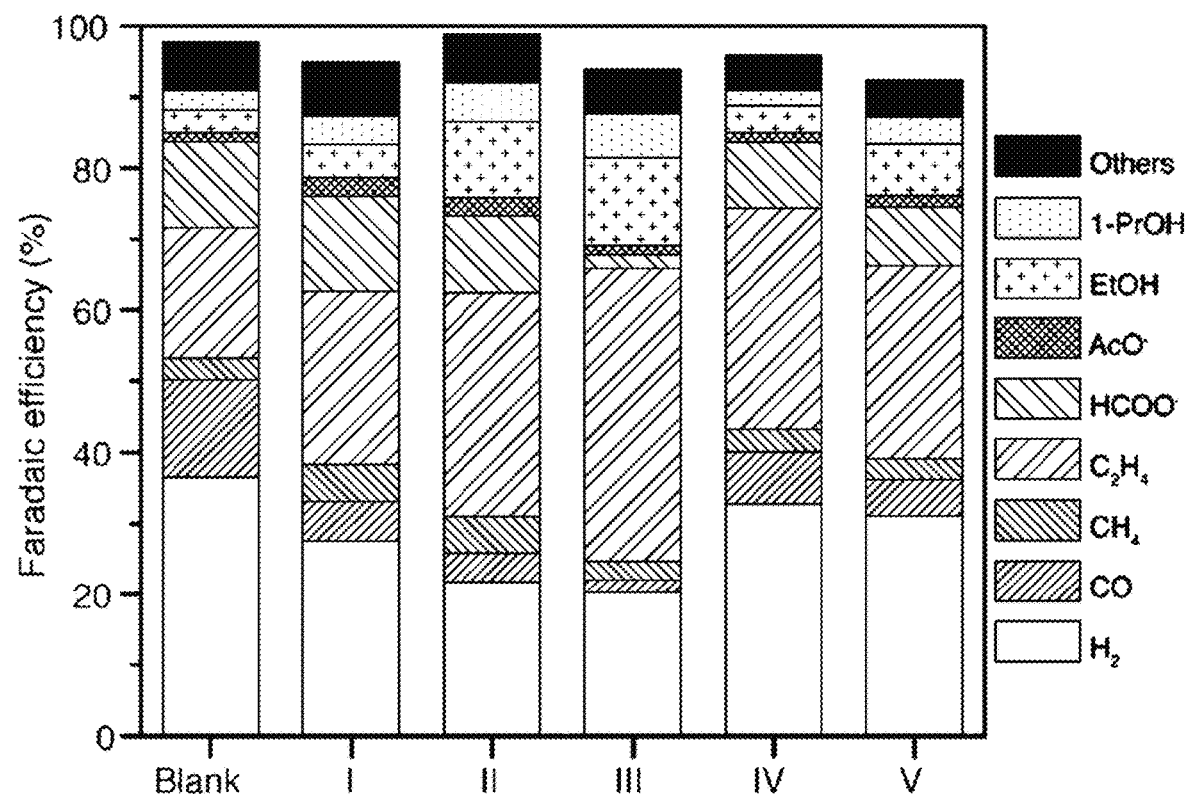

To minimize the pH changes in the vicinity of the cathode, a 0.1 M CsHCO3 solution was used as the electrolyte and the cathode potential was kept below −0.9 V vs RHE. The inventors have shown previously that hydrated $Cs^+$ cations can buffer pH changes occurring near the catalyst surface under conditions of considerable electrolyte polarization and, thereby, help to increase the amount of $CO_2$ available for electrochemical reaction. The inventors have demonstrated that for cathode potentials more positive than −0.9 V vs RHE, hydrated $Cs^+$ cations present in the out Helmholtz layer imposes a local electric field that enhances formation of C—C bonds via coupling of adsorbed CO or adsorbed CO and HCO. Evidence for the absence of mass transfer effects is given by the identical Tafel slopes observed for samples of CuOx that had been lithiated to different degrees. FIG. 8b shows the product distribution obtained from the unmodified and the lithiated samples at −0.9 V vs. RHE. As $d_s$ increases, the formation of $C_1$ products gradually decreases, while the formation of $C_{2+}$ products, particularly ethylene and ethanol, increases significantly. This effect is maximized at step III ($d_s$=5.2 Å), at which stage the $C_2H_4/CH_4$ ratio rises to 54.3% and the FE for $H_2$ decreases to 19%. Moreover, the onset potential for $C_2H_4$ formation is decreased to −0.5 V vs. RHE, which is ~300 mV lower than the potential for the unmodified sample. After lithiation to step IV, at which point of $d_s$=7 Å, the selectivity to $C_1$ products and hydrogen recovers, and the FE for $C_2H_4$ falls to a level observed after step V. The Fes as functions of the overall applied potential are presented in FIG. 9 and the product partial currents as functions of the overall applied potential are also measured. FIG. 9 indicates the washed samples after lithiation exhibit better performances than the non-washed samples, supporting the assessment that the residual SEI layer on the catalyst surface can interrupt the coupling reaction for CO2RR. The geometrically normalized product current densities are consistent with the trend in product current densities normalized by the specific surface area (SSA).

Figure 8C:
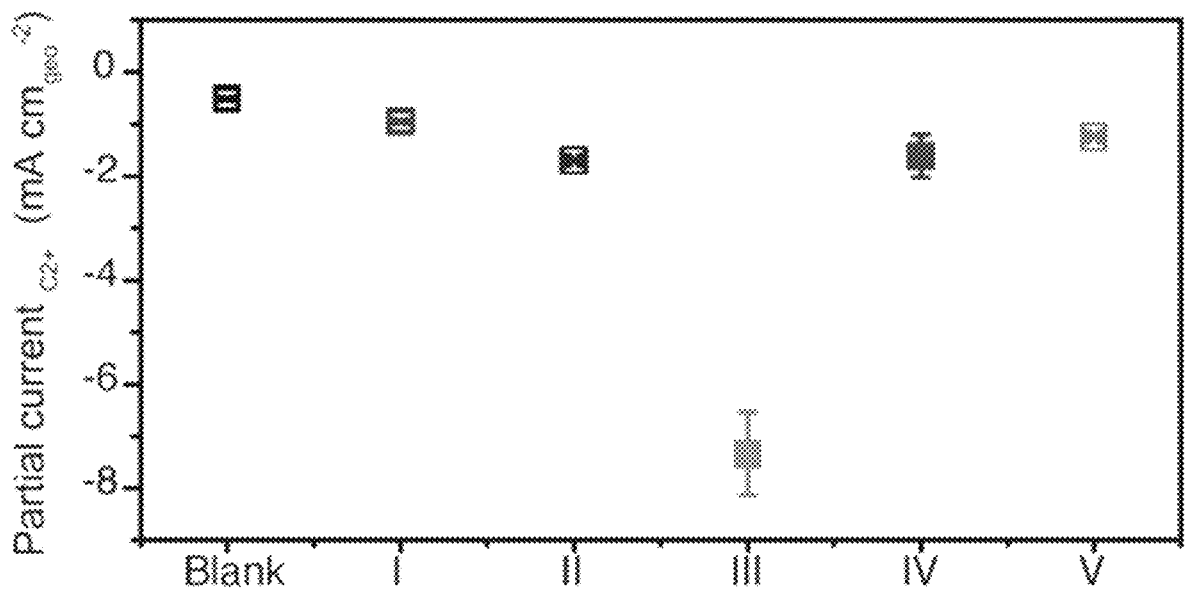
Figure 8D:
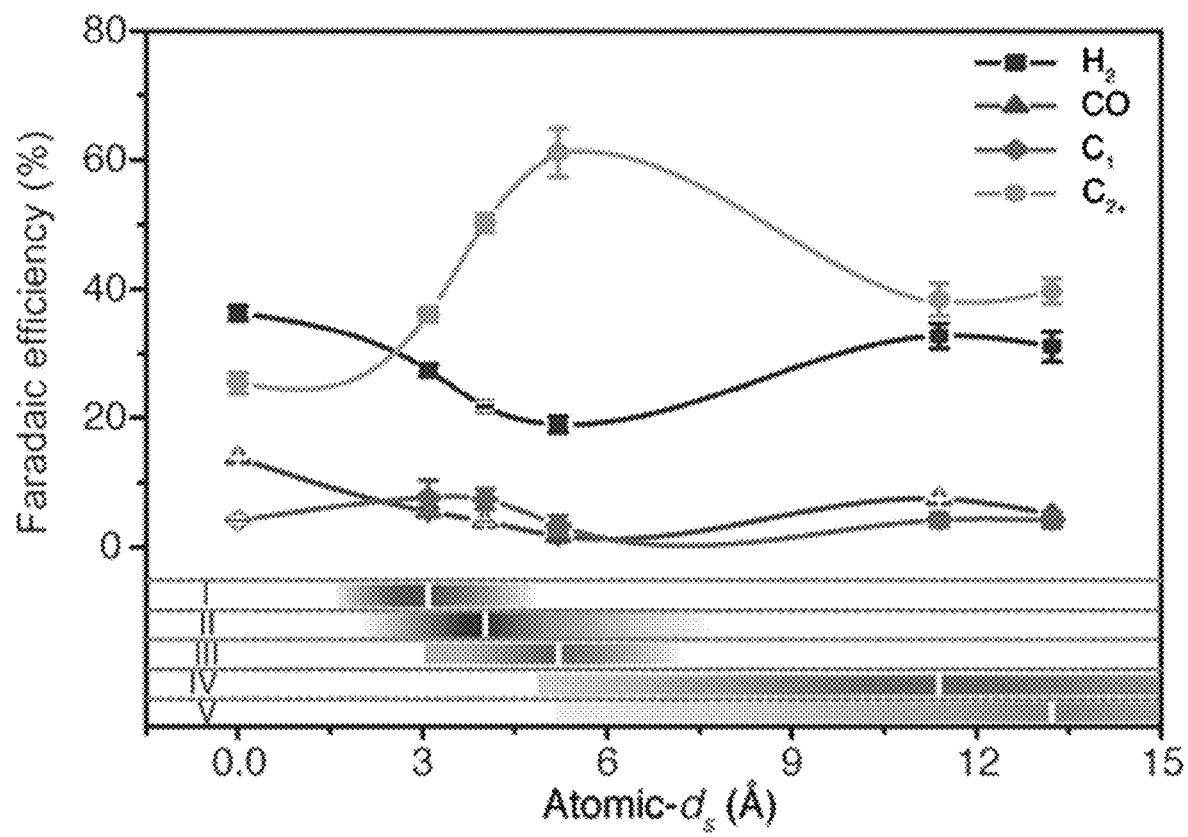
Figure 10A:
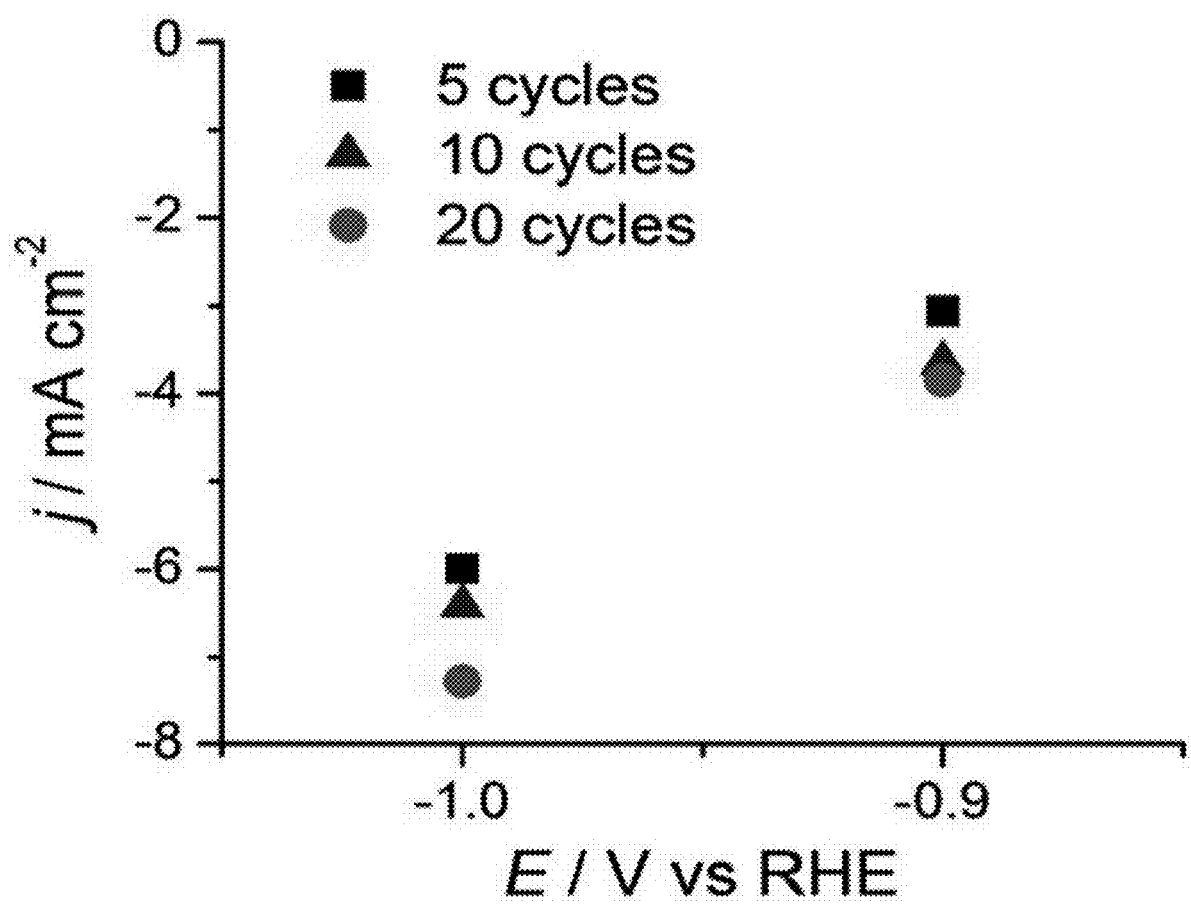
Figure 10B:
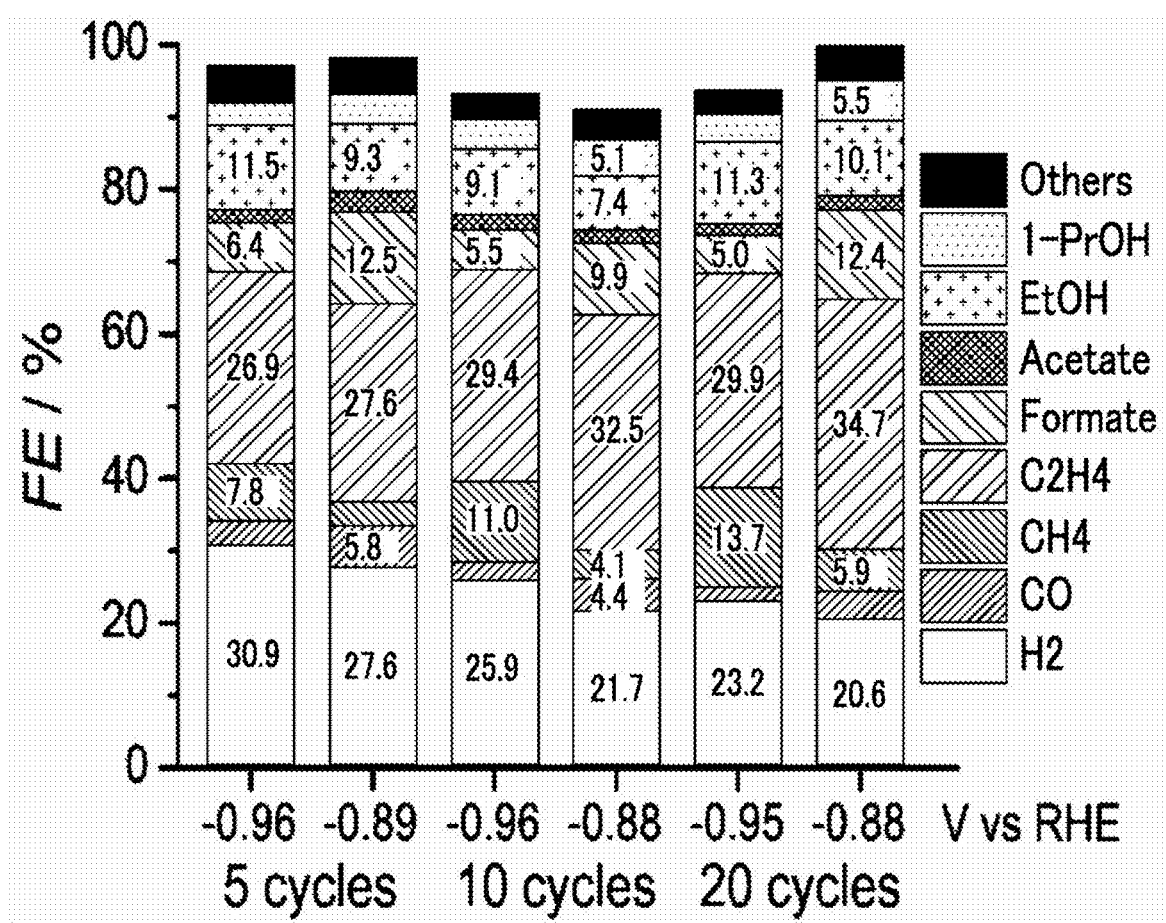

The inventors also note that repeated lithiation cycles (5, 10 and 20 cycles) resulted in a CO2RR activity similar to that achieved after step V (FIG. 10). FIG. 10a indicates current densities for 5, 10, and 20 lithiation/delithiation cycled samples and FIG. 10b indicates the corresponding Faradaic efficiencies for individual products. Catalytic activity and selectivity for the product are not significantly changed after repeated cycles of lithiation. The partial current densities for $C_{2+}$ products and FEs of the major CO2RR products obtained at −0.9 V vs. RHE are illustrated as a function of lithiation step in FIG. 8c and FIG. 8d, respectively. The highest current density for $C_{2+}$ products is observed for ds=5.2 Å (step Ill), which is approximately 12-fold higher than that seen for the unmodified sample, while that for $H_2$ and $C_1$ products, including CO, formate and $CH_4$, are reduced. The high current density is ascribed to both the increased electrochemically active surface area and the decrease in the free energy barrier for the reduction of $CO_2$.

Figure 8E:
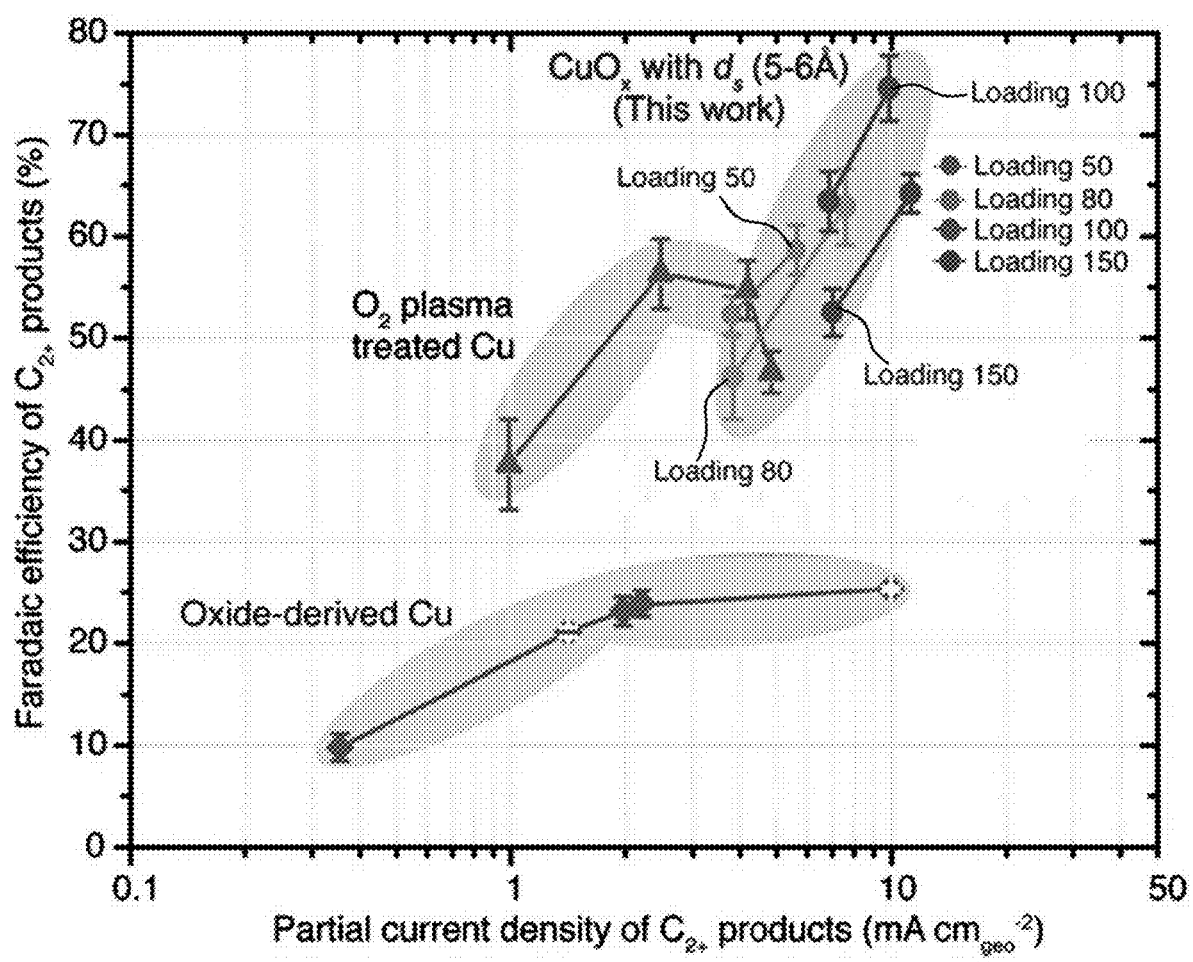
Figure 9A:
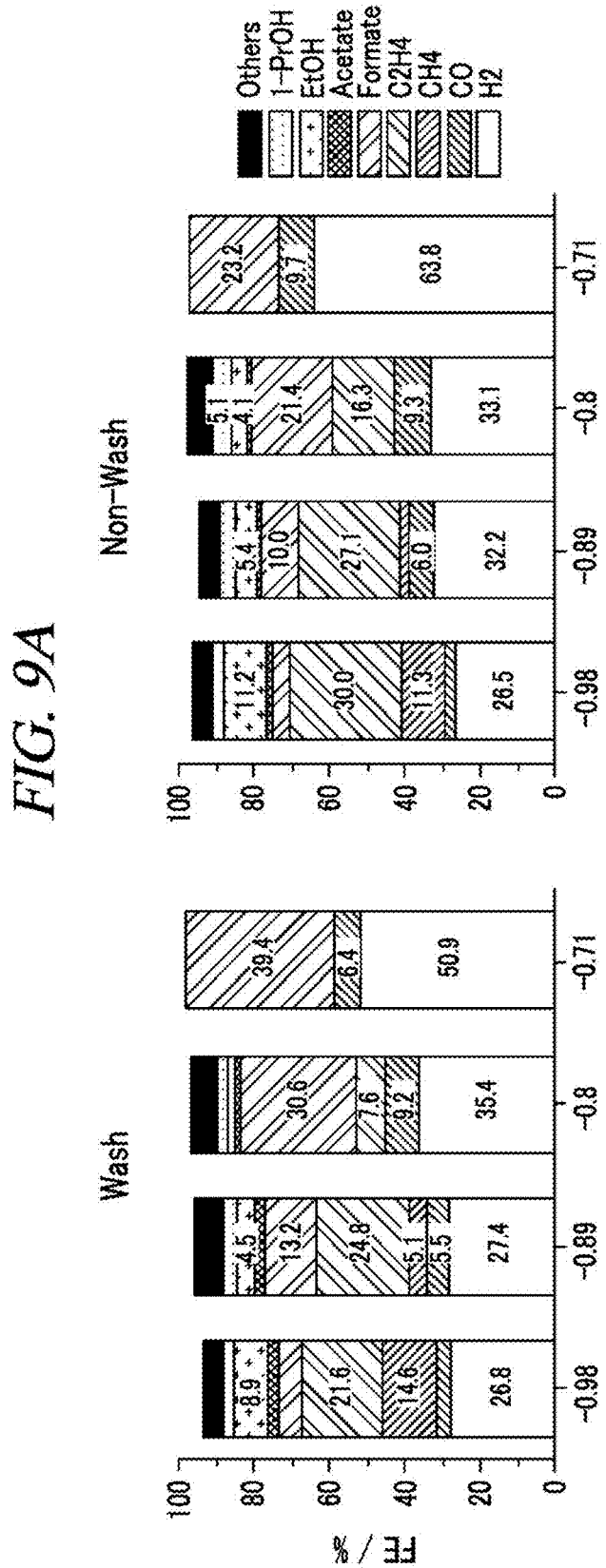
FIGS. 9A, 9B, 9C, 9D and 9E show the Faradaic efficiencies of the lithiated sample at various applied potentials according to an example of the present disclosure.
Figure 9B:
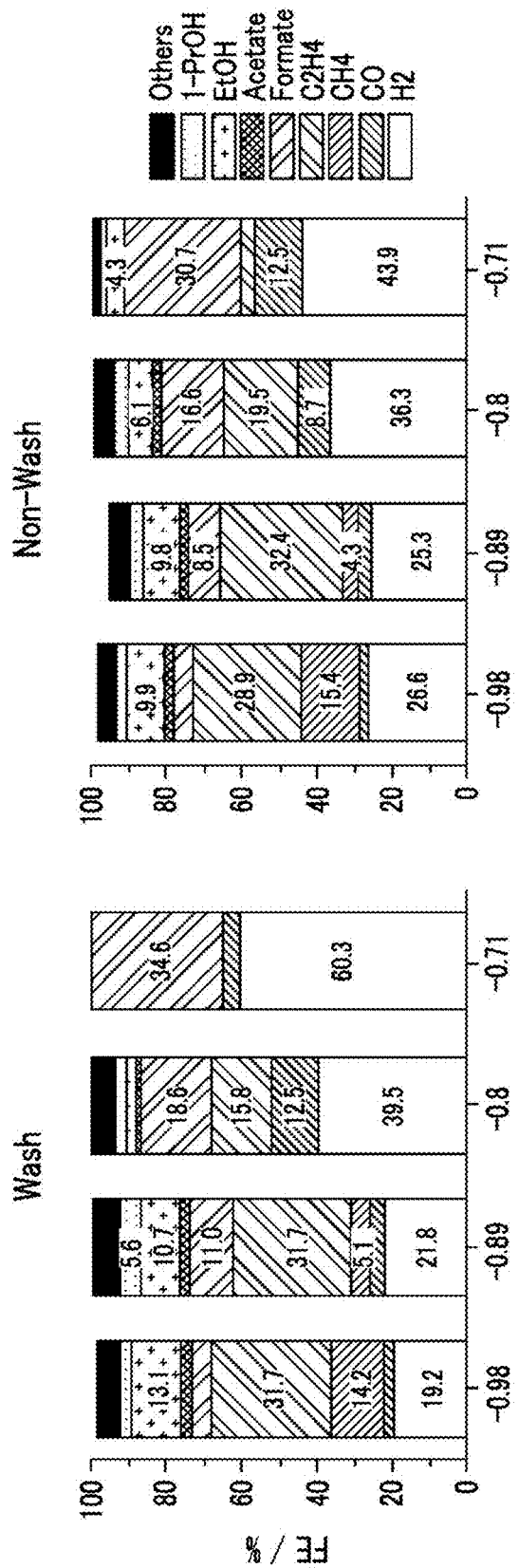
Figure 9C:
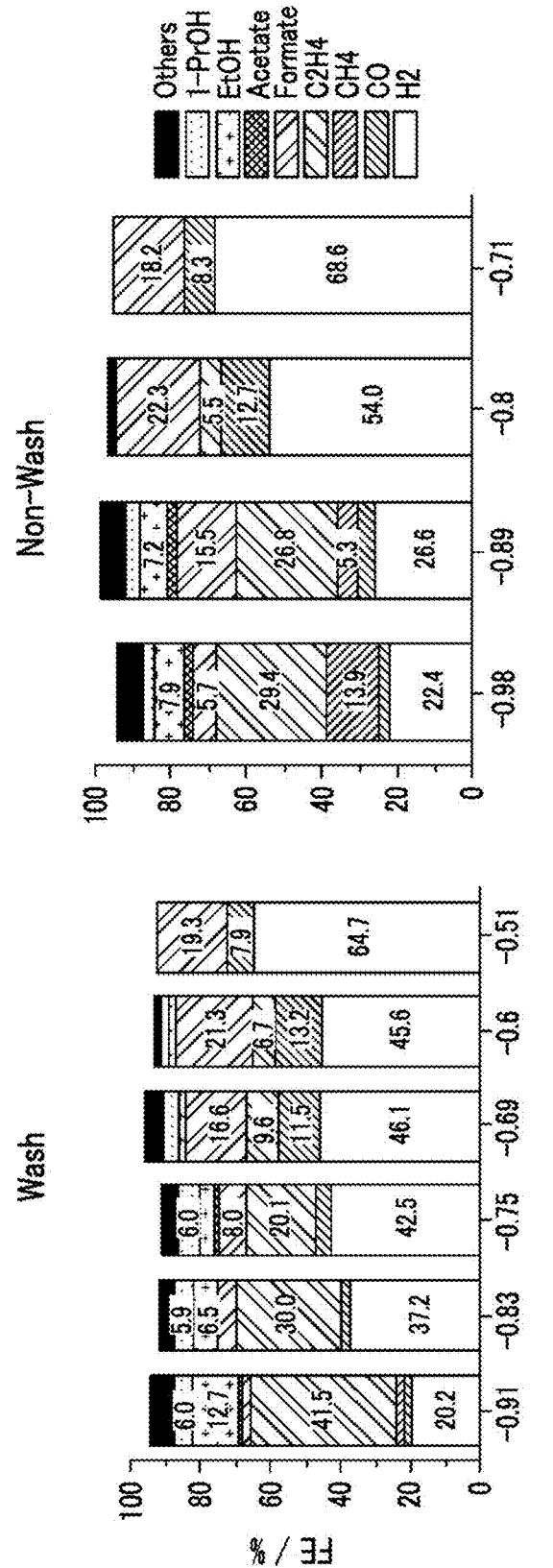
Figure 9D:
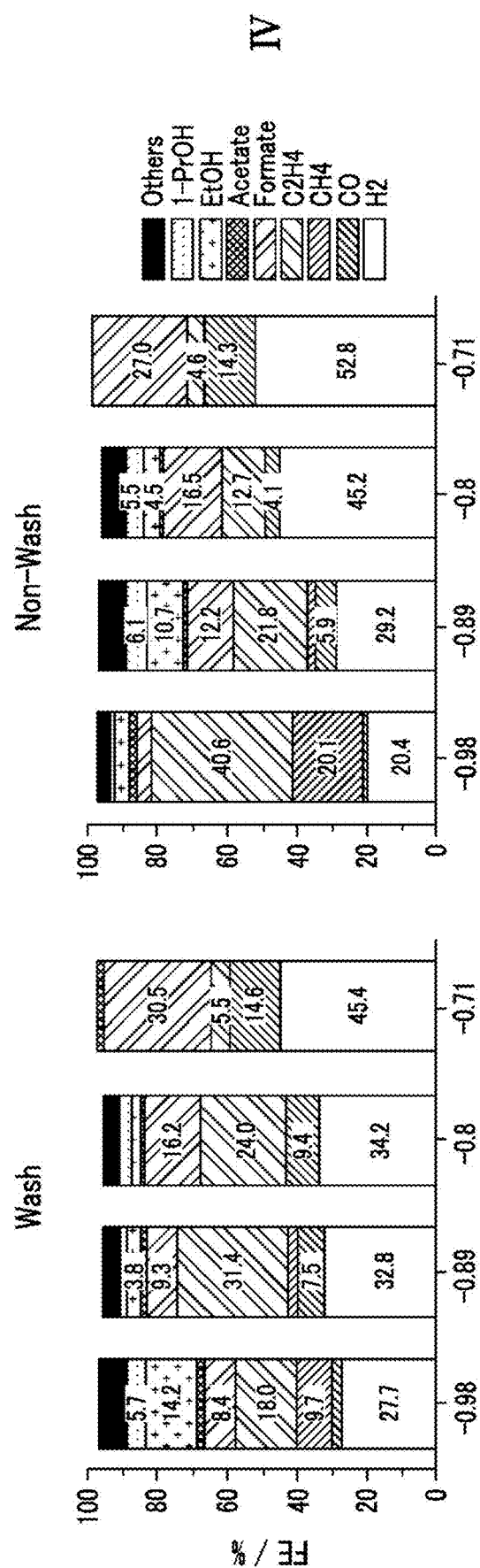
Figure 9E:
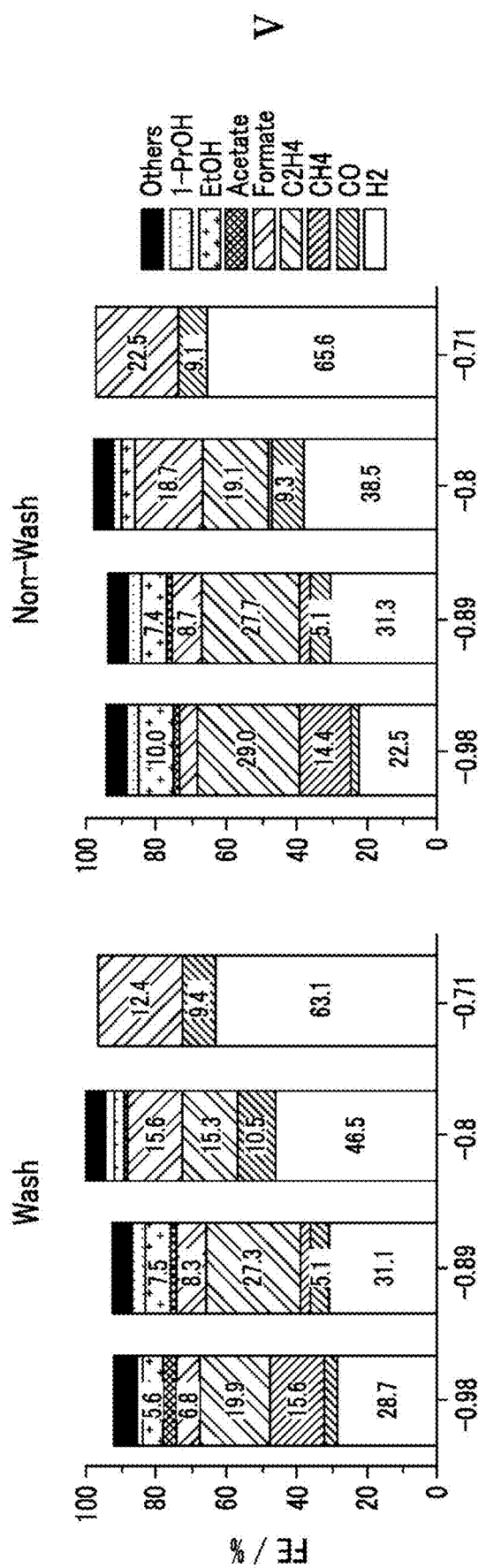
Figure 11A:
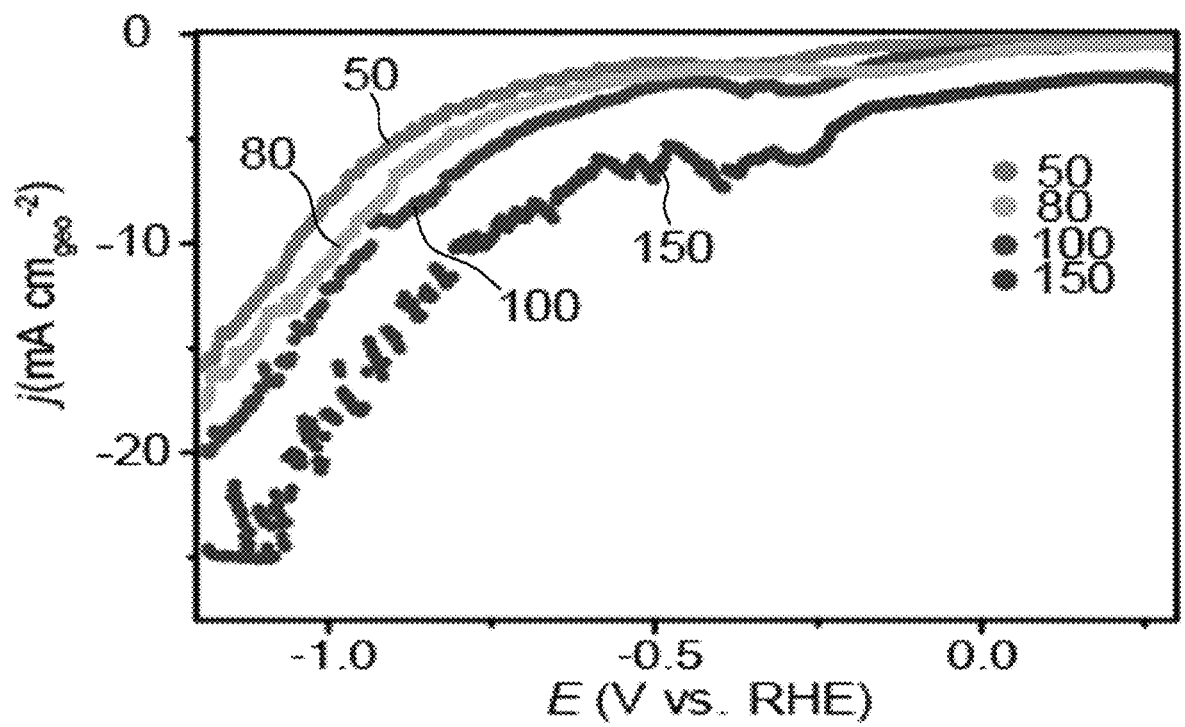
FIGS. 11A, 11B, 11C, 11D, 11E, 11F and 11G show the catalytic properties of the sample after the step Ill with various mass loadings according to an example of the present disclosure.
Figure 11B:
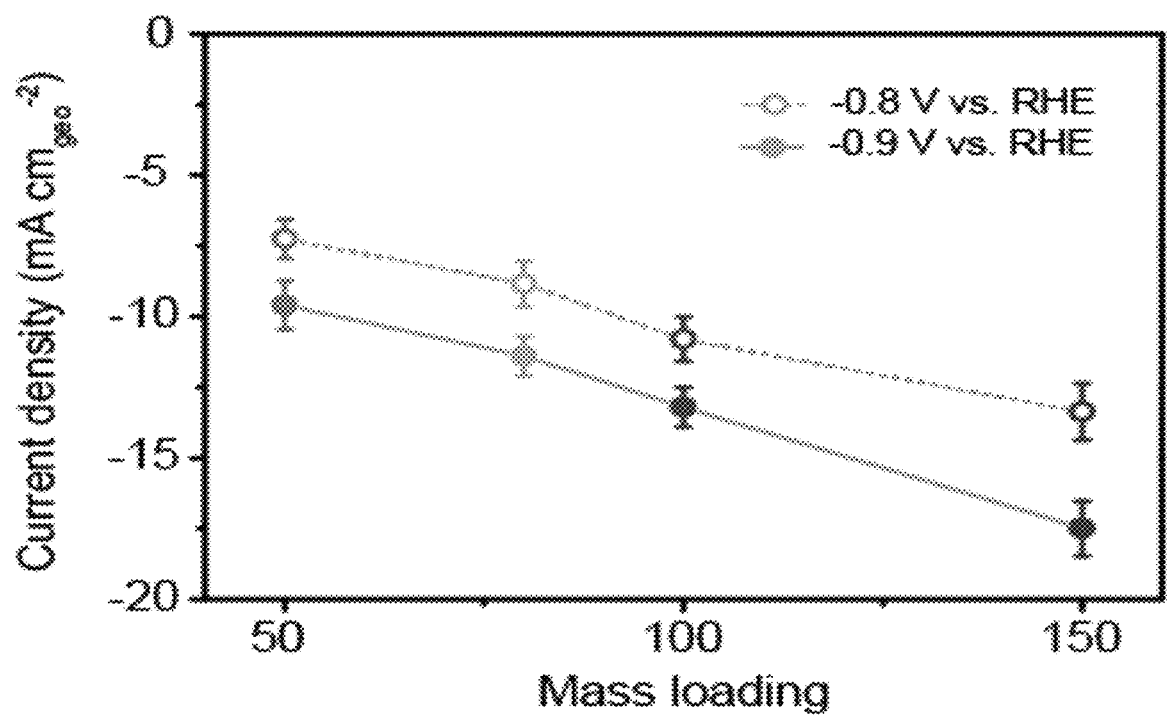
Figure 11C:
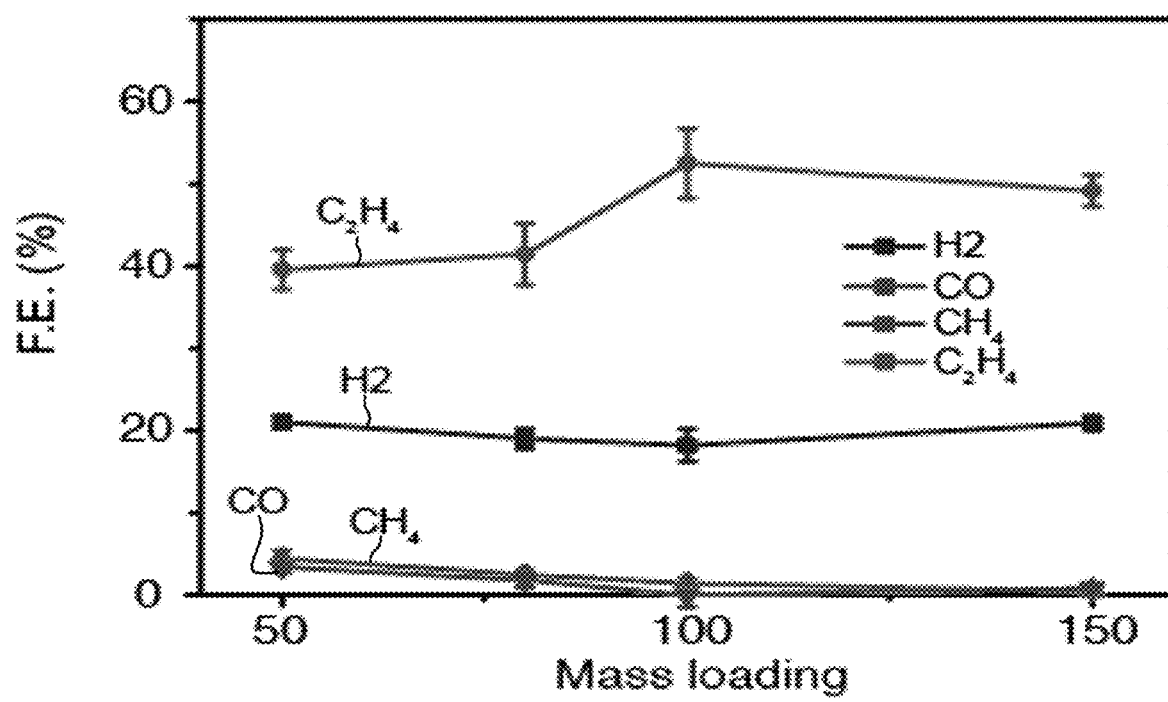
Figure 11D:
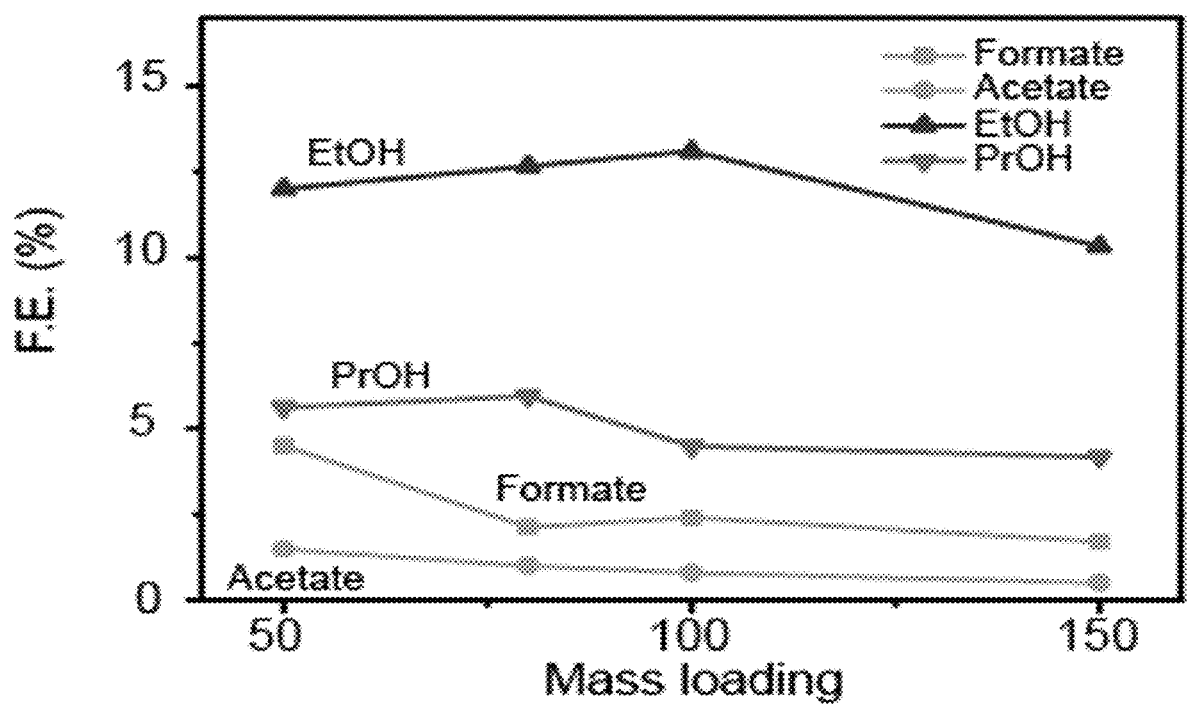
Figure 11E:
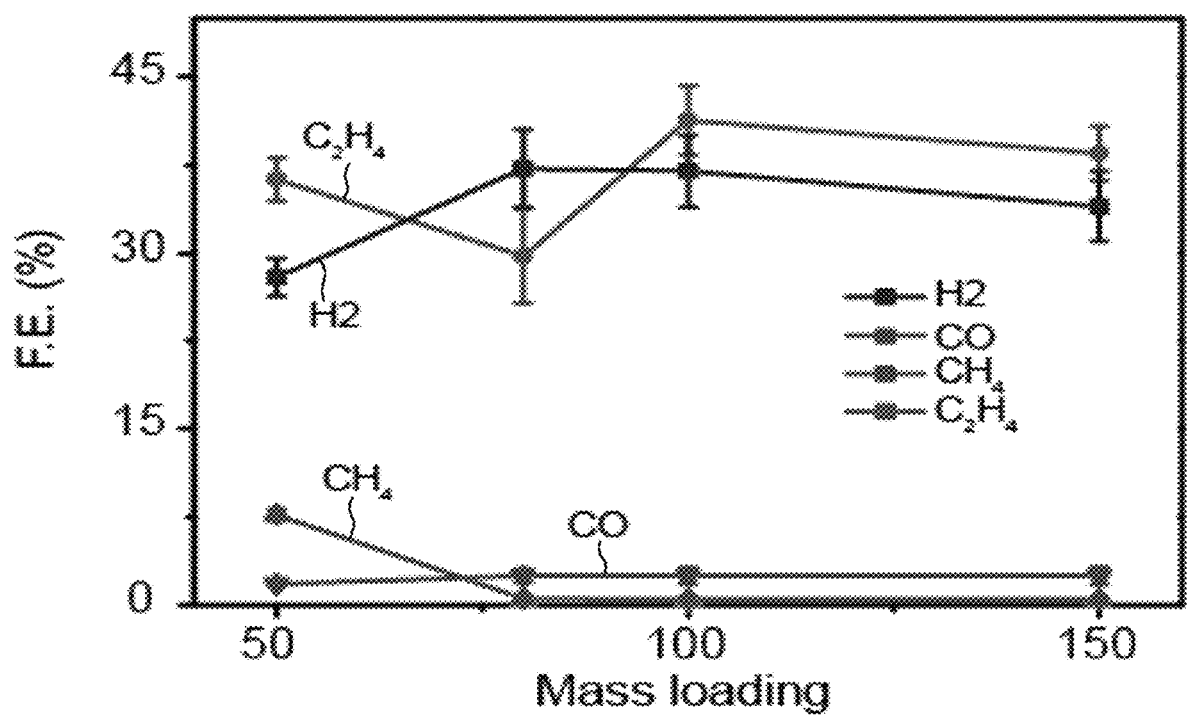
Figure 11F:
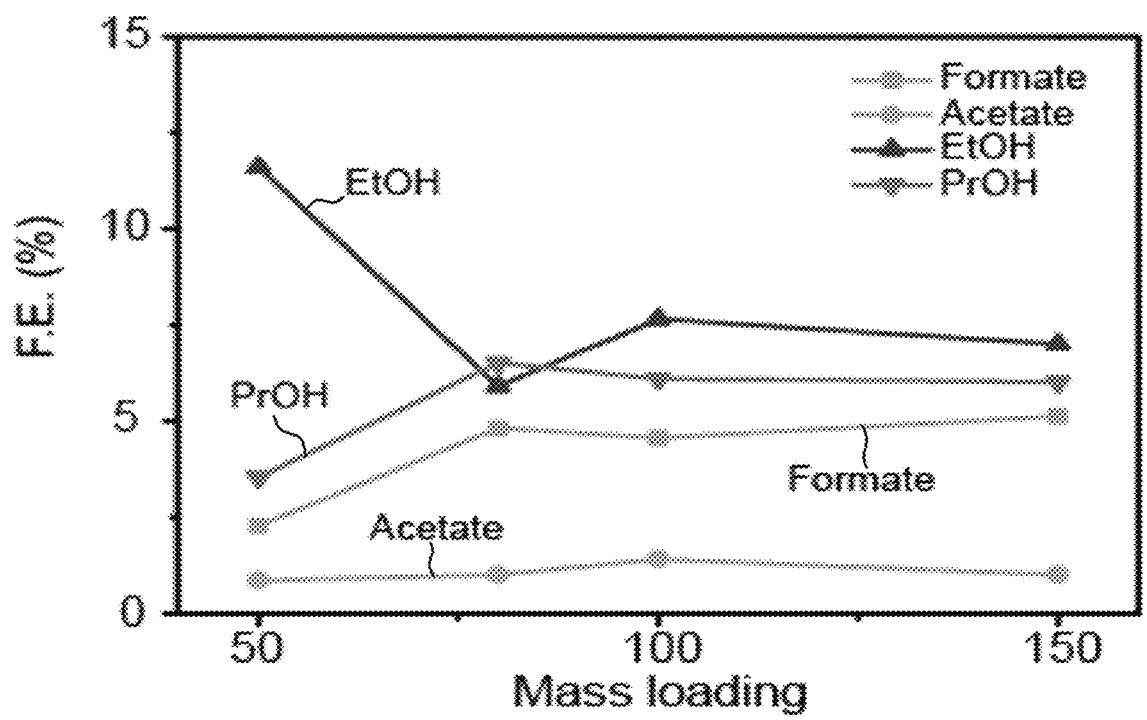
Figure 11G:
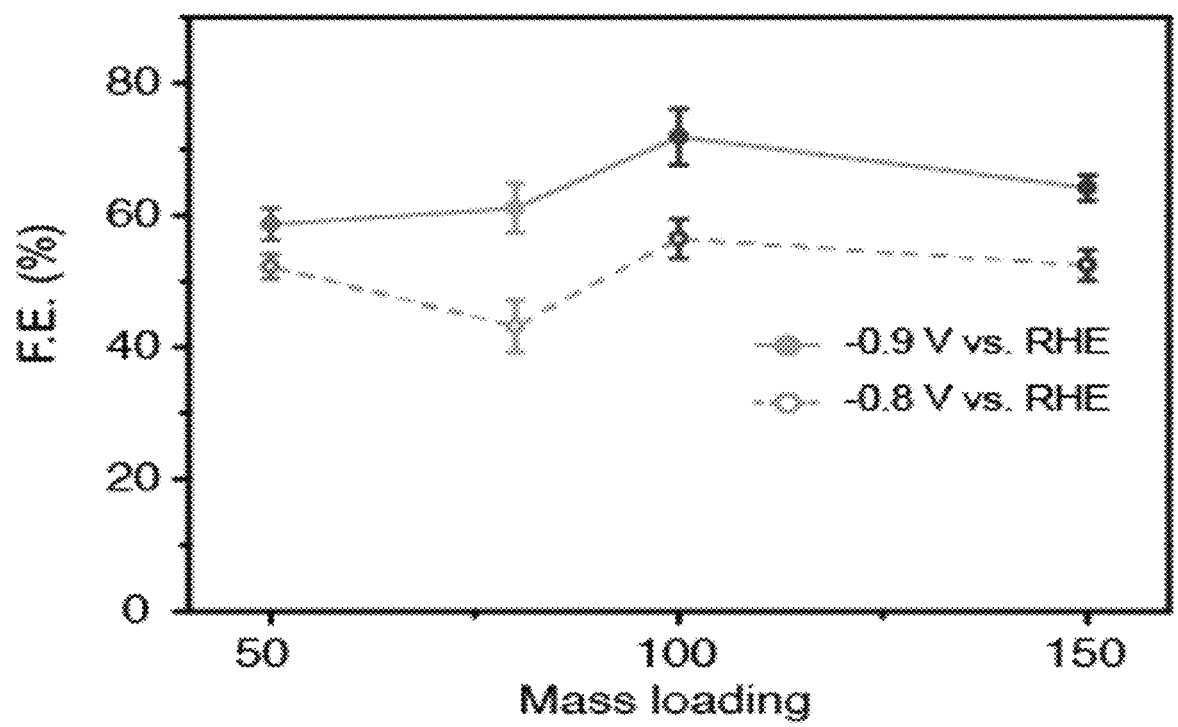
Figure 12A:
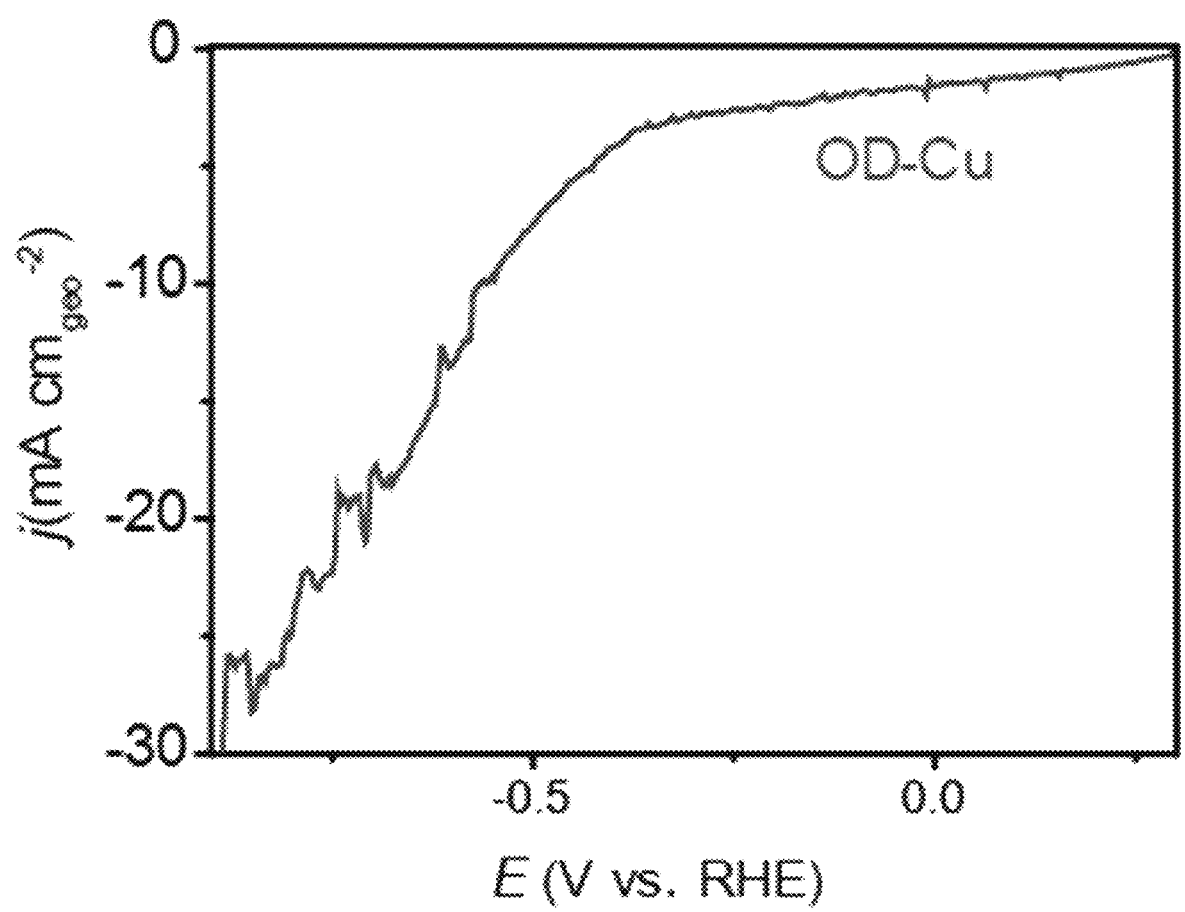
FIGS. 12A, 12B, 12C and 12D show the catalytic properties of the oxide-derived Cu catalyst according to an example of the present disclosure.
Figure 12B:
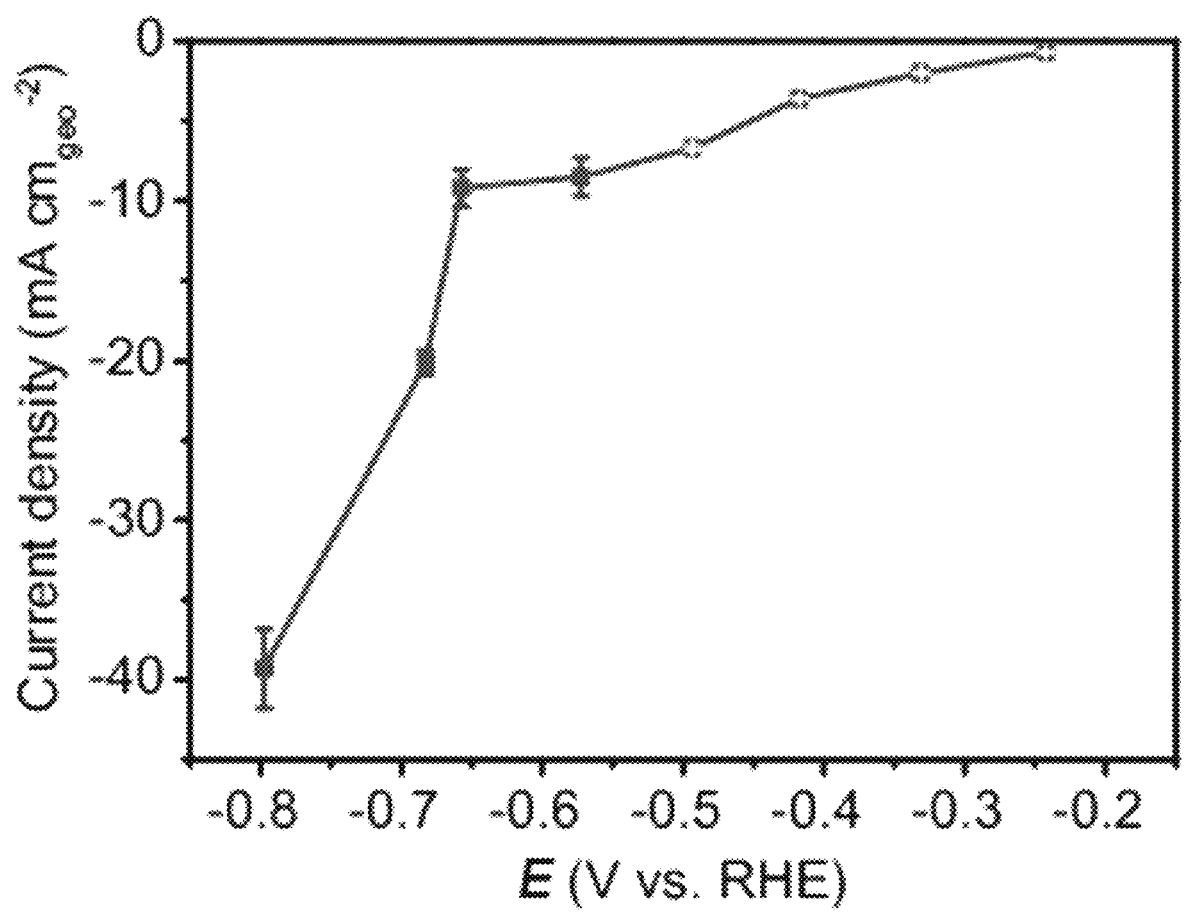
Figure 12C:
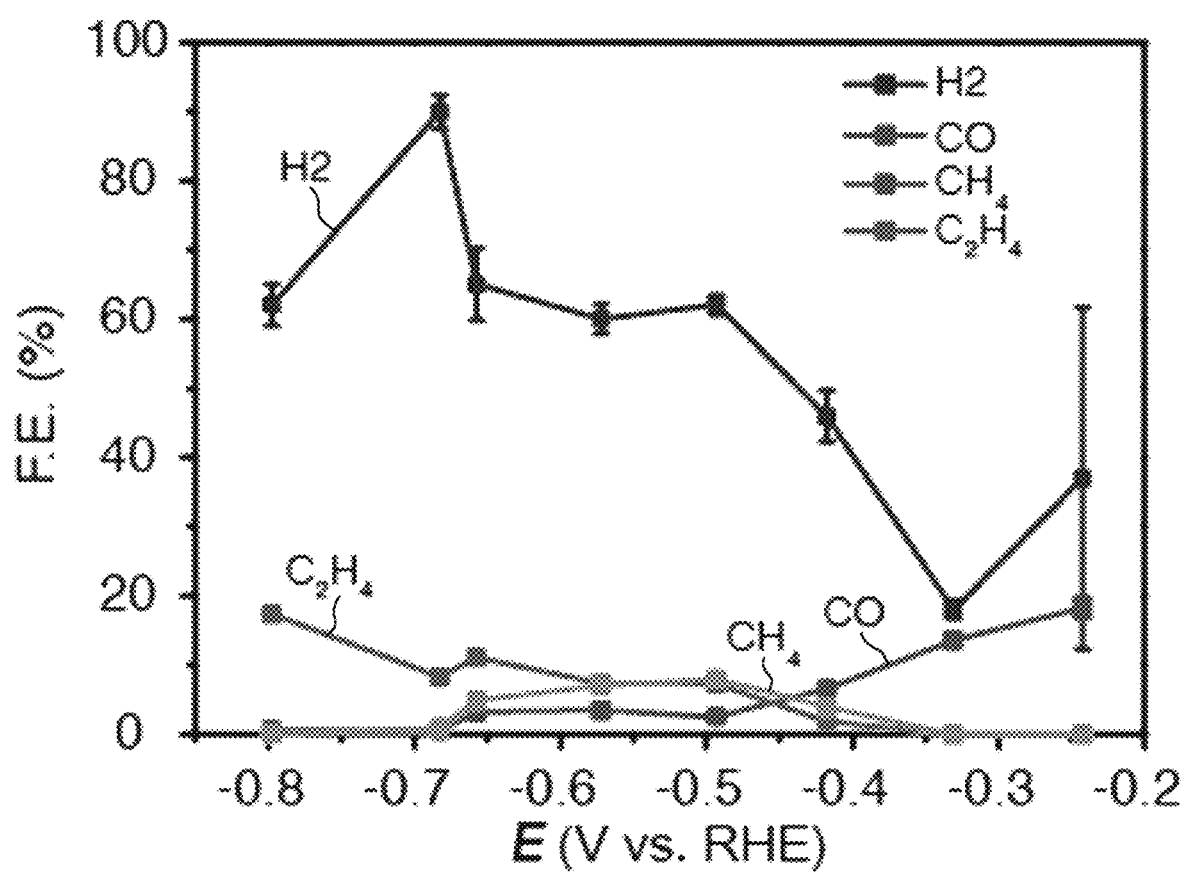
Figure 12D:
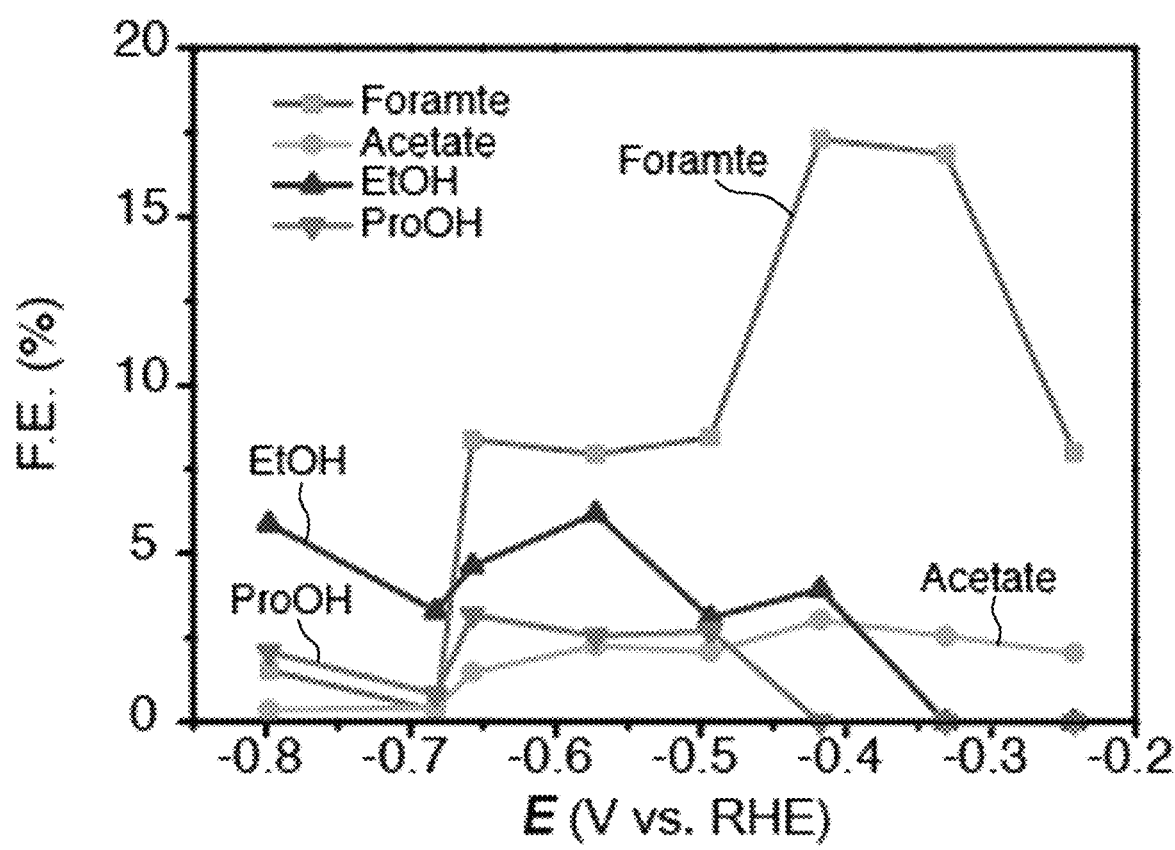
Figure 13A:
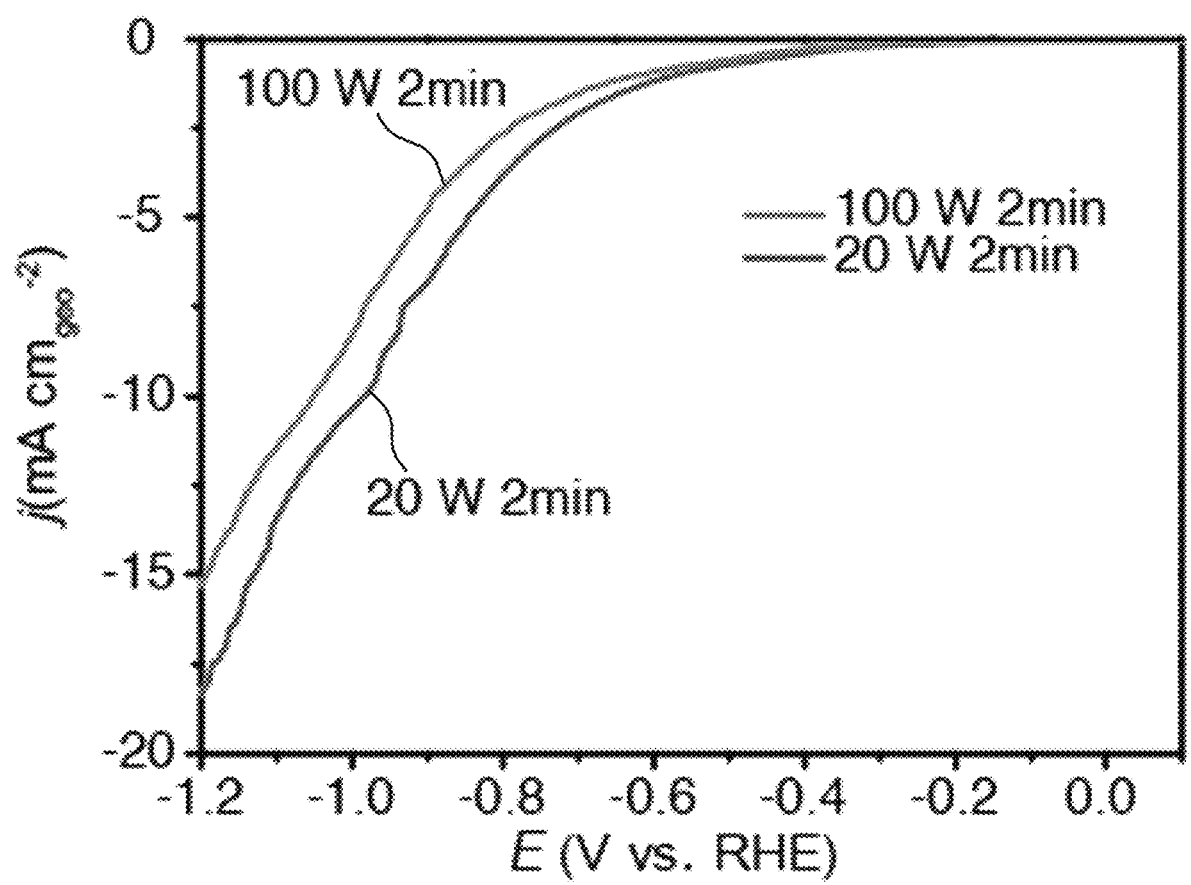
FIGS. 13A, 13B, 13C, and 13D show the catalytic properties of the $O_2$ plasma-treated Cu catalyst according to an example of the present disclosure.
Figure 13B:
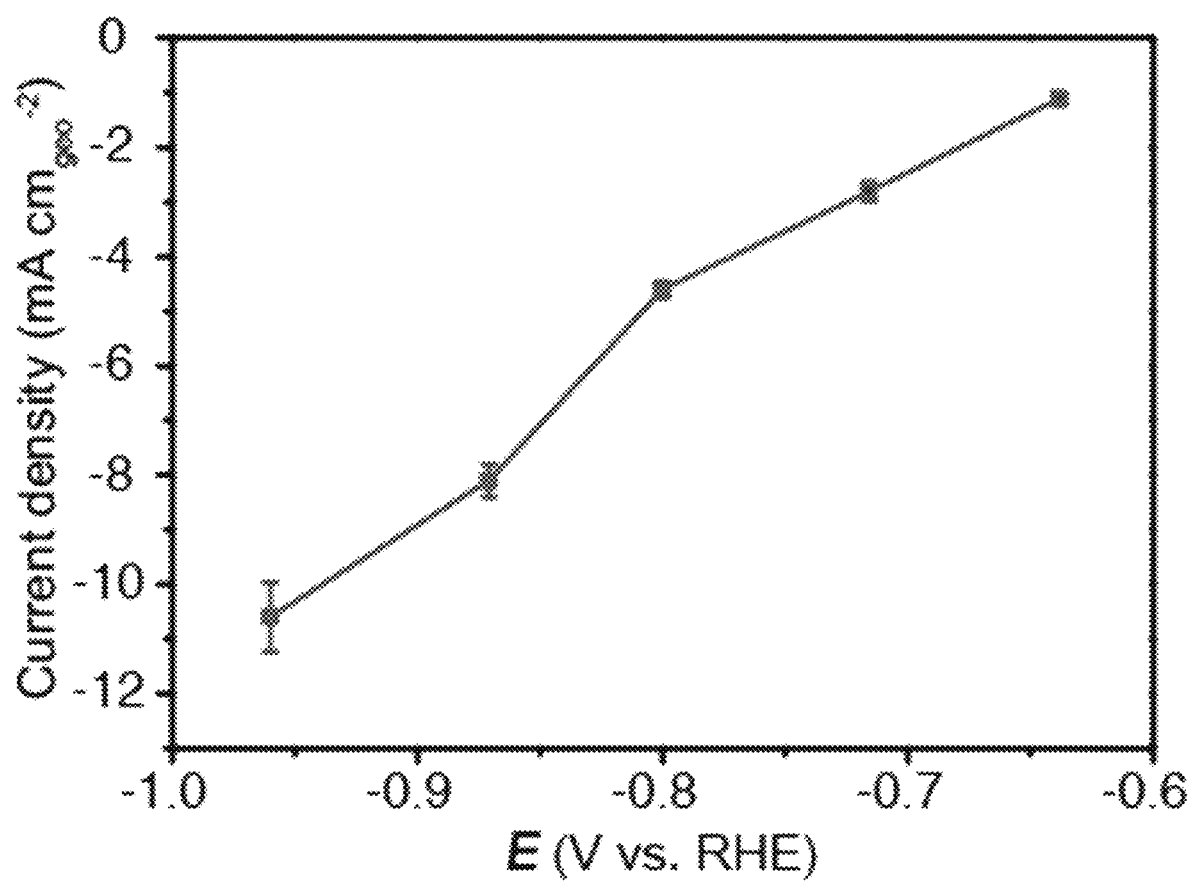
Figure 13C:
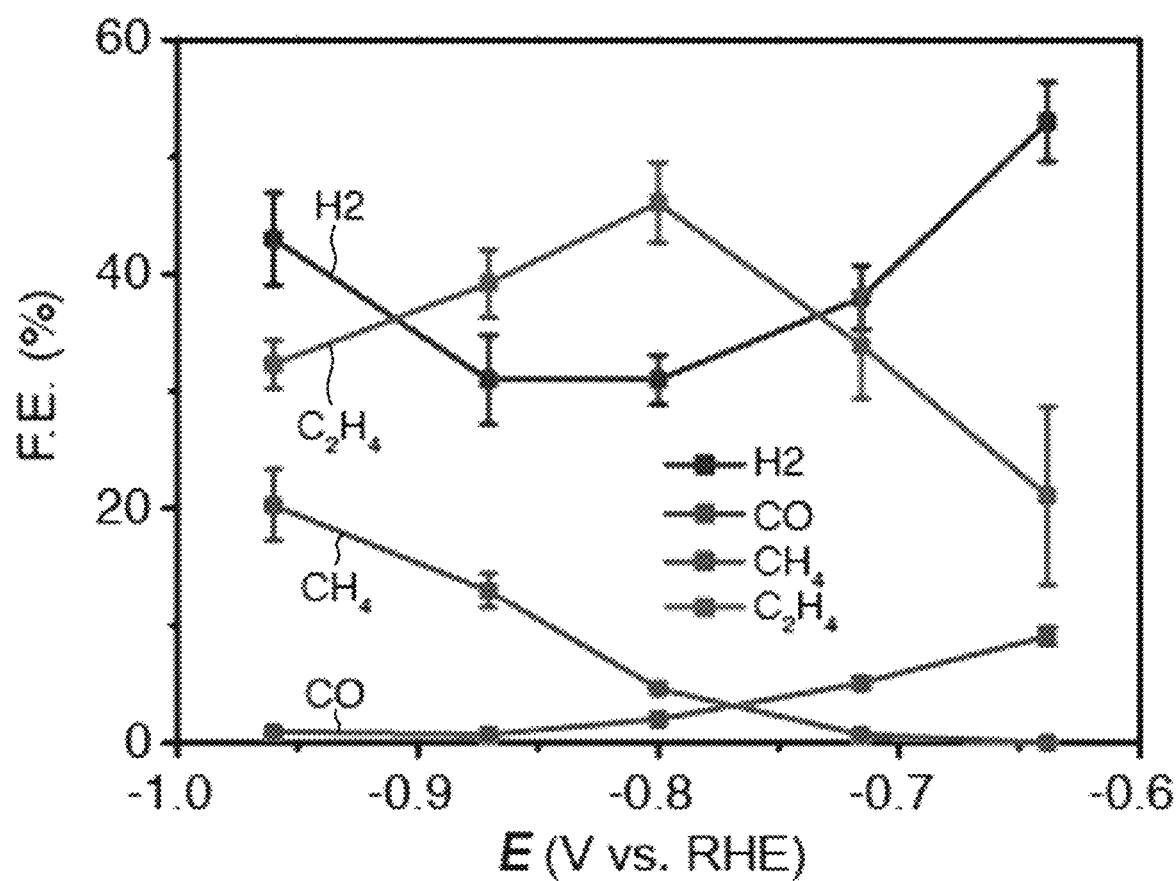
Figure 13D:
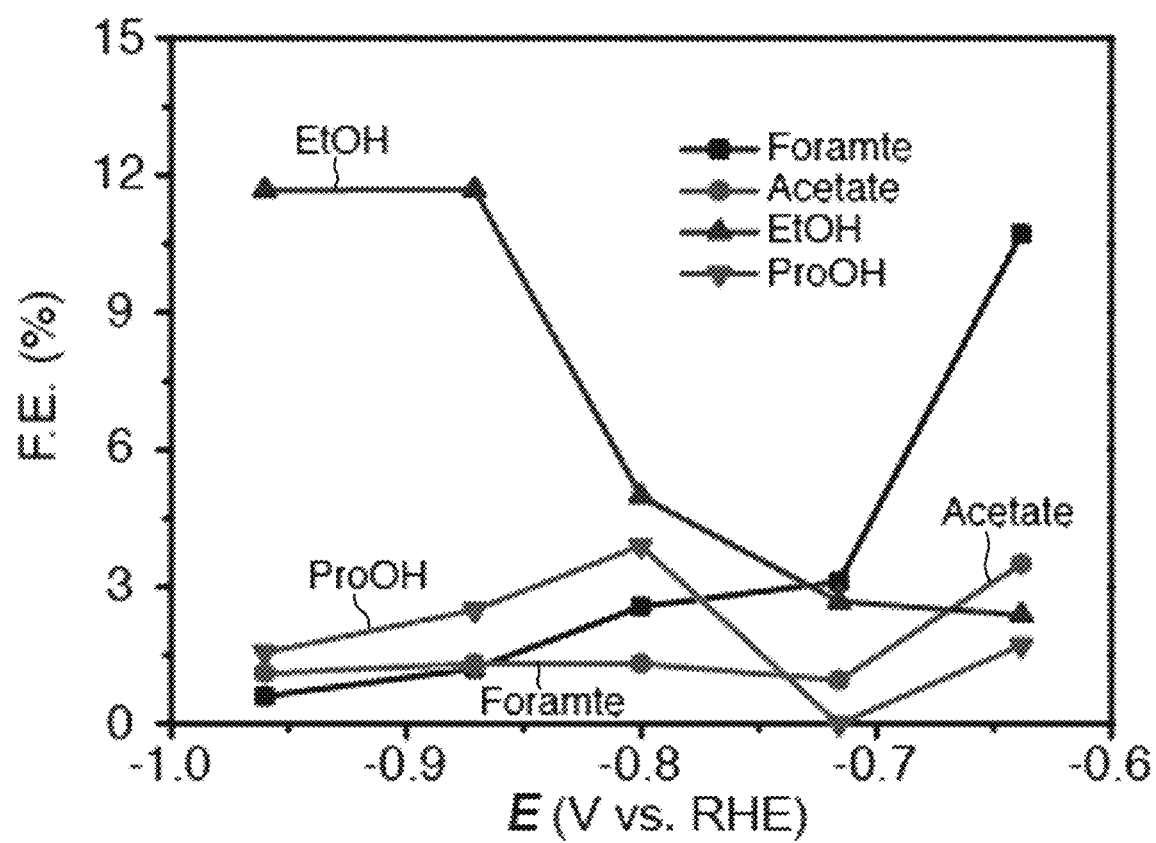

Since the catalyst activity and selectivity have been reported to depend on the catalyst mass loading, the inventors explored the effect of catalyst mass loading on the selectivity to $C_{2+}$ products using $CuO_x$ with $d_s$=5~6 Å. Catalysts were prepared by drop-casting 50 µL to 150 µL of the catalyst-containing solution onto the glassy carbon substrate. The measured activities and FE for $C_{2+}$ products are shown in FIG. 8e and FIG. 11. FIG. 11a indicates linear sweep voltammetry of samples along different mass loading at a scan rate of 20 mV s$^{-1}$ and FIG. 11b indicates Current densities of samples during chronoamperometry at applied potentials of −0.8 and −0.9 V vs. RHE with different mass loadings. FIGS. 11c and 11d respectively indicate Faradaic efficiencies for gas-phase products and liquid-phase products along mass loadings at −0.9 V vs. RHE. and FIGS. 11e and 11f respectively indicate Faradaic efficiencies for gas-phase products and liquid-phase products with different mass loadings at −0.8 V vs. RHE. FIG. 11g indicates Faradaic efficiencies for $C_{2+}$ products with different mass loadings at −0.8 and −0.9 V vs. RHE. FIG. 8e also compares the performance of our Cu catalyst with that of state-of-the-art Cu catalysts operated at the same conditions. These catalysts were then evaluated for their performance (FIGS. 12 and 13). FIGS. 12a, 12b, and 12c respectively indicate linear sweep voltammetry at a scan rate of 20 mV s$^{-1}$, current densities during chronoamperometry, and Faradaic efficiencies for gas-phase products under applied potentials. FIG. 12d indicates Faradaic efficiencies for individual liquid-phase products along applied potentials, which suggests that FEs for formate and CO are found to be increased at the low overpotentials. FIG. 13a indicates linear sweep voltammetry at a scan rate of 20 mV s$^{-1}$ for oxygen plasma treated Cu electrodes with 100 W for 2 min and 20 W for 2 min and FIG. 13b indicates current densities for oxygen plasma treated Cu electrodes with 20 W for 2 min. FIGS. 13c and 13d respectively indicate Faradaic efficiencies for gas-phase products and liquid-phase products along applied potentials. Consequently, the FE for $C_{2+}$ products of state-of-the-art catalysts, which include $O_2$ plasma treated Cu and oxide-derived Cu, were similar to those reported previously.

The inventors also found that the performance of $CuO_x$ with $d_s$=5-6 Å, shown in FIG. 8e, and an optimal mass loading (100 µL, equivalent to 11.4 µg of Cu) exhibits the maximum FE for $C_{2+}$ products—in excess of 78% and a 1-h average FE of about 75%. Consequently, the inventors conclude that the $C_{2+}$ FE achieved by creating atomic-scale interparticle spacings of 5-6 Å significantly exceed those prepared by other techniques.

Figure 14:
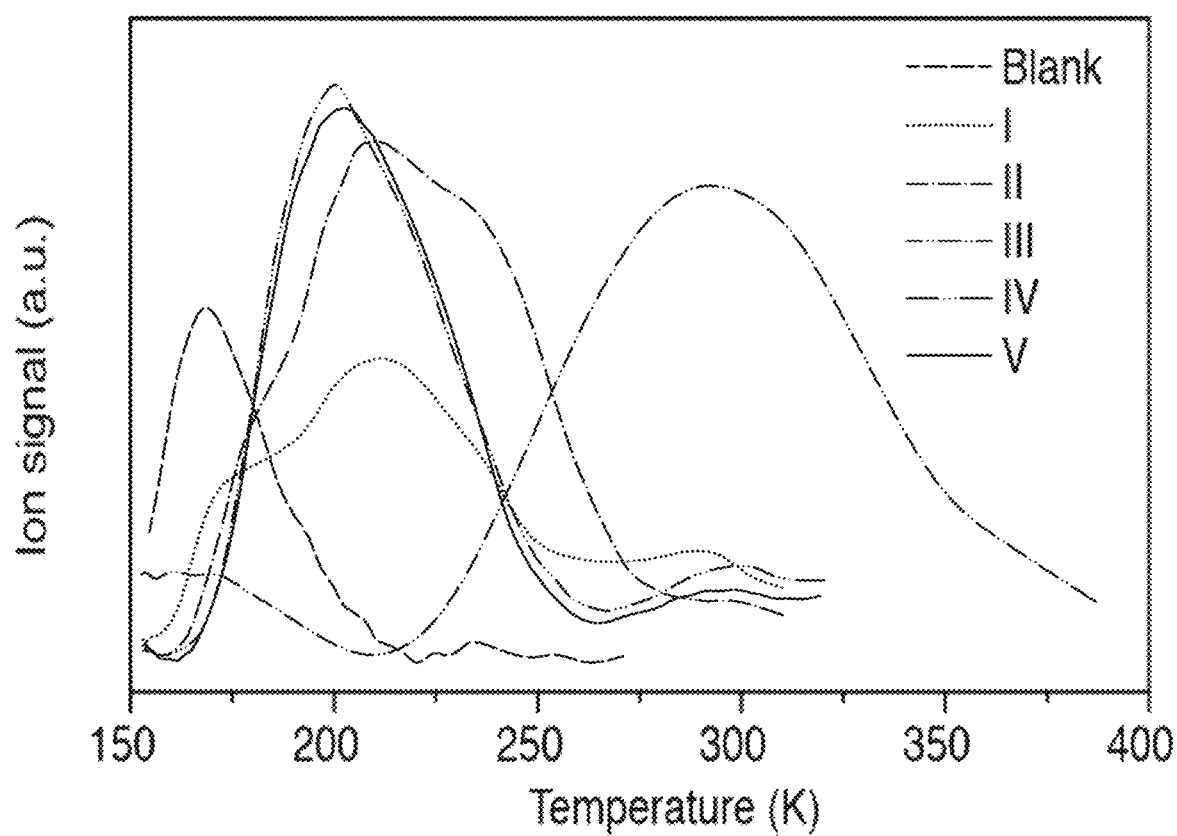
FIG. 14 shows temperature-programmed desorption (hereinafter, also referred to as "TPD") spectra of a CO gas according to an example of the present disclosure.
Figure 15A:
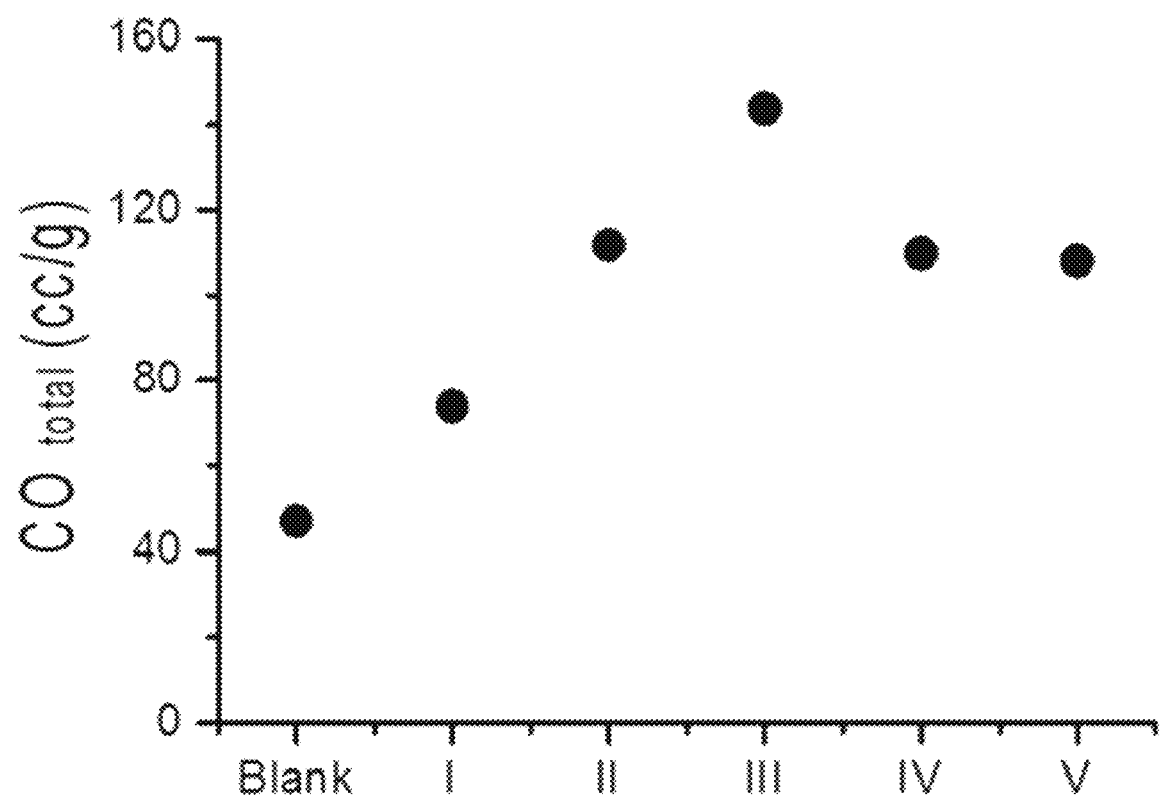
FIGS. 15A and 15B show the amount of CO emitted during TPD analysis according to an example of the present disclosure.
Figure 15B:
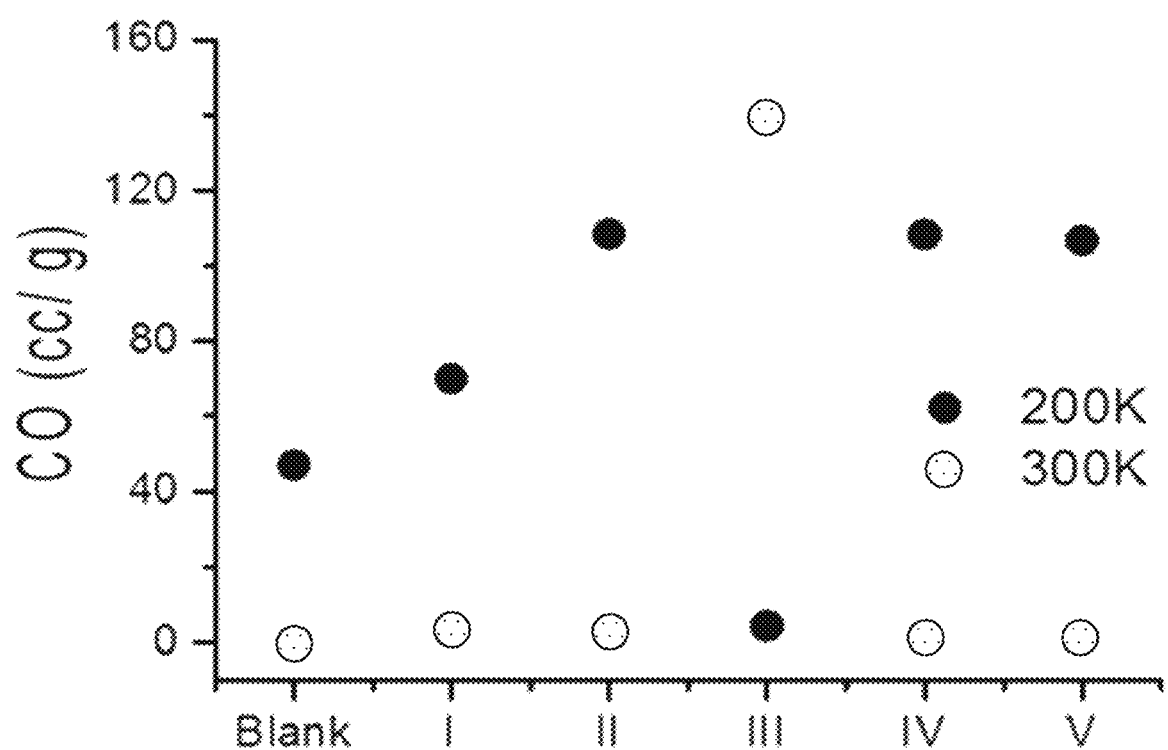

The reactivity towards C—C coupling during CO2RR is consistent with the binding energy of CO on the Cu surface. The binding energy of CO was probed by temperature-programmed desorption (TPD) and the results are presented in FIG. 14. For all of the lithiated samples, CO desorbed at relatively high temperatures, ~200 K, whereas CO desorption from the unmodified sample occurred at ~170 K. The lithiated sample with $d_s$=5-6 Å (produced at step III) exhibits a CO desorption peak at 300 K, and a large amount of CO is released (FIG. 15). FIGS. 15a and 15b respectively indicate total amount of CO desorbed from each sample and comparison of the total amount of CO desorbed at 200 K and 300K. Comparison of the results in FIG. 15 and FIG. 8c clearly shows a correlation between the peak temperature at which CO desorbs and the partial current density for the formation of $C_{2+}$ products. The inventors also note that the maximum in the CO desorption temperature and in the current density for forming $C_{2+}$ products occurs when $d_s$=5-6 Å, indicating clearly that the value of ds affects the activity and selectivity of the catalyst. These findings are fully consistent with the DFT calculations presented in FIG. 1c, which show that the strongest bind energy for CO occurs for $d_s$=5-6 Å and in FIG. 1c, which predict that the rate of C—C bond formation should be more rapid when $d_s$=5-6 Å.

Figure 16:
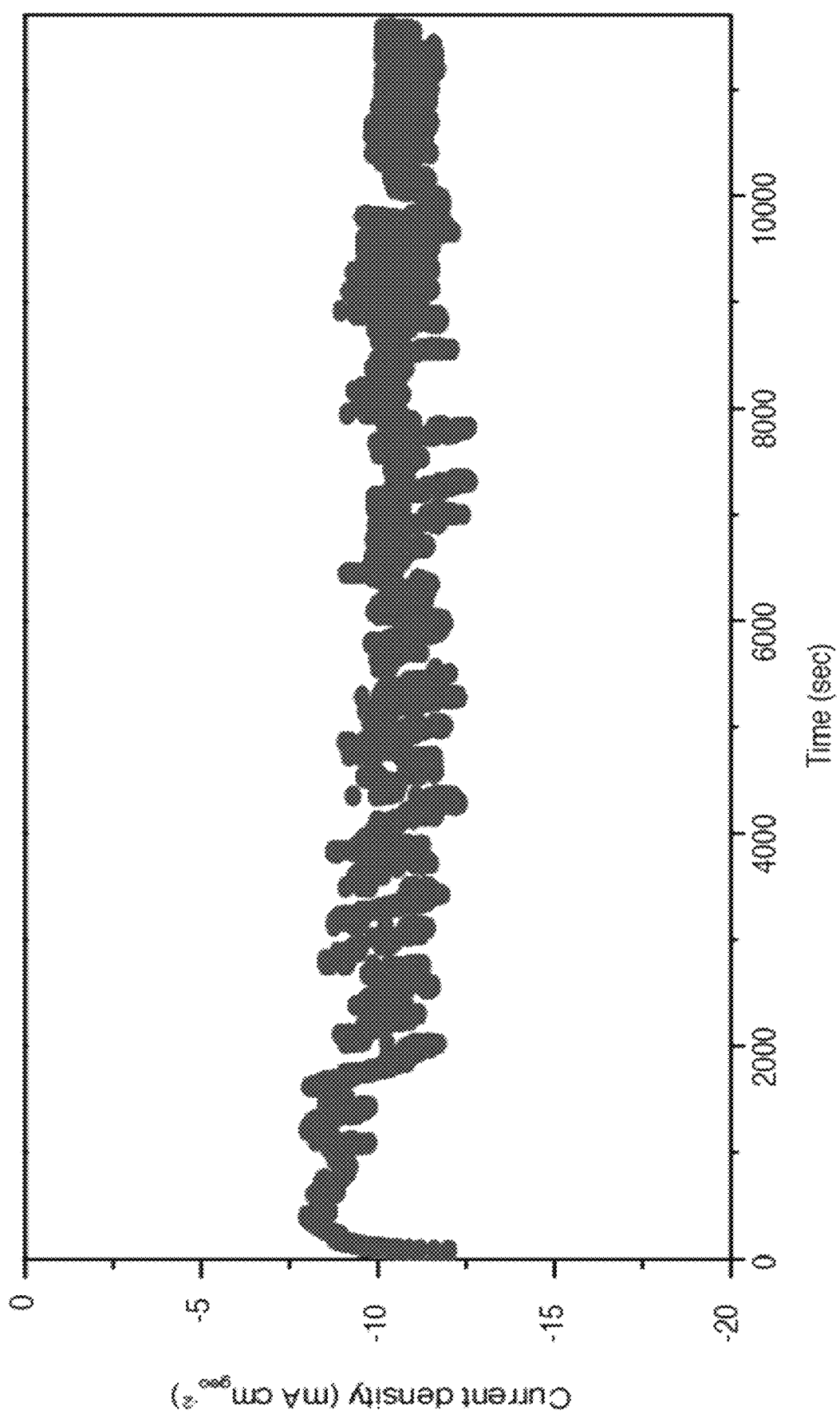
FIG. 16 shows the current density of the sample during the step Ill for CO2RR under an applied voltage of −0.9 V vs. RHE for 3 hours according to an example of the present disclosure.
Figure 17A:
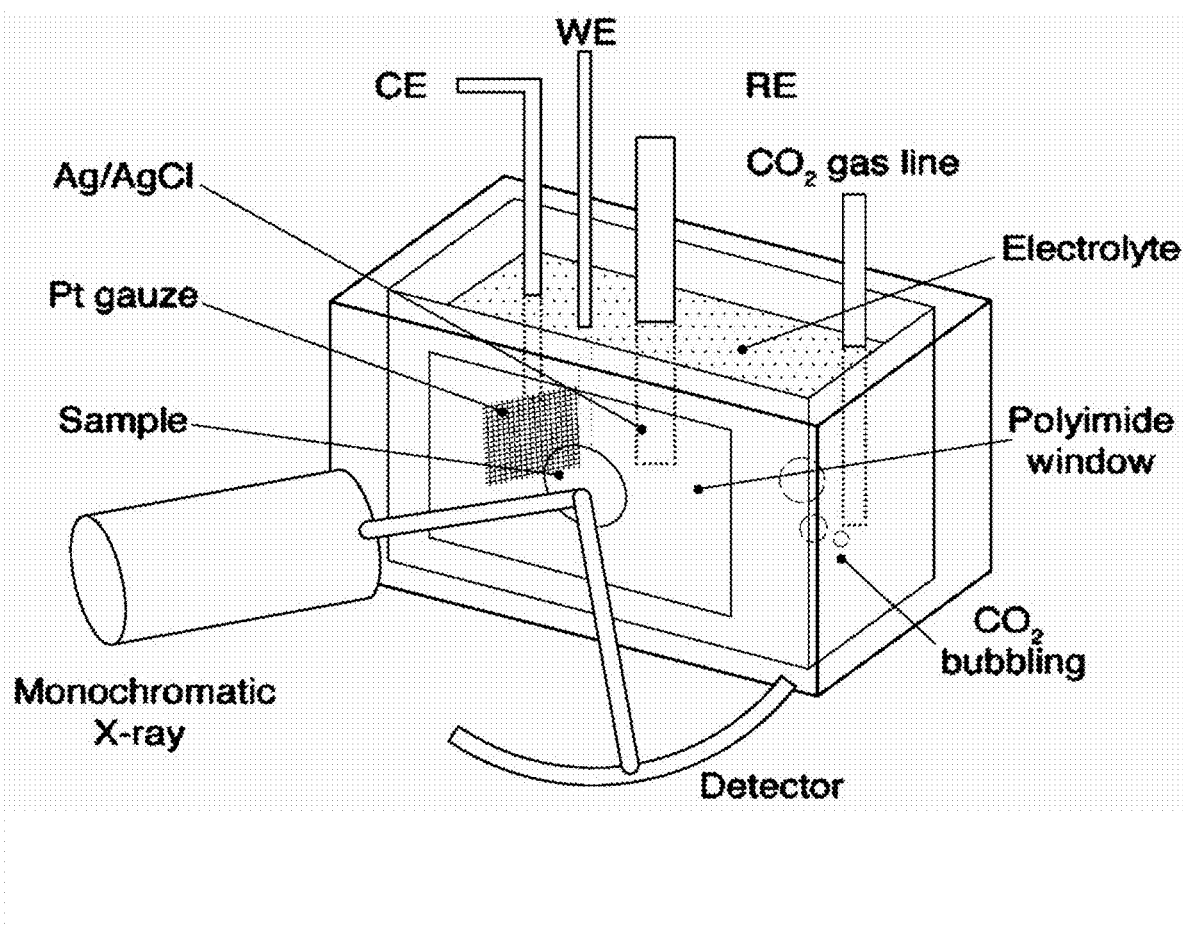
FIGS. 17A, 17B and 17C shows the Operando XAS (X-ray absorption spectroscopy) analysis for determining oxidized Cu species in the lithiated samples during CO2RR according to an example of the present disclosure.
Figure 17B:
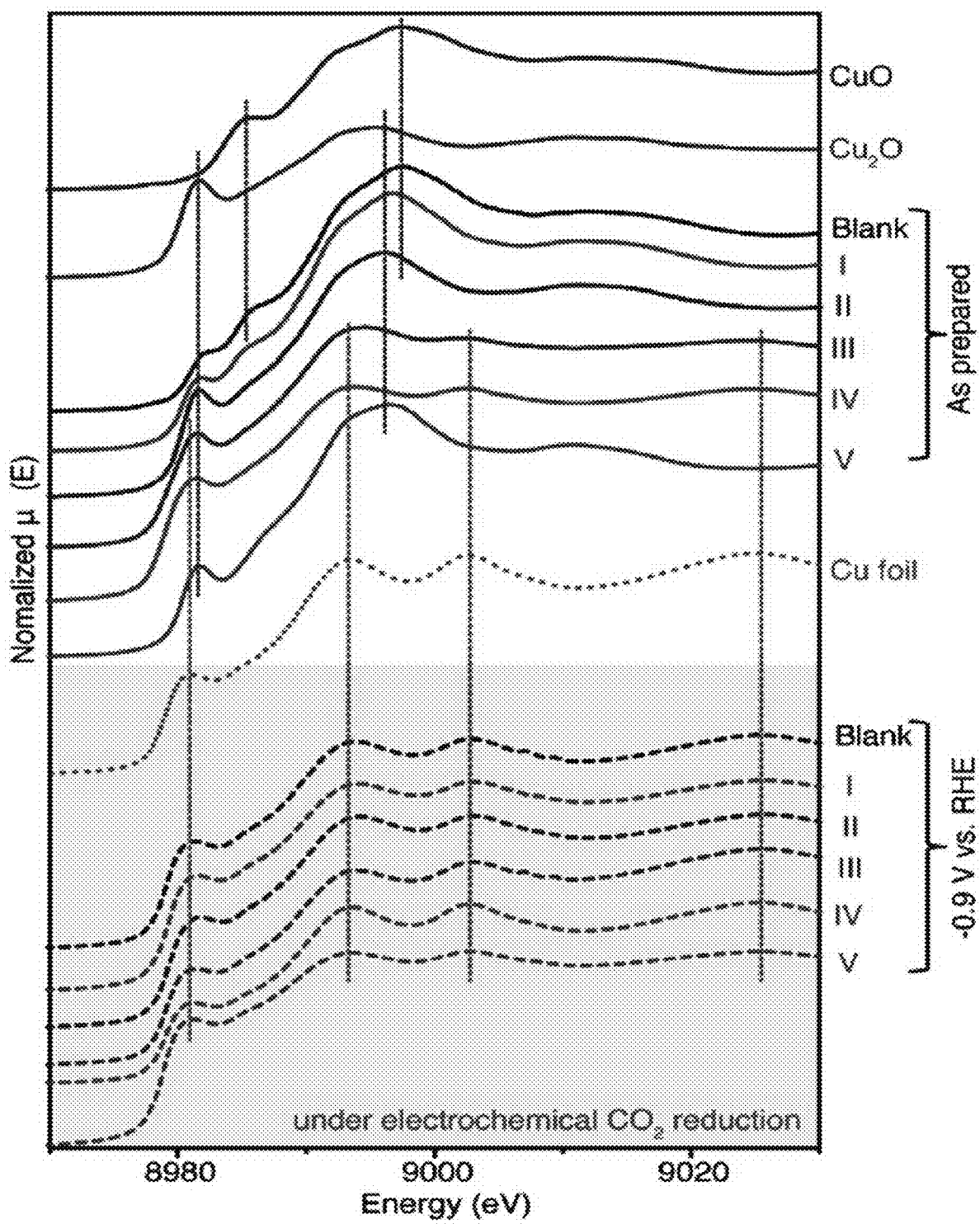
Figure 17C:
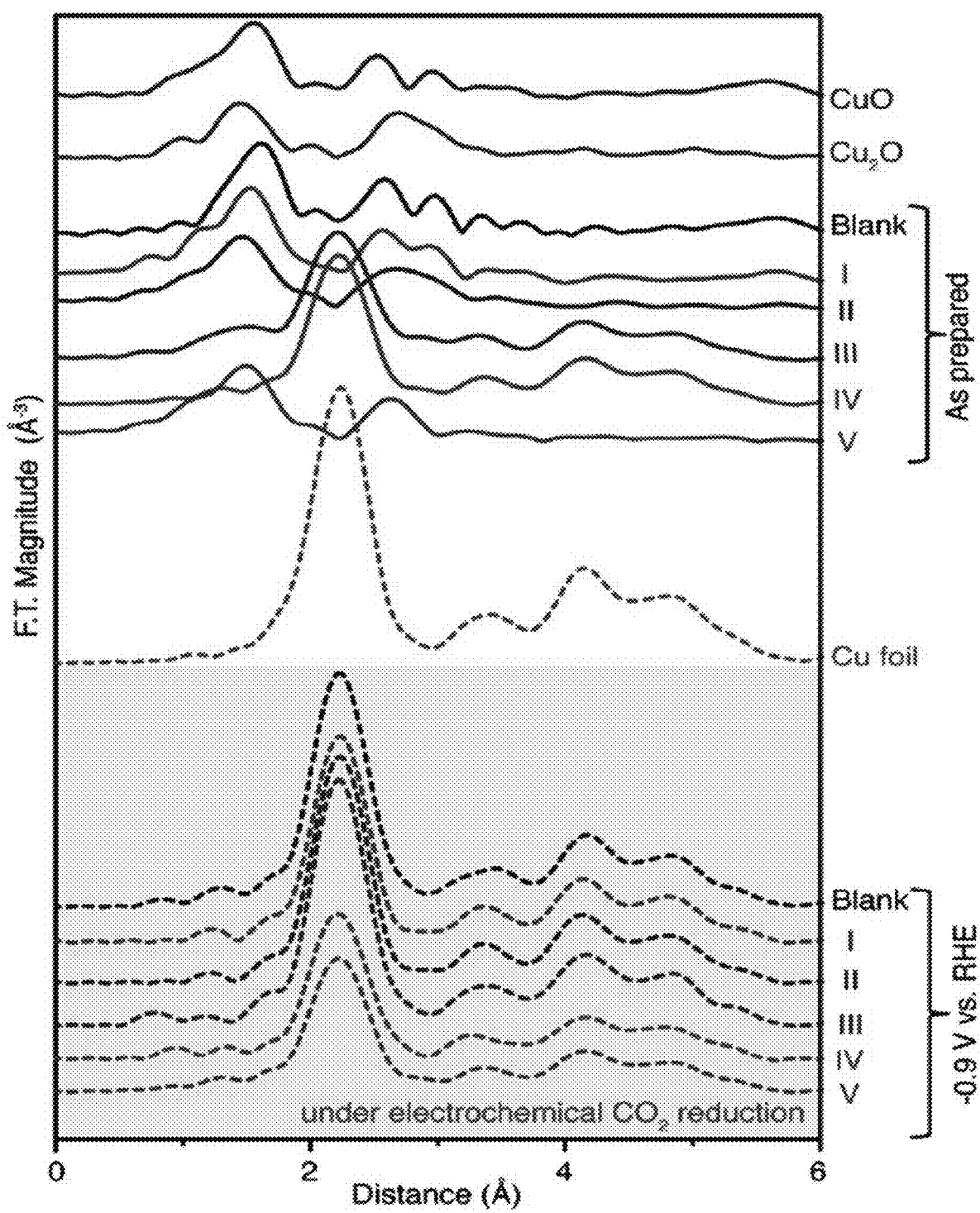
Figure 18:
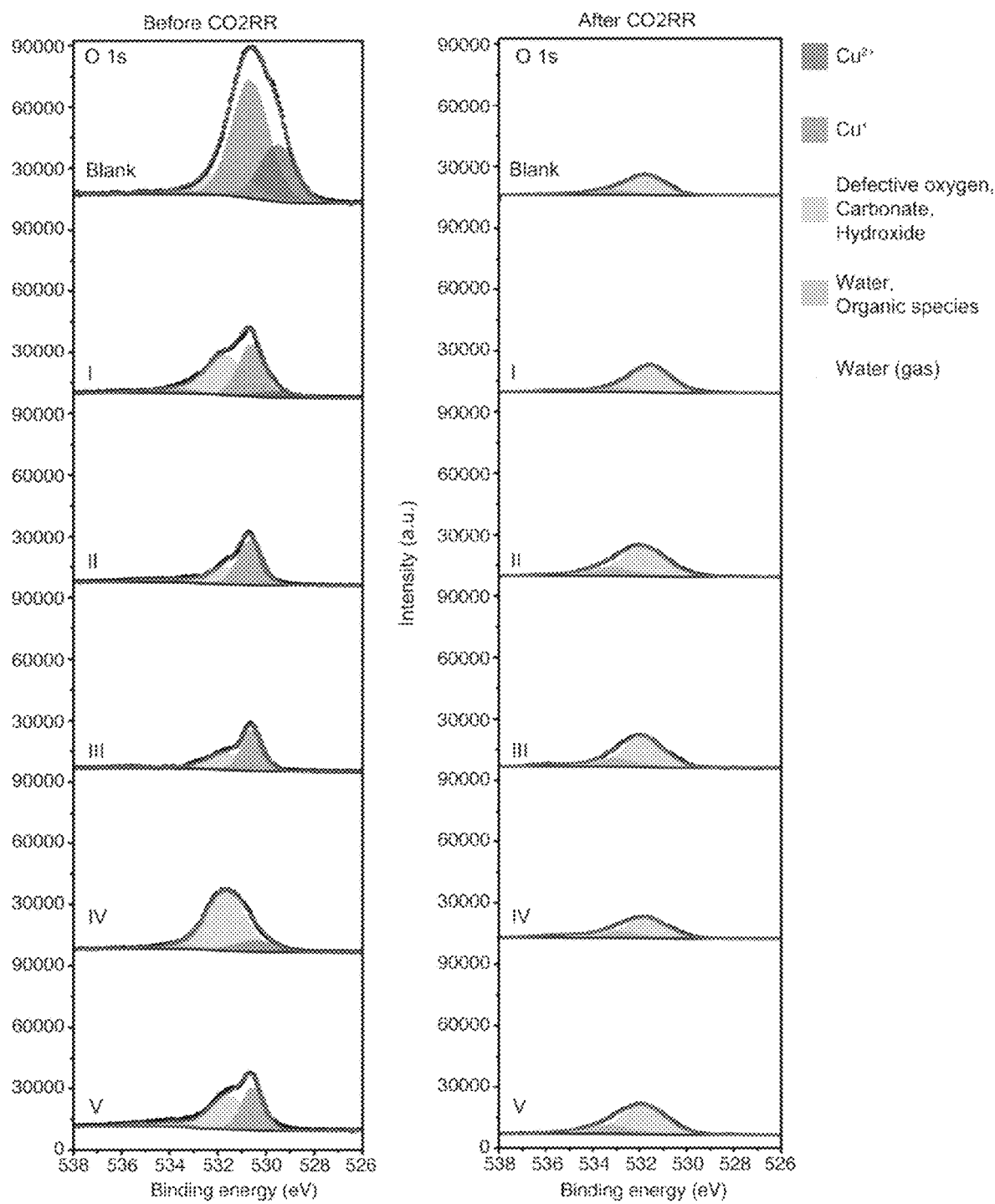
FIG. 18 shows O (oxygen) 1s spectra obtained by ex-situ XPS analysis under an inert gas condition for determining oxygen species in the lithiated samples before and after CO2RR according to an example of the present disclosure.

All catalyst samples were characterized after CO2RR in order to determine whether other parameters besides, $d_s$, contribute to the enhanced activity and selectivity of Cu for the CO2RR. Ex-situ TEM showed that none of the samples exhibited a significant change in morphology after CO2RR. Likewise, the magnitude of $d_s$ remained relatively constant after CO2RR. The stability of $d_s$ is also reflected in the stability of the current density observed for several hours under applied potential (FIG. 16). Since the importance of Cu oxidation state and subsurface O on the activity and selectivity of Cu for the CO2RR has been noted in previous studies, the inventors evaluated the oxidation state of our catalysts after their use for the CO2RR. The inventors observed by XRD that $CuO_x$ was immediately reduced to metallic Cu, upon applying a potential of −0.9 V vs. RHE, suggesting that CO2RR occurs on metallic Cu. This finding was confirmed by operando XAS spectra acquired for an applied potential of −0.9 V vs. RHE. The XANES and EXAFS spectra of the blank sample and samples that had been lithiated to step I to V demonstrate that following $CO_2$ reduction at −0.9V vs. RHE all samples are reduced to the metallic copper phase regardless of the initial oxidation state of Cu (FIG. 17). FIG. 17a is a Schematic illustration of the operando XAS analysis set-up and FIGS. 17b and 17c respectively indicate operando XANES spectra and operando EXAFS spectra of lithiated samples as prepared upon applying the reduction potential of −0.9 V vs. RHE. All the samples were found to be reduced into metallic Cu phases under the applied potential of −0.9 V vs. RHE. Moreover, the Operando EXAFS spectra demonstrate that the peaks for Cu—O are also converted to those for Cu—Cu under the applied potential of −0.9 V vs. RHE. To assess the possible role of sub-surface oxygen exclusive of that present in a bulk $CuO_x$ phase, ex-situ XPS analyses under inert gas were made before and after CO2RR on each sample. The results shown in FIG. 18 demonstrate that oxidized Cu species, e.g., Cu$^+$, are completely reduced during the CO2RR and that only small amount of subsurface O is retained after CO2RR (estimated to be <10% of the O1s signal measured prior to the reduction of $CO_2$). The inventors note further that the trend in selectivity to $C_{2+}$ products does not correlate as well with the intensity of the O 1s feature for subsurface O as it does with the value of $d_s$. This suggests that the atomic-scale space between Cu particles plays a critical role in determining the high selectivity for C—C coupling that we observe, and that the contributions to the $C_{2+}$ selectivity of our catalysts due to subsurface O and oxidized Cu species are less significant. The inventors also note that the amount of subsurface O estimated by ex-situ XPS analyses under inert gas is an upper estimate and that the amount present at the present under CO2RR conditions is likely to be less because of the highly reducing conditions, i.e., <−0.9 V vs RHE. While attempts have been made to estimate the amount of subsurface O made by removal of a Cu electrode from the electrolyte, rinsing in water, and drying in an inert atmosphere (all done without exposure of the sample to air), this protocol is also likely to overestimate the amount of subsurface O due to the high susceptibility of Cu to undergo surface oxidation by small amounts of dissolved $O_2$ and even water.

Figure 19:
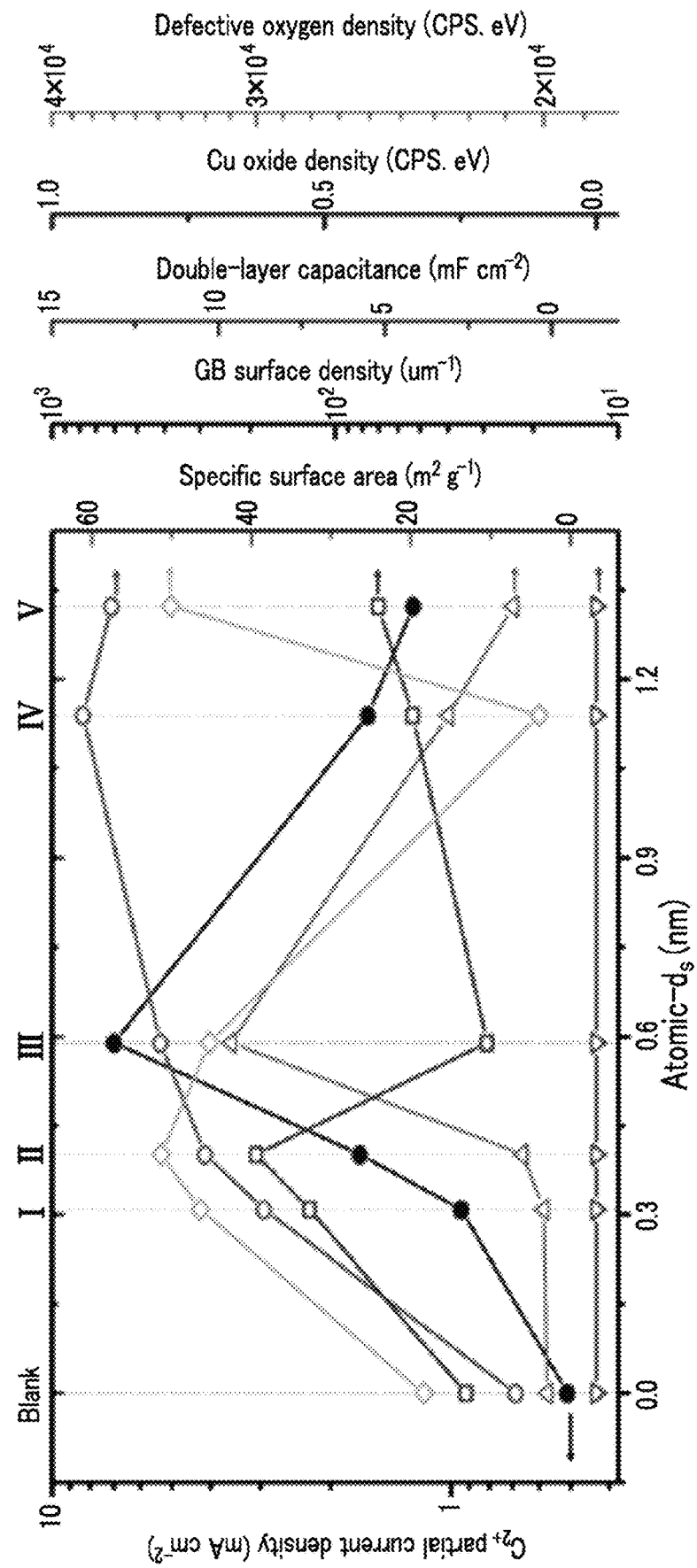
FIG. 19 shows the comparison of C—C coupling activity depending on specific surface area, electrochemical surface area, GB (grain boundary) surface area, and defective oxygen density, and Cu oxidation state as respective functions of $d_s$ according to an example of the present disclosure.

Another factor that could affect the catalytic properties of Cu is the density of grain boundaries (GBs). We compared the surface density of GBs determined from an analysis of TEM images. The inventors found that the GB surface density increased at steps I and II, but the density decreased sharply at step Ill (Figure S. The trends with expected reactivity parameters summarized in FIG. 19 show that the behavior of the C—C coupling activity is not consistent with those of the surface area, the GB, the Cu oxidation state, and the defective oxygen density and the double-layer capacitance only exhibits the same response to the values of $d_s$ (reaching a maximum for $d_s$=5 Å to 6 Å). This findings indicate that C—C coupling activity in our catalyst does not correlate with amount of the surface density of GBs, leading to the conclusion that the magnitude of $d_s$ is the principal factor controlling both the activity and selectivity of Cu for CO2RR.

The experimental and theoretical work presented here provides convincing evidence that atomic-level control of the interlayer spacing ($d_s$) between Cu nanoparticles can be used to achieve high activity and $C_{2+}$ product selectivity for CO2RR. The inventors' DFT calculations reveal that parallel Cu(100) and Cu(111) surfaces spaced ~5-6 Å apart exhibit maximum binding of important CO2RR intermediates and promote C—C bond formation. Such spacing can be created by lithiating $CuO_x$ nanoparticles and then removing the $Li_2O$ deposited. Cu nanoparticles with values of $d_s$=5-6 Å result in an approximately 12-fold increase in the current density relative to Cu particles obtained from $CuO_x$ without lithiation and a Faradaic efficiency to $C_{2+}$ products of over 78%.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A particle, comprising at least one atomic-scale channel, the at least one atomic-scale channel being formed on a surface of the particle, or on a surface and inside of the particle, wherein the particle is a metal compound-containing particle.

2. The particle of claim 1, wherein a width of the at least one atomic-scale channel is less than 1 nm.

3. The particle of claim 2, wherein the width of the at least one atomic-scale channel is 7 Å or less.

4. The particle of claim 2, wherein the width of the at least one atomic-scale channel is from 5 Å to 6 Å.

5. The particle of claim 1, wherein an inner surface of the at least one atomic-scale channel comprised in the particle includes a reduced metal.

6. The particle of claim 5, wherein a surface between the channels comprised in the particle includes the reduced metal.

7. The particle of claim 5, wherein the at least one atomic-scale channel comprised in the particle is formed by a process including electrochemical lithiation of the metal compound-containing particle, followed by delithiation, and
wherein the inner surface of the at least one atomic-scale channel includes the reduced metal formed by reduction of the metal compound during the lithiation.

8. The particle of claim 7, wherein a dimension of the width of the at least one atomic-scale channel is controlled by a cut-off voltage of the electrochemical lithiation of the metal compound-containing particle.

9. The particle of claim 5, wherein the reduced metal includes one or at least two metals selected from the group consisting of Mg, Al, Au, Ag, Cd, Co, Cr, Cu, In, Jr, Mo, Nb, Ni, Os, Pd, Pt, Rh, Ru, Sn, Ti, V, W, Zn, Sc, Y, Zr, Hf, Ta, Mn, Fe, Tc, and Re.

10. The particle of claim 1, wherein a volume density of the at least one atomic-scale channel is in a range of a ratio of 0.01 to 0.2 per unit volume of the particle.

11. A catalyst, comprising the particle including at least one atomic-scale channel according to claim 1, wherein the at least one atomic-scale channel is formed on a surface of the particle, or on a surface and inside of the particle,
wherein an inner surface of the at least one atomic-scale channel comprised in the particle includes a reduced metal, and
wherein the particle is a metal compound-containing particle.

12. The catalyst of claim 11, wherein a surface between the channels comprised in the particle includes the reduced metal.

13. The catalyst of claim 11, wherein a width of the at least one atomic-scale channel is less than 1 nm.

14. The catalyst of claim 13, wherein the width of the at least one atomic-scale channel is 7 Å or less.

15. The catalyst of claim 13, wherein the width of the at least one atomic-scale channel is from 5 Å to 6 Å.

16. The catalyst of claim 11, wherein the particle acts as a catalyst for reduction of an oxygen atom-containing material.

17. The catalyst of claim 16, wherein the reduction is performed by electrochemical reduction.

18. The catalyst of claim 16, wherein the width of the at least one atomic-scale channel before and after the reduction with the catalyst is maintained constant.

19. The catalyst of claim 16, wherein the oxygen atom-containing material includes carbon dioxide, sulfur oxides ($SO_x$), or nitrogen oxides ($NO_x$).

20. The catalyst of claim 11, wherein an activity and/or a selectivity of the catalyst is controlled by a dimension of the width of the at least one atomic-scale channel comprised in the particle.

21. The catalyst of claim 11, wherein the reduced metal includes one or at least two metals selected from the group consisting of Mg, Al, Au, Ag, Cd, Co, Cr, Cu, In, Jr, Mo, Nb, Ni, Os, Pd, Pt, Rh, Ru, Sn, Ti, V, W, Zn, Sc, Y, Zr, Hf, Ta, Mn, Fe, Tc, and Re.

22. The catalyst of claim 11, wherein a volume density of the at least one atomic-scale channel is in a range of a ratio of 0.01 to 0.2 per unit volume of the particle.

23. A method of electrochemical conversion of carbon dioxide using the catalyst of claim 11.

24. The method of claim 23, wherein the width of the atomic-scale channel of the particle is 7 Å or less.

25. A method of preparing the particle comprising at least one atomic-scale channel according to claim 1, comprising forming the at least one atomic-scale channel on a surface of the particle, or on a surface and inside of the particle by electrochemical lithiation of a metal compound-containing particle, followed by delithiation,
  wherein a dimension of a width of the at least one atomic-scale channel is controlled by adjusting a degree of the lithiation,
  wherein at least a portion of a surface, or a surface and inside of the metal compound-containing particle is reduced during the lithiation to form the at least one atomic-scale channel, and
  wherein an inner surface of the at least one atomic-scale channel comprised in the particle includes the metal reduced from the metal compound.

26. The method of claim 25, wherein a surface between the channels comprised in the particle includes the reduced metal.

27. The method of claim 25, wherein the lithiation includes applying a constant current and a cut-off voltage of from 0 V to 3 V using an electrochemical cell.

28. The method of claim 25, wherein the width of the at least one atomic-scale channel comprised in the particle is controlled by a cut-off voltage of the electrochemical lithiation.

29. The method of claim 25, wherein the width of the at least one atomic-scale channel is controlled to less than 1 nm.

30. The method of claim 25, wherein the reduced metal includes one or at least two metals selected from the group consisting of Mg, Al, Au, Ag, Cd, Co, Cr, Cu, In, Ir, Mo, Nb, Ni, Os, Pd, Pt, Rh, Ru, Sn, Ti, V, W, Zn, Sc, Y, Zr, Hf, Ta, Mn, Fe, Tc, and Re.

* * * * *